(12) United States Patent
Ubach et al.

(10) Patent No.: US 12,524,389 B2
(45) Date of Patent: Jan. 13, 2026

(54) ENTERPRISE ENGINEERING AND CONFIGURATION FRAMEWORK FOR ADVANCED PROCESS CONTROL AND MONITORING SYSTEMS

(71) Applicant: FISHER-ROSEMOUNT SYSTEMS, INC., Round Rock, TX (US)

(72) Inventors: Antonio Ubach, Round Rock, TX (US); Narayanan Doraiswamy, Round Rock, TX (US); Sean Hernandez, Round Rock, TX (US); Mark J. Nixon, Thorndale, TX (US); Sireesha Dakoju, Round Rock, TX (US); Krishna Joshi, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 18/375,735

(22) Filed: Oct. 2, 2023

(65) Prior Publication Data

US 2024/0134841 A1 Apr. 25, 2024
US 2024/0232164 A9 Jul. 11, 2024

Related U.S. Application Data

(63) Continuation-in-part of application No. 18/223,416, filed on Jul. 18, 2023.
(Continued)

(51) Int. Cl.
*G06F 16/23* (2019.01)
*G06F 16/21* (2019.01)
*G06F 16/22* (2019.01)

(52) U.S. Cl.
CPC ........ *G06F 16/2358* (2019.01); *G06F 16/211* (2019.01); *G06F 16/2272* (2019.01)

(58) Field of Classification Search
CPC . G06F 16/211; G06F 16/2272; G06F 16/2358
See application file for complete search history.

(56) References Cited

U.S. PATENT DOCUMENTS 7,281,250 B2 10/2007 Ohsawa et al.
7,293,080 B1 11/2007 Clemm et al.
(Continued)

FOREIGN PATENT DOCUMENTS

CN 115 052 033 A 9/2022
DE 10 2019 119 714 A1 1/2021
(Continued)

OTHER PUBLICATIONS

"Kubernetes—Web UI (Dashboard)," (2021).
(Continued)

*Primary Examiner* — Brittany N Allen
(74) *Attorney, Agent, or Firm* — MARSHALL, GERSTEIN & BORUN LLP

(57) ABSTRACT

An enterprise engineering and configuration system includes a common configuration database and support services stored in and executed in a compute fabric of an enterprise. The configuration database and support services use and implement a common configuration data schema to support the configuration of hardware and software in the compute fabric and at multiple different sites or physical locations of the enterprise even when different control and automation systems are used at these different sites or physical locations. The configuration system enables implementing hardware or software configuration changes to various different sites or locations of an enterprise either centrally from a configuration device connected directly to the compute fabric of the enterprise or locally from any physical location or site of the enterprise, while maintaining a single integrated enterprise configuration database that stores configuration data for each of the multiple sites of the enterprise. This configuration
(Continued)

system is flexible as it enables engineering and configuration changes to be made by users anywhere in the enterprise for any of the sites of the enterprise and across different sites of the enterprise.

85 Claims, 15 Drawing Sheets

Related U.S. Application Data

(60) Provisional application No. 63/418,006, filed on Oct. 20, 2022, provisional application No. 63/417,861, filed on Oct. 20, 2022.

(56) References Cited

U.S. PATENT DOCUMENTS

| | | |
|---|---|---|
| 8,924,103 B2 | 12/2014 | Dammeyer et al. |
| 9,183,560 B2 | 11/2015 | Abelow et al. |
| 9,451,012 B1 | 9/2016 | Neill et al. |
| 9,521,115 B1 | 12/2016 | Woolward |
| 9,934,671 B1 | 4/2018 | Anderson et al. |
| 9,992,726 B2 | 6/2018 | Shepard et al. |
| 10,303,576 B1 | 5/2019 | Seymour et al. |
| 10,360,050 B2 | 7/2019 | He et al. |
| 10,382,203 B1 | 8/2019 | Loladia et al. |
| 10,547,521 B1 | 1/2020 | Roy et al. |
| 10,574,729 B2 | 2/2020 | Hadfield et al. |
| 10,663,956 B2 | 5/2020 | Jundt et al. |
| 10,915,081 B1 | 2/2021 | Nixon et al. |
| 10,977,070 B2 | 4/2021 | Li et al. |
| 11,126,469 B2 | 9/2021 | Reque et al. |
| 11,281,492 B1 | 3/2022 | Rebeja et al. |
| 11,513,877 B2 | 11/2022 | Biernat et al. |
| 11,541,447 B2 | 1/2023 | Beyfuss et al. |
| 11,637,918 B2 | 4/2023 | Yarvis et al. |
| 11,960,588 B2 | 4/2024 | Amaro, Jr. et al. |
| 2002/0126620 A1 | 9/2002 | Heckel et al. |
| 2003/0023795 A1 | 1/2003 | Packwood et al. |
| 2004/0114605 A1 | 6/2004 | Karaoguz et al. |
| 2004/0260404 A1 | 12/2004 | Russell |
| 2005/0160413 A1 | 7/2005 | Broussard |
| 2005/0220127 A1 | 10/2005 | Cane et al. |
| 2006/0167886 A1 | 7/2006 | Kantesaria et al. |
| 2007/0006228 A1 | 1/2007 | Grobman et al. |
| 2007/0076742 A1 | 4/2007 | Du et al. |
| 2009/0083843 A1 | 3/2009 | Wilkinson, Jr. et al. |
| 2009/0327606 A1 | 12/2009 | Galloway et al. |
| 2010/0235831 A1 | 9/2010 | Dittmer et al. |
| 2010/0263025 A1 | 10/2010 | Neitzel et al. |
| 2010/0290351 A1 | 11/2010 | Toepke et al. |
| 2011/0021131 A1 | 1/2011 | Chen |
| 2011/0125921 A1 | 5/2011 | Karenos et al. |
| 2011/0265077 A1 | 10/2011 | Collison et al. |
| 2012/0102492 A1 | 4/2012 | Iwata et al. |
| 2012/0259436 A1 | 10/2012 | Resurreccion et al. |
| 2013/0031249 A1 | 1/2013 | Gunzert et al. |
| 2013/0031294 A1 | 1/2013 | Feng et al. |
| 2013/0086594 A1 | 4/2013 | Cottrell |
| 2013/0212129 A1 | 8/2013 | Lawson et al. |
| 2014/0019491 A1 | 1/2014 | Hamel |
| 2014/0344269 A1 | 11/2014 | Dong et al. |
| 2015/0378356 A1 | 12/2015 | Hefeeda et al. |
| 2016/0019084 A1 | 1/2016 | Forestiero et al. |
| 2016/0033006 A1 | 2/2016 | Leverington |
| 2016/0043866 A1 | 2/2016 | Nixon |
| 2016/0134596 A1 | 5/2016 | Kovacs et al. |
| 2016/0164743 A1 | 6/2016 | Cimprich et al. |
| 2016/0299772 A1 | 10/2016 | Seenappa et al. |
| 2016/0373310 A1 | 12/2016 | Banikazemi et al. |
| 2017/0026677 A1 | 1/2017 | Kim et al. |
| 2017/0095405 A1 | 4/2017 | Afsarifard et al. |
| 2017/0149843 A1 | 5/2017 | Amulothu et al. |
| 2017/0279770 A1 | 9/2017 | Woolward |
| 2017/0308330 A1 | 10/2017 | Suresh et al. |
| 2017/0344408 A1 | 11/2017 | Tan et al. |
| 2017/0359245 A1 | 12/2017 | Dintenfass et al. |
| 2017/0366551 A1 | 12/2017 | Brandwine |
| 2018/0052628 A1 | 2/2018 | Endo et al. |
| 2018/0067848 A1 | 3/2018 | Baldwin et al. |
| 2018/0112795 A1 | 4/2018 | Anderson et al. |
| 2018/0113442 A1 | 4/2018 | Nixon et al. |
| 2018/0114414 A1 | 4/2018 | Law et al. |
| 2018/0144144 A1 | 5/2018 | Luo et al. |
| 2018/0164791 A1 | 6/2018 | Debes et al. |
| 2018/0227369 A1 | 8/2018 | DuCray et al. |
| 2018/0299849 A1 | 10/2018 | Martin et al. |
| 2018/0316729 A1 | 11/2018 | Chauvet et al. |
| 2018/0341241 A1 | 11/2018 | Song |
| 2018/0375936 A1 | 12/2018 | Chirammal et al. |
| 2019/0041824 A1 | 2/2019 | Chavez et al. |
| 2019/0041830 A1 | 2/2019 | Yarvis et al. |
| 2019/0042378 A1 | 2/2019 | Wouhaybi et al. |
| 2019/0109820 A1 | 4/2019 | Clark et al. |
| 2019/0140918 A1 | 5/2019 | Xu et al. |
| 2019/0294124 A1 | 9/2019 | Aw et al. |
| 2019/0317465 A1 | 10/2019 | Wei et al. |
| 2019/0324431 A1 | 10/2019 | Cella et al. |
| 2019/0369574 A1 | 12/2019 | Val et al. |
| 2019/0379590 A1 | 12/2019 | Rimar et al. |
| 2020/0067789 A1 | 2/2020 | Khuti et al. |
| 2020/0092254 A1 | 3/2020 | Goeringer et al. |
| 2020/0092271 A1 | 3/2020 | Kumar et al. |
| 2020/0099531 A1 | 3/2020 | Chidambaram et al. |
| 2020/0102507 A1 | 4/2020 | Sun et al. |
| 2020/0112442 A1 | 4/2020 | Wentz |
| 2020/0174462 A1 | 6/2020 | Sirohi et al. |
| 2020/0204489 A1* | 6/2020 | Pianigiani ............... H04L 41/00 |
| 2020/0209816 A1 | 7/2020 | Cebasek et al. |
| 2020/0225649 A1 | 7/2020 | Cahill et al. |
| 2020/0226123 A1 | 7/2020 | Nixon et al. |
| 2020/0228316 A1 | 7/2020 | Cahill |
| 2020/0228342 A1 | 7/2020 | Nixon et al. |
| 2020/0241903 A1 | 7/2020 | Wang et al. |
| 2020/0310394 A1 | 10/2020 | Wouhaybi et al. |
| 2020/0322286 A1 | 10/2020 | Mehta et al. |
| 2020/0387136 A1 | 12/2020 | Poschmann et al. |
| 2020/0387144 A1 | 12/2020 | Nixon et al. |
| 2020/0387145 A1 | 12/2020 | Nixon et al. |
| 2020/0387146 A1 | 12/2020 | Nixon et al. |
| 2020/0396225 A1 | 12/2020 | Bhatia et al. |
| 2020/0401116 A1 | 12/2020 | McLaughlin et al. |
| 2021/0011772 A1 | 1/2021 | Zhou et al. |
| 2021/0044564 A1 | 2/2021 | Victor et al. |
| 2021/0058399 A1 | 2/2021 | Kapoor et al. |
| 2021/0089015 A1 | 3/2021 | Law et al. |
| 2021/0089354 A1 | 3/2021 | Nixon et al. |
| 2021/0089526 A1 | 3/2021 | Nixon et al. |
| 2021/0089542 A1 | 3/2021 | Nixon et al. |
| 2021/0089592 A1 | 3/2021 | Nixon et al. |
| 2021/0089593 A1 | 3/2021 | Nixon et al. |
| 2021/0092173 A1 | 3/2021 | Nixon et al. |
| 2021/0109658 A1 | 4/2021 | Mallick et al. |
| 2021/0149637 A1 | 5/2021 | Hallman, Jr. et al. |
| 2021/0271489 A1 | 9/2021 | Singhal |
| 2021/0294659 A1 | 9/2021 | Amit |
| 2021/0356944 A1 | 11/2021 | Chauvet et al. |
| 2021/0384058 A1 | 12/2021 | Harada et al. |
| 2022/0012137 A1 | 1/2022 | Xiao et al. |
| 2022/0019475 A1 | 1/2022 | Dobson et al. |
| 2022/0058012 A1 | 2/2022 | Kaushik et al. |
| 2022/0070112 A1 | 3/2022 | Mazzitelli et al. |
| 2022/0091583 A1 | 3/2022 | Biernat et al. |
| 2022/0103580 A1 | 3/2022 | Manickam et al. |
| 2022/0108806 A1 | 4/2022 | Kommalapati et al. |
| 2022/0128982 A1 | 4/2022 | Mansfield |
| 2022/0229707 A1 | 7/2022 | Lange et al. |
| 2022/0283571 A1 | 9/2022 | Vieira et al. |
| 2022/0404798 A1 | 12/2022 | Amaro, Jr. et al. |

(56) References Cited

U.S. PATENT DOCUMENTS

| | | |
|---|---|---|
| 2024/0004688 A1 | 1/2024 | Shigemori |
| 2024/0031370 A1 | 1/2024 | Ubach et al. |

FOREIGN PATENT DOCUMENTS

| | | | |
|---|---|---|---|
| EP | 1 492 310 A2 | 12/2004 | |
| EP | 2 790 101 A1 | 10/2014 | |
| EP | 3 382 546 A1 | 10/2018 | |
| GB | 2 403 043 A | 12/2004 | |
| GB | 2 410 573 A | 8/2005 | |
| GB | 2 481 753 A | 1/2012 | |
| GB | 2 575 758 A | 1/2020 | |
| GB | 2 589 710 A | 6/2021 | |
| WO | WO-2014/124701 A1 | 8/2014 | |
| WO | WO-2016/090292 A1 | 6/2016 | |
| WO | WO-2017/064560 A1 | 4/2017 | |
| WO | WO-2017/066304 A1 | 4/2017 | |
| WO | WO-2017/121928 A1 | 7/2017 | |
| WO | WO-2018/234741 A1 | 12/2018 | |
| WO | WO-2020/202126 A1 | 10/2020 | |
| WO | WO-2020/251828 A1 | 12/2020 | |
| WO | WO-2021/079357 A1 | 4/2021 | |

OTHER PUBLICATIONS

Aftab et al., "Analysis of identifiers in IoT platforms", Digital Communications and Networks, 6(3):333-340 (2019).
Alaasam et al., "Stateful Stream Processing for Digital Twins," International Multi-Conference on Engineering, Computer and Information Sciences (Oct. 21, 2019).
Bellini et al., "High Level Control of Chemical Plant by Industry 4.0 Solutions," Journal of Industrial Information Integration, vol. 26 (Sep. 2, 2021).
Computer and Information Security Handbook, 3rd Edition (2017). Select pages.
Dobaj et al., "A Microservice Architecture for the Industrial Internet-of-Things", Computational Biology and Bioinformatics (Jul. 4, 2018).
Emerson & PreScouter, "Software Defined Architecture for Embedded Applications," Research Support Service (2020).
Greevenbosch, "Use Cases and Requirements for Authentication, Authorisation and Revocation in the Internet of Things; draft-greevenbrosch-dice-authent-author-revoc-00.txt," Standardworkingdraft, Internet Society (2013).
Hmaity et al. "Virtual Network Function Placement for Resilient Service Chain Provisioning", 978-4673-9023-1, 2016, IEEE (Year: 2016).
Houmani et al., "Enhancing microservices architectures using data-driven service discovery and QoS guarantees", 2020 20TH IEEE/ACM International Symposium on Cluster, Cloud and Internet Computing (CCGRID), IEEE (May 11, 2020).
International Search Report and Written Opinion for Application No. PCT/US2023/027978, dated Dec. 11, 2023.
International Search Report and Written Opinion for Application No. PCT/US2023/027988, dated Oct. 25, 2023.
International Search Report and Written Opinion for Application No. PCT/US2023/028003, dated Oct. 25, 2023.
International Search Report and Written Opinion for Application No. PCT/US2023/028005, dated Oct. 26, 2023.
International Search Report and Written Opinion for Application No. PCT/US2023/028027, dated Nov. 7, 2023.
International Search Report and Written Opinion for Application No. PCT/US2023/028029, dated Oct. 27, 2023.
International Search Report and Written Opinion for Application No. PCT/US2023/033926, dated Mar. 18, 2024.
International Search Report and Written Opinion for Application No. PCT/US2023/034272, dated Jan. 22, 2024.
International Search Report and Written Opinion for Application No. PCT/US2023/034349, dated Jan. 18, 2024.
International Search Report and Written Opinion for Application No. PCT/US2023/034351, dated Jan. 22, 2024.
International Search Report and Written Opinion for Application No. PCT/US2023/035611, dated Jan. 25, 2024.
International Search Report and Written Opinion for Application No. PCT/US2023/035613, dated Jan. 26, 2024.
International Search Report and Written Opinion for Application No. PCT/US2023/035618, dated Mar. 21, 2024.
Jairo et al., "Deliverable D1.1. Review of Reference Architectures for IoT Enabled Agriculture Development. Consultandy Design of a reference architecture for an IoT sensor network. Company International Center for Tropical Agriculture (CIAT)", (Apr. 29, 2019).
Jin et al., "Secure Edge Computing Management Based on Independent Microservices Providers for Gateway-Centric IoT Networks", IEEE Access, IEEE, 8:187975-187990 (2020).
Kashyap: "Yokogawa Cloud Architecture for Smart Manufacturing", Yokogawa technical report (Nov. 10, 2023).
Khalyly et al., "Smart Agent Edge Microservices Deployment pproach", 2020 International Conference on Decision Aid Ciences and Application (DASA), IEEE (Nov. 8, 2020).
Koziolek et al., "Self-Commissioning Industrial IoT-Systems in Process Automation," IEEE International Conference on Software Architecture, pp. 196-205 (2018).
Madiwalar et al., "Plug and produce for Industry 4.0 using software-defined networking and OPC UA", 24th IEEE International Conference on Emerging Technologies and Factory Automation (ETFA), pp. 126-133 (Sep. 2019).
Malakuti et al., "A Four-Layer Architecture Pattern for Constructing and Managing Digital Twins," Advances in Databases and Information Systems, 231-246 (2019).
NAMUR Recommendation, NAMUR Open Architecture NOA Concept (2020).
Pontarolli et al., "Towards Security Mechanisms for an Industrial Microservice-Oriented Architecture," 14th IEEE International Conference on Industry Applications (2021).
Pribis et al., "An Industrial Communication Platform for Industry 4.0—Case Study," Cybernetics & Informatics, pp. 1-8 (2020).
Profanter et al., "OPC UA for Plug & Produce: Automatic Device Discovery Using LDS-ME, " 22nd IEEE Interational Conference on Emerging Technologies and Factory Automation, pp. 1-8 (2017).
Radchenko et al., "Micro-Workflow: Kafka and Keplar Fusion to Support Digital Twins of Industrial Processes," IEEE/ACM International Conference on Utility and Cloud Computing Companion (Dec. 17, 2018).
Search Report for Application No. GB2208755.5, dated Feb. 10, 2023.
Search Report for Application No. GB2208756.3, dated Feb. 23, 2023.
Search Report for Application No. GB2208757.1, dated Feb. 10, 2023.
Search Report for Application No. GB2208758.9, dated Dec. 16, 2022.
Search Report for Application No. GB2208759.7, dated Dec. 16, 2022.
Search Report for Application No. GB2208766.2, dated Feb. 16, 2023.
Search Report for Application No. GB2208768.8, dated Dec. 7, 2022.
Search Report for Application No. GB2208769.6, dated Dec. 7, 2022.
Search Report for Application No. GB2208770.4, dated Dec. 7, 2022.
Search Report for Application No. GB2208771.2, dated Dec. 12, 2022.
Search Report for Application No. GB2208780.3, dated Feb. 22, 2023.
Search Report for Application No. GB2208794.4, dated Jan. 17, 2023.
Search Report for Application No. GB2208795.1, dated Jan. 17, 2023.
Search Report for Application No. GB2208796.9, dated Nov. 10, 2022.

(56) References Cited

OTHER PUBLICATIONS

Search Report for Application No. GB2208797.7, dated Dec. 1, 2022.
Search Report for Application No. GB2208821.5, dated Mar. 31, 2023.
Search Report for Application No. GB2208856.1, dated Jan. 18, 2023.
Search Report for Application No. GB2208857.9, dated Nov. 18, 2022.
Search Report for Application No. GB2208858.7, dated Nov. 18, 2022.
Steindl et al., "Semantic Microservice Framework for Digital Twins," Applied Sciences, 11(12):1-19 (2021).
Sung et al., "Description lookup based UPnP extension for wireless sensor networks", Proceedings of the 2009 6th annual international mobile and ubiquitous systems: Networking & Services, MobiQuitous (Jul. 2009).
Tomarchio et al., "TORCH: A TOSCA-Based Orchestrator of Multi-Cloud Containerised Applications," Journal of Grid Computing (2021).
Tundo et al., "Declarative Dashboard Generation," IEEE Internation Symposium on Software Reliability Engineering Workshops (2020).

* cited by examiner

ENTERPRISE ENGINEERING AND CONFIGURATION FRAMEWORK FOR ADVANCED PROCESS CONTROL AND MONITORING SYSTEMS

CROSS-REFERENCE TO RELATED APPLICATIONS

This application claims priority to U.S. Provisional Patent Application Ser. No. 63/417,861, entitled "Configuration Features of Next Generation Process Control and Automation Systems," which was filed Oct. 20, 2022; and U.S. Provisional Patent Application Ser. No. 63/418,006, entitled "Enterprise-Level Features Provided by the NGPCAS," which was filed Oct. 20, 2022, and is a continuation-in-part of U.S. patent application Ser. No. 18/223,416, entitled "Monitoring and Operational Functionalities for an Enterprise Using Process Control or Automation System," filed on Jul. 18, 2023, the entire disclosures of each of which are hereby expressly incorporated by reference herein.

TECHNICAL FIELD

The present application relates generally to industrial process control systems and automation systems of industrial process plants, and in particular, to a framework for performing enterprise engineering and configuration activities in a next-generation architecture for industrial process control and automation systems.

BACKGROUND

For decades, distributed process control systems and automation systems of various enterprises (such as distributed or scalable process control and/or automation systems used in power generation, chemical, petroleum, or other industrial processes such as pharmaceutical or other types of manufacturing) have typically included one or more sites (physical locations) at which one or more dedicated process controller devices are communicatively coupled to each other, to at least one host or operator workstation via a process control network, and to one or more instrumentation or field devices via analog, digital, or combined analog/digital buses.

Generally speaking, each different site of an enterprise is treated as a separate process control or automation system which is managed separately. In each system, the field devices perform functions within a particular process or plant such as opening or closing valves, switching devices on and off, and measuring process parameters. Example field devices include valves, valve positioners, switches, and transmitters (e.g., devices including sensors for measuring temperature, pressure, or flow rate; and transmitters for transmitting the sensed temperatures, pressures, and flow rates). In many industrial processes, there may be hundreds, thousands, or even tens of thousands of field devices operating to send data to and/or receive commands from the one or more dedicated controller devices.

The process controllers, which are typically located within the plant environment (i.e., within the physical confines of plant and, in particular, in the vicinity of the field devices), receive signals indicative of process measurements made by the field devices (or other information pertaining to the field devices) and execute a controller application that runs, for example, different control modules which make process control decisions, generate control signals based on the received information, and coordinate with the control modules or blocks being implemented in smart field devices (e.g., HART®, WirelessHART®, and FOUNDATION® Fieldbus field devices).

Execution of the control modules causes the process controllers to send the control signals over the communication links or signal paths to the field devices, to thereby control the operation of at least a portion of the process plant or system (e.g., to control at least a portion of one or more industrial processes running or executing within the plant or system). For example, a first set of controller(s) and field devices may control a first portion of a process being controlled by the process plant or system, and a second set of controller(s) and field devices may control a second portion of the process.

Input/output (I/O) cards (sometimes called "I/O devices" or "I/O modules"), which are also typically located within the plant environment, generally are communicatively disposed between a controller and one or more field devices, enabling communications therebetween (e.g., by converting electrical signals into digital values and vice versa). Typically, an I/O card functions as an intermediary device between a process controller and one or more field devices that have inputs or outputs configured for the same communication protocol or protocols as those utilized by the I/O card.

The field devices, controllers, and I/O devices are generally referred to collectively as "process control devices," and are generally located, disposed, or installed in a field environment of a process control system or plant. The network formed by one or more controllers, the field devices communicatively connected to the one or more controllers, and the intermediary devices facilitating communication between the controllers and field devices may be referred to as an "I/O network" or "I/O subsystem."

Information from the I/O network(s) may be made available over a data highway or communication network (the "process control network") to one or more other hardware devices, such as operator workstations, personal computers or computing devices, handheld devices, data historians, report generators, centralized databases, or other centralized administrative computing devices that are typically placed in control rooms or other locations away from the harsher field environment of the plant, e.g., in a back-end environment of the process plant.

The information communicated over the process control network enables an operator or a maintenance person to perform desired functions with respect to the process via one or more hardware devices connected to the network. These hardware devices may run applications that enable an operator or other user such as a configuration engineer or a maintenance personnel to, e.g., configure the process controller, the I/O devices and the field devices, change settings of the process control routine(s), modify the operation of the control modules within the process controllers or the smart field devices, view the current state of the process or status of particular devices within the process plant, view alarms generated by field devices and process controllers, simulate the operation of the process for the purpose of training personnel or testing the process control software, diagnose problems or hardware failures within the process plant, etc. The process control network or data highway utilized by the hardware devices, controllers, and field devices may include a wired communication path, a wireless communication path, or a combination of wired and wireless communication paths.

Generally speaking, a communication network (e.g., an I/O network in a process control environment) includes communication nodes which are the senders and recipients of data and communication links or paths connecting the communication nodes. Additionally, communication networks typically include dedicated routers (including firewalls) responsible for directing traffic between communication nodes, and, optionally, dedicated devices responsible for configuring and managing the network. Some or all of the communication nodes may be also adapted to function as routers in order to direct traffic sent between other network devices. Network devices may be inter-connected in a wired or wireless manner, and network devices may have different routing and transfer capabilities. For example, dedicated routers may be capable of high-volume transmissions while some communication nodes may be capable of sending and receiving relatively little traffic over the same period of time. Additionally, the connections between communication nodes on a network may have different throughput capabilities and different attenuation characteristics. A fiber optic cable, for example, may be capable of providing a bandwidth several orders of magnitude higher than a wireless link because of the difference in the inherent physical or fundamental limitations of the medium.

Industrial control system providers and users have, for many years, organized control systems for industrial processes around the Purdue Model for Control Hierarchy logical framework standardized by ISA (International Society of Automation) 95.01-IEC (International Electrotechnical Commission) 62264-1 ("the Purdue model"). The Purdue model is a network segmentation model for industrial control systems that helps conceptualize and organize concepts of industrial process architecture and, in particular, the security of the various network segments within an industrial process.

Much like the OSI model for network communications conceptually organizes computer communication networks into layers, the Purdue model divides an industrial process architecture into multiple levels and zones. Levels 0, 1, 2, and 3 represent, respectively, the physical process (e.g., the physical equipment being controlled—field devices and attendant physical I/O devices), basic control (e.g., the controllers, PLCs, etc. that monitor and control Level 0 equipment and safety instrumented systems), area supervisory control (e.g., operator workstations and the human machine interface (HMI), historian databases, configuration, etc., as well as supervisor and data acquisition (SCADA) functionality and other control logic that analyzes and acts on Level 1 data), and site operations (e.g., plant-wide control and monitoring, data aggregation, reporting, etc.), and are part of a manufacturing zone. Levels 4 and 5, respectively, represent business and logistics systems of the enterprise (e.g., database servers, application servers, file servers, etc.), and the enterprise or corporate network (e.g., a broader set of enterprise Information Technology (IT) systems, including connections to the public Internet), and are part of an enterprise zone. A demilitarized zone (DMZ) sits between the enterprise and manufacturing zones. The process control levels 0-2 generally require a higher level of trust in the safety and validity of messages, packets, and other communications, while manufacturing, corporate, and enterprise systems in levels 3-5 generally require a lower level of trust. For example, process plant systems, networks, and devices at security levels 0-3 may be protected against threats from enterprise networks at security levels 4-5, and/or from any external networks higher than security level 5 exploiting the enterprise networks, e.g., by using the DMZ and/or one or more firewalls. Again, however, these systems are organized on a site by site basis, making it difficult for an enterprise (e.g., a particular company) having multiple different sites (e.g., multiple different processing or automation plants at different physical locations) to have an integrated and comprehensive data gathering and configuration manipulation system that covers multiple different sites.

More recently, some providers and users of industrial control systems have attempted to move portions of the industrial control system into multi-purpose computing resources such as the cloud, and to virtualize certain aspects of the industrial control system. Such attempts have had as their purpose the desire to capture and analyze ever-expanding quantities of data generated in industrial control systems, and to create virtualized redundancy, for example. However, adherence to the Purdue model and the associated security practices it requires have resulted in these attempts each suffering from one or more of the drawbacks elaborated upon above, while also having ancillary effects. Integrating cloud-based components into the Purdue model can drastically complicate the security issues by requiring data from lower levels of the Purdue model (e.g., OT systems) to traverse IT infrastructure that it was never intended to traverse. The resulting additional security infrastructure required, when added to the traversal of the IT infrastructure (whether on premise or off) can increase latency—especially with respect to control signals—to sometimes unacceptable levels.

Additionally, some providers of industrial control systems have attempted to decouple from purpose-built controller hardware (e.g., virtualize) the control algorithms that control the industrial processes. To that end, entire controllers have been virtualized so that they can execute on less specialized hardware (e.g., on servers or shared computing hardware), allowing multiple copies of the control algorithms to execute in parallel on different hardware such that one instance can serve as a backup to another, primary instance. If the primary instance fails or becomes unstable, control can shift to the backup instance, and the original, primary instance can be shut-down and re-instantiated on the same or different hardware. While such systems have some advantages in terms of controller redundancy because entire controllers can be instantiated multiple times on different hardware, and even moved between hardware, they continue to suffer from the limitations imposed by the Purdue model. Moreover, these systems require that all of the elements of the virtualized device (e.g., a controller) be replicated or moved together or at the same time, which limits the flexibility of these systems.

U.S. patent application Ser. No. 18/233,416, filed on Jul. 18, 2023, the disclosure of which is entirely incorporated herein by reference, describes a new process plant and industrial control and/or automation system architecture that enables significant amounts of both computer processing and IT infrastructure that is used to support a process plant, an industrial control facility or other automation facility (referred to herein as a compute fabric) to be implemented in a shared, in an offsite and/or in a virtualized manner, which alleviates many of the communications and security issues present in current process and industrial control systems that attempt to implement control using shared or virtualized computing resources, such as cloud based computing or system resources. In particular, this new control system (which may be used to implement control, monitoring and configuration activities in any process plant or industrial manufacturing or automation facility), does not attempt to follow the well-known, generally followed and accepted Purdue model when integrating and providing communications between plant devices (such as field devices), equipment controllers, supervisory controllers, site business operations and enterprise operations. As a result, the system architecture is able to implement control functions, communications and security measures in a manner that can effectively use communications and security features developed for general purpose computing uses outside of the process plant environment in a more effective manner when supporting control functions associated with a process plant or an industrial automation facility.

More particularly, the new control system architecture includes a compute fabric that is agnostic or indifferent to the physical location at which the compute fabric is implemented and includes one or more physical controlled devices (referred to herein as a pool of physical devices), such as valves, transmitters, I/O devices, etc., located at one or more specific plants, facilities, or physical locations (generally referred to herein as "sites") at which a product or process is being manufactured or implemented and further includes a transport network that enables or provides communications between the compute fabric and the pool of physical devices in a robust and secure manner.

Generally speaking, the compute fabric includes a physical layer comprising one or more computer processing and/or storage devices and an application layer that includes computer implemented software modules that may be implemented on the physical layer to perform various control, monitoring and configuration activities using the pool of physical devices at one or more sites. In one case, the application layer of the compute fabric may be implemented as one or more sets of configured containers or as a containerized system in which various different configured containers and types of containers perform different computer implemented functions with respect to the facility or enterprise in which the control system is being implemented. The physical layer of the compute fabric may be implemented in any desired computer processing, storage, and networking equipment, such as on one or more computer processors and computer databases in the cloud, on one or more computer processors and databases at one or more dedicated offsite locations separated from the plant(s), facilities, or site(s) at which the pool of physical devices are located, on computer equipment located at the physical plant or facility at which the pool of physical devices are located or any combination thereof. The new control system architecture also includes a networking layer that is disposed in between the physical layer and the application layer and that provides administration, management, and usage of physical layer resources and logical (e.g., software-based) resources as and when required for the application layer activities, and in particular to support the timing and other needs that are specific to and required by industrial process control and automation.

Still further, the various components of the application layer, e.g., the various configured containers making up the application layer, may be executed in any desired computing equipment associated with the physical layer in any desired and configurable manner. Thus, the configured containers of the application layer may be implemented in a redundant manner in various ones of the same or different computer processing equipment of the physical layer, may be moved between different computer processing equipment of the physical layer to provide for better computing and communications performance, may be replicated in various different processors or databases of the physical layer to provide for redundancy and/or for controlling replicated physical equipment, etc.

The pool of physical devices may include devices that perform physical functions utilized to control an industrial or automation processes implemented at various different sites, e.g., locations or facilities of an enterprise. For example, the pool of physical devices, which may include field devices such as valves, valve positioners, actuators, switches, regulators, sensors, etc., perform physical functions, control, and/or other types of functionality associated with controlling the industrial or automation process using the physical hardware that is located at one or more manufacturing facilities of an enterprise, and that interacts with the process material or products being manufactured to provide measurement of and control of the physical phenomena being controlled/implemented as part of the manufacturing or automation process. The pool of physical devices may be disposed or physically located at different physical locations or environments associated with an enterprise (i.e., sites) or may be entirely disposed or located at only a single physical location or environment (i.e., a single site).

During operation, the compute fabric may be communicatively connected with the pool of physical equipment disposed at one or more physical locations using one or more transport networks. The transport networks may use any desired communication infrastructure and communication protocols, including any desired wired and/or wireless communications equipment/protocol. Such protocols may be any of various process control protocols such as HART, WirelessHART, Foundation Fieldbus, Profibus, OPC UA, etc. protocols, and/or may be any of various general computing communication protocols. For example, the transport networks may use any IP based or packetized protocol, including protocols which utilize publications and subscriptions such as MQ Telemetry Transport (MQTT) and Advanced Message Queueing Protocol (AMQP). Still further, the transport networks may use or include any desired communication network physical layers, such as Ethernet, 802.11, advanced physical layer (APL), etc. physical layers. In this manner, the pool of physical devices may send data or information to and may receive data or information from one or more configured containers in the compute fabric in packetized form via one or more of the transport networks to enable the compute fabric to implement process control, monitoring and configuration activities with respect to the pool of physical devices. Further, virtual networks such as VNets may be used to communicatively connect different remote infrastructures (e.g., which may be implemented via different cloud computing systems and/or via other suitable means) and to communicatively connect different physical locations (e.g., on-premises infrastructures) with remote infrastructures. For network security reasons, virtual networks may be routed through Virtual Private Networks (VPNs). For reliability purposes, different VNets may be used for different network providers (for example, AT&T and Verizon). A more detailed description of VPNs is provided elsewhere within this document.

The compute fabric may be implemented on a scalable hardware platform, portions of which can be physically located across one or more physical locations that may or may not be the same physical locations associated with the pool of physical devices. Thus, at least a portion of the compute fabric may be implemented on a cloud computing platform, the hardware of which may be disposed remotely from physical location(s) of the field environment at which the pool of physical devices is located.

Generally speaking, the compute fabric supports the creation, execution, removal, maintenance, administration, and management of a plurality of containerized applications, containerized services, or other containerized components (e.g., configured containers). The pool of containerized components may include applications that have been configured into containers and/or services that have been configured into containers, each of which executes to provide a specific functionality and/or operation utilized by the control system to control, monitor and/or configure one or more of the pool of physical devices, to support process and/or automation control and system management, and to administer, maintain, and manage the system and its components across the lifetime of the system. Generally speaking, the containerized components provide functionalities that traditional process control and automation techniques typically implement via a plethora of systems, networks, computing devices, DMZs, firewalls, and applications operating across Levels 2-5 of the Purdue model, e.g., from the supervision, monitoring, and control of physical industrial processes and data acquisition at level 2 to enterprise-level IT functionalities that provide business directions and functionalities related to the system at Level 5. Further, the containerized components may provide even higher-level functionalities such as coordination and/or management between multiple systems of an enterprise or even coordination between multiple enterprises. Accordingly, and advantageously, rather than utilizing the cumbersome and resource-costly traditional architecture of Purdue Levels 2-5 and all of the numerous data diodes, firewalls, DMZs, etc. necessary to secure a process control or automation system in the traditional architecture, the control architecture simply utilizes the set of containerized components executing in the compute fabric to perform the same or similar sets of process control and automation core functionalities and related functionalities without compromising security of the system, and in some arrangements, provide greater security than is possible with traditional architectures.

Moreover, different functionalities may be implemented by different containerized components within the compute fabric and so a single application or service can be configured into multiple different containerized components (e.g., different instances of the application or service being implemented in respective containers). In this manner, similar or related configured containers may execute in conjunction with different physical devices and may execute on different portions of the hardware platform of the compute fabric, for example, to create redundancy or hot spares, etc. Advantageously, various containerized components can be created (e.g., spun up) and/or removed as or when needed and, collectively, a group of containerized components may operate to form or provide a logical process control or automation system which may be implemented as a "virtual process control system" for controlling one or more industrial or physical processes.

Moreover, during execution, each containerized component can communicatively connect to a particular physical component or physical device or to another containerized component via a respective, packet-based connection over the transport network, so that each containerized component and each physical component can be identified within the system by a unique name or identity which can be associated with a particular address (e.g., IP address) within the transport network. To maintain a high level of communication security, containerized components and physical components may be authorized and authenticated on a per-component basis and optionally pair-wise with each other, e.g., by using keys or any other suitable authorization and authentication technique. Upon successful authorization and authentication, two endpoint components may communicate data, instructions, and other information with each other during a session that the two endpoint components establish over the one or more transport networks.

To further secure the system, the one or more transport networks may include one or more virtual private networks (VPNs) so that, for example, a specific containerized component communicatively connects with a specific physical component or with other containerized components using a point-to-point or peer-to-peer connection, such as a VPN, that is exclusive to only the specific containerized component(s) and the specific physical component(s). In this manner, the components may securely communicate data, messages, instructions, and/or other information with each other via the exclusive, point-to-point or peer-to-peer connection. The exclusive point-to-point or peer-to-peer connections may be established and/or torn down as or when needed. Still further, multi-point connections (e.g., VPNs or other suitable implementations) may be used to provide highly secured communications between a plurality of containerized and/or physical components. In some implementations, point-to-point or peer-to-peer networking connections may be utilized to further secure the system instead of or in addition to one of more point-to-point or peer-to-peer connections. Point-to-point connections, peer-to-peer connections, and VPNs of the transport networks may be implemented over one or more public and/or private networks, including private enterprise networks and/or the public Internet.

Advantageously, this architecture uses the compute fabric to abstract (e.g., disconnect) higher level, business logic services, subsystems, and other software components of the application layer from specific computing platforms or hardware associated with the compute fabric, and enables the higher-level software defined services, subsystems, and other software components to dynamically, automatically, and responsively direct and cause changes to the usage of the hardware and software resources of nodes and clusters of the computing platform using, for example, APIs, operating system (OS) support, and other services of the networking layer, without requiring any human intervention or direction. Thus, the management of the resources of the computing platform may be dynamically responsive to changes in configurations and to the needs of the higher-level software defined services, subsystems, and other software components of the application layer.

As will be understood, this new process control and monitoring system enables an enterprise, such as a drug manufacturing company, an oil refinery company, etc. to set up, control and monitor processes at various different sites, e.g., physical locations or physical areas located at any desired geographical location(s) using computing infrastructure located in the compute fabric and using physical devices (e.g., control devices such as controllers and field devices) located at the physical locations. Because each physical site is connected to the compute fabric, the enterprise has access to all of its assets via the compute fabric, and these assets can be viewed, controlled and managed from any geographical location and using any desired computing devices, such as business computers, laptops, phones, etc., via the compute fabric.

However, to provide greatly flexibility in this process control and monitoring system, it is important to be able to configure (i.e., set up) the various different enterprise components, especially those located at the different physical sites of the enterprise, from both enterprise configuration devices or computers connected directly to the compute fabric and from enterprise configuration devices or computers located at the individual physical locations or sites. This dual mode configuration, however, can be difficult to achieve because it requires that configuration changes made to devices or systems at the physical locations of the enterprise be tracked and updated regardless of whether these changes are made by a user at the physical location or by a user accessing the physical location via the compute fabric. Moreover, as different types of control systems (for example, different types of process control devices, process control system hardware and process control communication systems) may be located in and used at different ones of the physical locations of the same enterprise, it can be difficult to manage the configuration of each of the different physical locations (or subsets thereof) because the underlying hardware/software models used at each of the physical locations may be completely different, thereby requiring the configuration system to understand and to support multiple different configuration data schemas.

SUMMARY

An enterprise engineering and configuration system described herein enables engineering and configuration activities, such as implementing hardware or software configuration changes, to be performed centrally from a configuration device connected directly to the compute fabric of the enterprise, or to be performed locally at any physical location or site of an enterprise using a configuration device connected to or located at the physical location while maintaining a single integrated configuration database that stores configuration data for each of the multiple sites of the enterprise. This dual mode configuration system is flexible as it enables engineering and configuration changes to be made by users anywhere in the enterprise for any of the sites of the enterprise. More particularly, the engineering and configuration system described herein includes a common configuration database located in the compute fabric that accepts and manages configuration changes related to multiple different physical locations or sites making the configuration data for the entire enterprise available to any authorized user. Moreover, the configuration data in the configuration database is integrated in a manner that configuration data from different physical locations can be accessed, viewed and changed together. The configuration system described herein may use a common configuration framework for the configuration data, wherein the common configuration framework includes a configuration data model that is abstracted from the data or data model used at any of the physical locations or sites, thereby enabling the centralized configuration database to support, store and change configuration data for multiple different control systems at different physical locations or sites, or even at different portions of the same physical location or site.

The configuration system described herein includes a centralized configuration database stored in the compute fabric of the enterprise, wherein the configuration database stores configuration data for each of a plurality of systems (e.g., control systems or control system components) located at different physical sites of the enterprise using a common configuration schema or data model. The configuration system also includes a set of configuration database services or modules that manage reads from and writes to the enterprise configuration database to enable users to access any desired data from the enterprise configuration database via one or more computing devices located in or connected to the compute fabric of the enterprise. The configuration database services may also enable reads from and writes to the configuration database from one or more devices (or users) located at various different ones of the physical locations or sites of the enterprise.

In some embodiments, users or hardware/software at the physical locations or sites may access the centralized enterprise configuration database and may perform configuration activities for the devices or software (e.g., control modules) at the physical locations or sites (or may configure software stored in and executed in the compute fabric which performs control or other activities at the physical locations or sites). In this case, the user or a device at the physical location may access the compute fabric via a bridge device located at the physical location and may send one or more configuration messages to the enterprise configuration database via the bridge device. These configuration messages may include configuration changes made to devices or software at the physical location, may include read requests from the enterprise configuration database or some combination of the two. Thereafter, the configuration message is processed by a translation service which may be located in the compute fabric or at a physical location. In some examples, the translation services may be located in a computer device at the physical location but may still be in the compute fabric, or may be located in a computer device located in the cloud or other shared computing resource. In other cases, the translation service may be located in a computing device at the physical location. In any case, the translation service translates the configuration data within the configuration message from the configuration data schema used at the physical location (at a local configuration database), to the configuration data schema used in the enterprise configuration database to enable the configuration database services to understand the exact configuration data that is being requested or that is being changed or written to in the enterprise configuration database. Likewise, when configuration data is being read from or sent from the enterprise configuration database to the physical location, the translation services translate the configuration data from the common configuration data schema to the configuration data schema used at the physical location (e.g., to the configuration schema or data model used by the control or monitoring system at the physical location).

In a similar manner, configuration viewing devices located in the compute fabric or connected directly to the compute fabric may connect with and communicate with the configuration database services application in the compute fabric and may send configuration changes to or request configuration data from the centralized enterprise configuration database. Here, the configuration viewing devices may use any desired type of configuration application that uses any desired configuration data schema to enable the user to make configuration changes and to request configuration data. The enterprise configuration database services then translate these data reads and writes to the common configuration data schema to understand what configuration data in the enterprise configuration database is being read or written and makes the data reads and writes to the enterprise configuration database using the common configuration data schema. Additionally, configuration data read from the enterprise configuration database may be translated by the enterprise configuration database services to the particular data schema used by the configuration viewing device or application. In this manner, the enterprise configuration database services can support different configuration viewing programs (e.g., made by or provided by different control system manufacturers) and enable configuration changes and reads to be made to the enterprise configuration database by any of these different configuration devices or programs. Thus, for example, different users in the enterprise can use different configuration applications (e.g., a DeltaV configuration application, a Honeywell configuration application, an OPC UA configuration application, etc.) to access and make configuration changes to the enterprise configuration database and, thus, to different devices or components at the different physical locations (which may include control system hardware made by different control system device manufacturers or which support different control system communication and control paradigms).

Still further, the enterprise configuration database services may include a communication interface that performs communication interfacing within different configuration viewing (or changing) applications in or connected to the compute fabric of the enterprise, via, for example, one or more application programming interfaces (APIs). The enterprise configuration database services may also include a configuration data model that defines the configuration data schema used in the enterprise configuration database and that uses this data model to map configuration data and configuration data requests sent from the configuration viewing applications or other configuration viewers to access the correct configuration data within the configuration database, as defined by the configuration applications or viewers. Still further, the enterprise configuration database services may include a database storage abstraction layer that defines the specifics of and the manner in which data is actually stored in and accessed from the enterprise configuration database. This component enables different types of databases (which may use different database storage schemes or structures or technology) to be used as the enterprise configuration database, and this component manages actual data reads and writes to the database using the structure or data calls and data formats required by the particular database technology being used. This component makes the enterprise configuration database technology agnostic to database storage technology used in the compute fabric, as it enables different types of databases using different data storage and retrieval techniques or underlying technology to be used as the enterprise configuration database.

DETAILED DESCRIPTION

Figure 1:
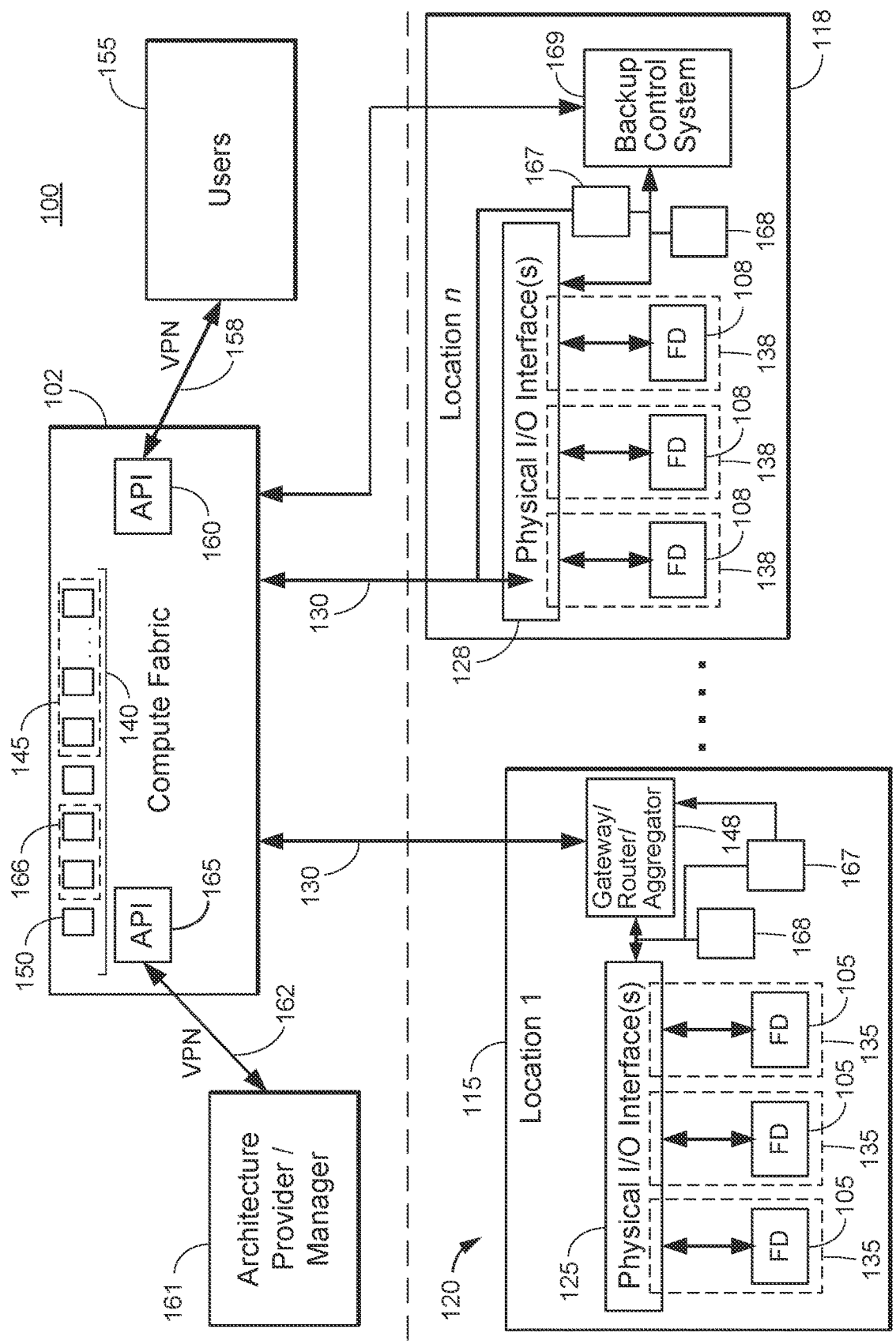
FIG. 1 is a block diagram of an example architecture of a Next Generation Process Control and Automation System ("NGPCAS") which may be utilized to control industrial and/or automation processes and in which an advanced engineering and configuration system may be implemented.

An engineering and configuration system (generally referred to as a configuration system) is described herein which may be used in a process plant and industrial control and/or automation system architecture relying on a shared compute fabric to implement control, monitoring and configuration activities in any enterprise having one or more process plant or industrial manufacturing or automation facilities. Generally speaking, the compute fabric of these systems is a high-performance computing system including loosely coupled storage, resource management, security, networking and parallel processing functions linked by high bandwidth interconnects (such as 10 Gigabit Ethernet), and may include any one or more of a commercial multipurpose platform such as Microsoft's Azure Services platform; platforms owned, operated, and maintained by an enterprise or system provider and dedicated to implementation of process control at one or more enterprises; compute clusters situated on-premises and local to a process plant; etc. Because the resources of the compute fabric may be shared among different process plants or sites within an enterprise, or by multiple enterprises each operating one or more process plants, and because the system architecture does not attempt to follow the well-known, generally followed and accepted Purdue model, the control and configuration systems described herein enable a variety of improvements and innovations in system configuration, control, monitoring, and management.

While the control and configuration architecture will be described in detail below, the following examples illustrate several scenarios implementing in a system the concepts described in this specification and highlight the advantages of such implementations. The examples should not be considered limiting in the functionality available, the personnel performing various tasks, the physical separation or location of various elements, or in any other manner. Instead, these examples are intended to introduce various system elements and aspects of the operation of the system, each of which will be described in greater detail elsewhere in this description.

Example 1

A system provider provides and manages a compute fabric serving one or more enterprises, and provides a variety of tools and programs for configuring, commissioning, controlling, and monitoring one or more process plants using the compute fabric. These tools and programs include tools for configuring control modules and control strategies to control the process plant, tools for configuring operator workstations to monitor and control the process plant, tools for performing asset management (e.g., tracking calibration, maintenance, etc.), and tools for instantiating and managing the control modules that, after being configured and instantiated in the compute fabric, ultimately control process plant, among others. Each enterprise included in a plurality of enterprises accesses and makes use of the compute fabric and the available tools and programs to implement one or more enterprise-owned and/or -operated industrial processes in one or more respective process plants. Each of the process plants implements various aspects of its process control via a variety of containerized applications and services instantiated in the compute fabric. These include control algorithms, input-output, and security functions, among others, and the use of the containerized applications and services may facilitate various quality-of-service (QoS) features, including load balancing, fault tolerance, and redundancy implemented and managed by either the system provider or the enterprise, or by the enterprise with assistance from the provider.

With these tools available, a first enterprise owner implements at a first process plant, a refinery, a continuous process producing various products by refining a petroleum product. That process plant has disposed therein a variety of field devices (e.g., valves, tanks, distillation columns, sensors/transmitters, and the like) that sense parameters in the refinery and perform control actions in response to control algorithms that use as inputs the sensed parameters. Each of the field devices has a corresponding input/output device that receives the signal(s) from the field device, coverts the signals into a common format (e.g., Ethernet packets), and transmits the data from the field devices to the compute fabric. A pre-configured gateway/router/aggregator, facilitating secure communication between the first process plant (e.g., I/O devices and field devices, collectively comprising a set of physical devices) and the compute fabric, is among the only non-field device or I/O device hardware that is located on the premises of the first process plant.

A configuration engineer for the enterprise and/or the process plant accesses the tools made available by the system provider to configure the operation of the process plant. The configuration engineer creates the necessary control algorithms by instantiating function blocks for receiving data from the field devices via the I/O devices and sending commands and data to the field devices via the I/O devices, instantiating various processing function blocks that utilize the data received from the field devices as input to a control algorithm and generate the outputs that are sent to the field devices, and implementing operator workflows that allow the plant operators to monitor and respond to conditions in the run-time process plant. However, in contrast to known, conventional or traditional systems, these function blocks and control modules are not downloaded to a dedicated hardware controller at the process plant. Instead, once the process plant is commissioned (e.g., the physical devices are installed and wired at the process plant), the function blocks and control modules are instantiated as containerized services and/or other types of micro-encapsulated execution environments ("MEEES," also referred to herein as "microservices" or "granules") in the compute fabric. However, a user or engineer at the enterprise may access configuration applications that operate in the compute fabric to view or to make configuration changes at one or more physical sites of the enterprise and may also access configuration applications that operate at one or more of the physical sites to make configuration changes at the site. In both cases, the configuration changes are sent to and stored in a configuration database the is assessable both from the compute fabric and from each of the physical sites of the enterprise.

Generally, a microservice, granule, or MEEE which is instantiated in the compute fabric may be an independent software process that can run on its own deployment schedule and can be updated independently of other microservices. Examples of MEEEs may include function blocks, control modules, control applications, and other applications and services which relate to business logic of the process plant and/or otherwise support the process plant, to name a few. Groups of microservices or MEEEs may interact collaboratively to achieve some desired outcome. For example, to control a reactor, multiple strategies such as Feed, Reactor, Products, Utilities, and Flare may defined by respective MEEEs, and this set of multiple MEEEs may cooperatively operate (e.g., in conjunction with each other) during runtime of the process plant to implement the desired reactor control strategy. In another example, for a process control analytics application, various MEEEs may be defined to execute respective statistical computations and/or statistical algorithms, and the various MEEEs may be combined as desired and executed in combination to provide an overall prediction analytics application. A single, individual microservice or MEEE may be configured to execute an application ranging from very broad (e.g., a control strategy of an entire system or plant) to very granular (e.g., only a portion of a control routine or control module). As such, due to its flexibility of being configurable to execute various process control and process control-related applications ranging from broad to granular, a microservice or MEEE is interchangeably referred to herein as a "granule."

At any rate, the configuration engineer may also use the configuration tools to specify various QoS metrics for each of the function blocks and control modules, for individual signals or variables, and for the process as a whole. Each of the microservices, MEEEs, or granules communicates with one another and with the I/O devices via one or more secured point-to-point (PTP) and/or peer-to-peer (P2P) connections (which may include one or types of secured, encrypted PTP and/or P2P connections, such as VPN(s)), and each is authenticated via a digital security certificate. These secured, point-to-point and/or peer-to-peer connections and security certificates are managed automatically within the compute fabric with minimal to no input from the personnel at the enterprise.

With respect to the QoS metrics, an orchestration service operating within the computing fabric (and provided by the system provider) implements various load balancing and redundancy schemes to ensure that the QoS metrics for the plant are met. For example, the orchestration service ensures that a redundant configured container is always instantiated for any configured container executing any portion of the control algorithm, and that the redundant configured container maintains corresponding inputs and outputs (i.e., maintains a parallel state) to the primary configured container such that, if there is a failure of the primary container, control may be shifted to the redundant container nearly instantaneously (e.g., within milliseconds). The orchestration service ensures that configured containers are executing on separate hardware and powered by separate power supplies to maintain sufficient redundancy according to policies set by the enterprise. For some microservices, configured containers, MEEEs, or granules, the orchestration service instead maintains redundant state databases storing the state of the microservices/configured containers/MEEEs/granules, such that if a microservice/configured container/MEEE/granule fails or is otherwise taken offline, a new microservice/configured container/MEEE/granule may be instantiated nearly instantaneously (e.g., within milliseconds) and restored to the state of operation of the previous instantiation of the configured container when it was taken offline.

The orchestration service also provides load balancing services to maintain sufficient memory, processing, and network resources to meet QoS requirements for individual microservices/MEEEs/granules and for the plant as a whole. For example, maximum latency requirements require certain configured containers to be executing on compute fabric resources that are physically closer to the process plant and/or have greater network bandwidth between the resources and the process plant.

To maintain security, and as described above, all containerized applications and services communicate via one or more secured, encrypted point-to-point connections, such as VPNs. In some cases, a pair of endpoints (e.g., a pair of containerized applications or services, or a containerized application/service and a physical component) communicates via a dedicated VPN, while other VPNs include multiple containerized applications/services communicating with one another via respective sessions established over the VPNs. Other VPNs facilitate communication between enterprise-level containerized applications/services and plant-level containerized applications/services, other VPNs still facilitate communication between provider level containerized applications/services and containerized applications/services at the enterprise and/or plant level, and still other VPNs facilitate communications between user interface devices and the system. In any event, any human user, and any third-party application executing to facilitate a service in the enterprise or the process plant, interacts with the system one or more APIs through which necessary actions may be performed after the user or third-party application is authenticated (e.g., using multi-factor authentication).

In this manner, relative to known systems, the control of the first process plant is implemented with fewer dedicated computing resources, while maintaining (or improving) QoS metrics, maintaining (or even improving) security, and removing or reducing the need to periodically and manually adjust the type or quantity of local computing resources according to changes in the process plant.

Example 2

At some point after the commissioning of the first process plant, the first enterprise owner decides to duplicate the first process plant in a second process plant. Because the control algorithms and necessary software are already configured for use with the first process plant, setting up the field devices and I/O hardware at the second process plant is among the most time-consuming portions of commissioning the process plant.

In this case, the enterprise owner opts to remove the physical I/O devices from the process plant setup and instead perform the functions of the I/O devices as microservices, MEEEs, or granules instantiated in the compute fabric. The enterprise owner installs the field devices at the site of the second process plant. Each field device is configured as it normally would be—with a device tag, ranges, limits, scale, and other data for operating the field device. Because the second process plant is a duplicate of the first process plant, each field device is configured and programmed according to its corresponding device in the first process plant, using an automated process to decrease the time required for commissioning. Each device is coupled, by its corresponding communication media, to a media converter that converts between the device's native communication media (e.g., Foundation Fieldbus, HART, WirelessHART, OPC UA, 4-20 mA, Ethernet, etc.) and an Ethernet protocol. Each media converter packetizes (in Ethernet packets) the variety of data received from the corresponding field device and transmits the packets to a pre-configured on-site gateway of the second process plant. The gateway facilitates secure communication between the second process plant (media converters) and the compute fabric, and is among the only non-field device hardware that is located on the premises of the second process plant.

The configuration engineer, having opened the stored configuration of the first process plant within a user interface application provided by the compute fabric, drags a loop over the compute fabric canvas (the workspace showing for the first process plant the configured containers instantiated in the compute fabric) to select all of the configured containers and, by dragging the selected configured containers to a new compute fabric canvas, copies to the second process plant the set of configured containers (e.g., containerized applications and services) instantiated in the first process plant.

The configuration engineer instantiates, within the compute fabric, for each field device of the second process plant, a digital twin of the field device and corresponding I/O microservices/MEEEs/granules, taking the place of the physical I/O devices that would previously have coupled physical field devices to the controllers. This digital twin is, to the rest of the process control software executing in the compute fabric, indistinguishable from the hardware field device operating in the process plant. The digital twin is configured identically, and maintains to the extent necessary (and possible, as described below) the same data as is present on the field device itself. That is, as the field device updates the values of measured parameters or status values, those values are uploaded, via the media converters, to the digital twins within the compute fabric. It is the digital twins, however, that interact with the instantiated function blocks, control modules, and other control algorithms in the compute fabric. By the same token, the function blocks, control modules, and other control algorithms instantiated in the compute fabric (or in a hardware controller) send commands and data to the digital twins, which communicate those commands and data back to the hardware field devices of the second process plant via the media converters.

With the hardware field devices in place and coupled via the media converters to the digital twins executing in the compute fabric, the configuration engineer instructs the compute fabric to bring the process online at the second process plant, e.g., by activating a single user control. Responsively, the compute fabric initializes the process control system, and the system is online and ready to begin testing and/or operating within minutes thereafter, vastly simplifying the process of bringing the second process plant online.

In addition to simplifying its commissioning, the digital twins contribute to the robustness of the operation of the second process plant. In the event that a particular field device becomes unavailable (momentarily or otherwise), the digital twin may prevent an abnormal condition in the operation of the process plant as a whole. For example, a momentary loss of connectivity or increase in latency between the process plant and the compute fabric may have no effect on the process as a whole, because the digital twins may continue to provide data (e.g., simulation data, presumed steady-state data, etc.) to the control algorithms (within safety parameters, of course) during the momentary anomaly. Similarly, if the self-reported (or system-determined) status for a sensor changes to indicate that the sensor value is no longer reliable, the digital twin may be programmed to provide data from another source (e.g., simulated values, values calculated based on other measured parameters, etc.) in place of the unreliable sensor data.

The use of the digital twins also contributes to the cost-effective maintainability of the process plant. In the event that a hardware sensor (e.g., a thermocouple or pressure sensor) fails, the sensor can, in many instances, be replaced without stopping or disrupting the operation of the process, because the digital twin can continue to provide data (simulated, or otherwise) to the control algorithms even when the hardware sensor is offline.

Example 3

With the first and second process plants up and running, the enterprise owner (or its users) can manage both of them at an enterprise level using a variety of tools available from the system provider. Because the various facilities owned by the enterprise are executing in the compute fabric, the enterprise owner may securely access data related to the process plants individually, or to the enterprise as a whole, at any time and from anywhere. As indicated above, all human and/or third-party application access to the system is provided via APIs, access to which requires multi-factor authentication. Thus, after authenticating, the user can access tools, metrics, and other functions that allow for the management of the enterprise and its various process plants.

The enterprise-level user can create or use any number of dashboards and tools for facilitating enterprise-level views of the process plants individually or collectively. The enterprise-level user may decide to view real-time production metrics (e.g., production output volumes, quality metrics, etc.) for a single plant, and also to compare real-time metrics between plants, charting metrics for the respective plants over time for comparison. Upon noticing that one plant is performing differently from the other (e.g., outputting higher quality product, operating more efficiently, etc.) the enterprise-level user may decide to dig more deeply into why the plants are performing differently. Turning to an application or service marketplace hosted by the system provider, the enterprise-level user may purchase or subscribe to an analysis service or tool, which, upon purchase or subscription is instantiated in the compute fabric and can be used by the enterprise-level user to analyze the performance of the process plants.

The analysis shows that the tuning of one of the process plants could be optimized to perform better, and recommends a different tool that can re-tune and optimize the process plant. The enterprise-level user may reach out to the control operators at the plant to inform them of the available tool. The tool is then subscribed to or purchased for the enterprise or for just the individual plant, and instantiated in the compute fabric at the plant level and/or at the enterprise level.

The tool may determine that the process plant requires retuning in a manner that requires an updated copy of one or more control algorithms. In that event, the tool proceeds (with input from the operator) to create updated control algorithms. The updated control algorithms are instantiated in the compute fabric, but are not initially placed in control of the process plant. Instead, the updated control algorithms are implemented in parallel (e.g., in simulation mode) with the active control algorithms to ensure that they will not adversely affect the operation of the process plant and will, in fact, improve the operation of the process plant. The operator then switches control of the process to the new control algorithms instantaneously (e.g., without interrupting the process) when satisfied that the updated control modules will function properly.

At the same time, the operator of one of the process plants may notice that the tuning of the process for which the operator is responsible appears to be fluctuating. The operator reaches out to a customer service representative from the system provider for assistance to determine what is causing the fluctuation in tuning, and using dashboards available to the system provider representative, they determine that the fluctuations in tuning may be the result of several related factors in the compute fabric including the movement of microservices/MEEEs/granules between hardware resources for load balancing, changes in available processing and network bandwidth, and physical distance between the compute fabric resources and the process plant in question. The customer service representative may recommend the use of a real-time tuning application.

The real-time tuning application monitors latency between the compute fabric and the physical resources in the process plant, and automatically adjusts the tuning of the control algorithms to account for changes in the latency as a result of network conditions, physical distance, and processor bandwidth. In this example, after implementing the real-time tuning application, the operator notices that the subject process is generally more stable.

However, if the real-time tuning application indicates that there is one control loop that the real-time tuning application is unable to automatically tune, the operator and customer service representative, working cooperatively, may determine that the control loop in question requires minimal latency and, as a result, the customer service representative may "pin" the configured containers related to the control loop to physical hardware resources in the compute fabric that meet the latency requirements and, in particular, that meet the latency requirements because of their physical proximity to the process plant in question. For good measure, the customer service representative may additionally dedicate specific hardware resources for the configured containers related to the control loop, to prevent those resources from becoming loaded to an extent that would cause latencies to detune the process.

Example 4

The enterprise owner, now having multiple process plants running, may determine that it would be more efficient to consolidate the operators that manage the various processes. While some number of maintenance and other personnel must be physically present at each process plant, the fact that the compute fabric is securely accessible, essentially from anywhere with a sufficient network connection, allows the operators to be located anywhere. Accordingly, the enterprise owner may determine that it can consolidate all of its operations into three operations centers, spaced roughly equally around the world, such that its operations can continue 24 hours/day without any of its employees working outside of first shift (business) hours in their respective locale.

The enterprise owner staffs each operations center with operators in numbers sufficient to operate all of its plants operating around the world. As a result of the consolidated operations centers, the numbers of staff required for redundancy (e.g., to account for staff illnesses, vacations, etc.) is reduced.

Example 5

Separately, a second enterprise that is looking to improve efficiency in its traditionally-architected (first) process plant and to expand to add additional process plants desires to do so by implementing a system provided by the system provider. The system provider establishes accounts for the second enterprise, and the second enterprise personnel subscribe to and/or purchase the necessary and desired tools and packages. The second enterprise's configuration engineers use tools available from the system provider to convert the configuration files that currently operate the legacy controllers in the first process plant into a configuration of containerized services (e.g., microservices, MEEEs, or granules) that will execute on the compute fabric. At the same time, the system provider arranges to install, at the site of the first process plant, a pre-configured gateway securely coupling the I/O devices to the compute fabric. After ensuring that the compute fabric is configured to meet the necessary QoS metrics, the configuration engineers and operators of the first process plant simulate operation the process plant using the configured compute fabric to confirm that it appears to be properly configured, and then bring the process plant online using the compute fabric.

While the newly reconfigured process plant is operating using the compute fabric, and the legacy controller hardware is no longer operating the process plant, the second enterprise owner, rather than decommissioning the legacy controller configuration, maintains it. In fact, the system provider assists the enterprise personnel in configuring the legacy configuration of the first process plant such that, in the event that the compute fabric (or the network connection thereto) becomes unavailable or unstable, control of the process plant can fail over to local control using the legacy system. As such, the legacy system is run in parallel as a backup control solution.

At the same time, the second enterprise owner may decide to keep the safety-instrumented systems (SIS) for the process in place at the first process plant, rather than migrating them to the compute fabric.

As the second enterprise owner moves toward expanding to add new process plants, the second enterprise owner purchases the necessary field devices for installing in and operating those process plants. Each of the field devices includes a burned-in hardware ID that indicates its make, model, options, and the like. Upon purchasing the field devices, the burned-in hardware IDs for the purchased devices are registered to the second enterprise owner in a database that facilitates the configuration of the field devices in the new process plants. The configuration engineers, while configuring the control modules, can select each device from the database, causing the compute fabric to create a digital twin for each that is programmed accordingly. A plant engineer configuring the physical field devices in the new process plant scans each device and places each device according to its hardware ID. When the physical devices are connected to the compute fabric via their respective media converters, each is automatically associated with its digital twin based on the hardware ID, and is programmed (if programmable) according to the programming of its digital twin.

While the additional process plants are configured to operate on remote compute fabric, the second enterprise owner decides that, because only one network provider serves some of the process plant locations, it remains prudent to have a control solution that can maintain safety, if not full operation, of the process plant locations in the event that the network connection to the remote compute fabric becomes unavailable. For that reason, the enterprise owner physically locates certain compute fabric resources on-site such that, in the event of a communication failure between a process plant and the remote compute fabric, the on-premises compute fabric can maintain safety and/or operation of the process plant. The on-premises compute fabric resources execute redundant containerized services, microservices, MEEEs, or granules (orchestrated by the orchestrator service in the compute fabric) such that control of the process plant can fail over to the on-premises compute fabric if necessary.

As will be understood, in each of these examples, a robust engineering and configuration system is needed to enable users of an enterprise (wherein such users may be engineers or may be automated tools, such as automatic tuning applications) to make configuration changes to the various software and hardware elements of the enterprise, including elements located in and executed within the compute fabric of the enterprise and elements located at one or more of the physical locations or sites of the enterprise. It is desirable that this configuration system is integrated, in that it stores, manages and integrates configuration data from all of the elements of the enterprise, including elements executed in the compute fabric and elements located at and/or executed at each of the physical locations or sites. Moreover, because in some of the examples above, one or more different process control system hardware (such as control hardware made by different manufacturers) may be located at different sites of an enterprise (or even at the same site of an enterprise), it is desirable that the configuration system be able to integrate and manage configuration data that is generated or used in different types of control systems that use different underlying data or configuration schemas. It is also desirable that this configuration system enables configuration changes to be made from any physical location in the enterprise, including from configuration viewing or management devices connected directly to the compute fabric of the enterprise and from configuration viewing or management devices located at the physical locations or sites of the enterprise.

Example Next Generation Process Control and Automation System Architecture

FIG. 1 is a block diagram of an example architecture of a Next Generation Process Control and Automation System ("NGPCAS") 100 which may be utilized to control industrial and/or automation processes and in which an advanced configuration system may be located. For example, the NGPCAS 100 may be used by chemical, petroleum, industrial, manufacturing, filling and packaging, or other types of enterprises to manufacture, refine, transform, generate, or produce physical materials or products. For ease of reading, the NGPCAS 100 is interchangeably referred to herein as the "architecture 100" or the "system 100."

The NGPCAS 100 includes a compute fabric 102 communicatively connected to a plurality (e.g., a pool) of physical devices 105, 108. The plurality or pool of physical devices 105, 108 includes devices that perform physical functions utilized to control an industrial or automation process provided by an enterprise. For example, the plurality of physical devices 105, 108 may include field devices such as valves, valve positioners, actuators, switches, regulators, sensors, (e.g., temperature, pressure, level and flow rate sensors), spectrometric devices, pumps, motors, transmitters, and the like, some of which may be intelligent field devices. Some of the physical devices 105, 108 may have respective on-board processors, memories, and computer-executable instructions stored on the memories, where the stored computer-executable instructions are executable by the on-board processors to perform, for example, control and/or other types of calculations, alarming functions, and/or other functionality associated with controlling the industrial or automation process using the physical device 105, 108. Physical devices 105, 108 may responsively operate and/or change their behavior based on control signals and/or other instructions received from the compute fabric 102, as is described in more detail elsewhere herein.

The pool of physical devices 105, 108 of the system 100 may be disposed or physically located at different physical locations, sites, plants, or environments 115, 118 (such as illustrated in FIG. 1), or the pool 105, 108 of physical devices may be entirely disposed or located at only a single physical location, site, plant, or environment (not shown). The one or more physical locations 115, 118 (also referred to as "sites") at which the physical devices 105, 108 are disposed are generally and collectively referred to herein as the "field environment 120" of the system 100. For example, the field environment 120 of the NGPCAS 100 may include one or more buildings, fields or outdoor sites, plants, oil rigs or platforms, rooms, cabinets, etc. in or at which at least one physical device 105, 108 of the system 100 is physically located and in which the at least one physical device 105, 108 operates in conjunction with the compute fabric 102 to control the industrial process or automation process. The term "field environment 120" is interchangeably referred to herein as the "process environment 120," the "automation environment 120," the "plant environment 120," the "physical environment 120" of the NGPCAS 100, or a physical site or physical location of the enterprise.

Each physical location or site 115, 118 at which at least one physical device 105, 108 of the system 100 is disposed includes one or more on-premises physical I/O (Input/Output) interfaces 125, 128 configured to receive, condition, and deliver (e.g., to the compute fabric 102 via one or more transport networks 130) I/O signals or I/O data generated by the on-premises physical devices 105, 108, and optionally to provide control signals, instructions, and/or other information generated by the compute fabric 102 and received at the location 115, 118 via the one or more transport networks 130 to designated recipient on-premises physical devices 105, 108. Each on-premises physical device 105, 108 physically connects to the on-premises physical I/O interfaces 125, 128, e.g., via respective wired or wireless links. As such, in an embodiment, the on-premises physical I/O interfaces 125, 128 may include a pool of I/O hardware ports (which may include wired and/or wireless ports or interfaces) and/or other I/O hardware resources that are shared among multiple on-premises physical devices 105, 108 at a respective location 115, 118. Additionally or alternatively, the on-premises physical I/O interfaces 125, 128 may include individual instances of I/O hardware resources, where each individual instance is included in or exclusively connected to one and only one on-premises physical device 105, 108. Generally speaking, the present disclosure utilizes the term "physical component" 135, 138 to collectively refer to the combination of a single physical device 105, 108 (e.g., a single field device) and the physical I/O interface 125, 128 utilized by the single physical device (e.g., the attendant physical I/O interface(s) of the single physical device 105, 108) to communicate information over the transport networks 130. As such, terminology-wise, the NGPCAS 100 includes a pool of physical components 135, 138, each of which includes an individual field device 105, 108 and the respective physical I/O interface resources 125, 128 that the individual field device 105, 108 utilizes to communicate with the compute fabric 102. Generally speaking, the physical components 135, 138 of the NGPCAS 100 operate or would be included in Level 0 of the Purdue model of a traditional process control system.

As shown in FIG. 1, the physical components 135, 138 at each location 115, 118 communicatively connect to the compute fabric 102 via one or more transport networks 130. The one or more networks 130 may include one or more wired and/or wireless networks. Further, the one or more networks 130 may typically include one or more packet networks, such as one or more Ethernet-compatible packet networks, each of which may or may not include an advanced physical layer (APL). As such, the physical I/O interfaces 125, 128 enable the I/O data or information generated by the physical devices 105, 108 to be delivered in packetized form via the one or more transport networks 130. For example, the physical I/O interfaces 125, 128 may convert the I/O data or information generated by the physical devices 105, 108 into packets, may wrap the I/O data or information in packets, or may otherwise transform the I/O data or information into a packetized format for delivery to the compute fabric 102 via the packet network(s) 130.

In some embodiments, a physical site or location 115 may include a gateway/router/aggregator 148 which, for ease of discussion, is referred to herein as a "gateway 148." Generally speaking, the gateway/router/aggregator 148 receives outgoing data and information that is to be sent to the compute fabric 102 and causes the outgoing data and information to be sent over the transport networks 130 (e.g., in individual packets and/or in packets in which data/information generated by multiple physical components 138 are aggregated into a single packet), and the gateway/router/aggregator 148 receives incoming data and information that is received from the compute fabric 102 (e.g., in individual packets and/or aggregated packets), and routes the information, instructions, and/or data included therein to designated recipient physical components 138 at the site 115. A physical location may include respective gateway 148 (e.g., location 115), a physical location may exclude any gateways 148 (e.g., location 118), and in some configurations, multiple physical locations may share a single gateway 148 (not shown in FIG. 1, for example).

Turning now to the compute fabric 102 of the NGPCAS 100, the compute fabric 102 is implemented on a scalable hardware platform, portions of which can be physically located across one or more physical locations (not shown in FIG. 1). The physical locations at which at least portions of the hardware platform of the compute fabric 102 are physically located may or may not be the physical locations 115, 118 at which the physical devices 105, 108 of the system 100 are physically located. For example, an entirety of the hardware platform on which the compute fabric 102 is implemented may be remotely located from any location 115, 118 of the field environment 120 of the system 100 (e.g., as illustrated in FIG. 1), or a respective portion of the hardware platform on which the compute fabric 102 is implemented may be located at one or more of the physical device locations 115, 118 of the field environment 120 (not shown in FIG. 1). In some embodiments, at least a portion of the compute fabric 102 may be implemented on a cloud computing platform, the hardware of which may be disposed remotely from and/or at physical locations 115, 118 of the field environment 120 of the system 100.

The compute fabric 102 of the NGPCAS 100 supports the creation, execution, removal, maintenance, administration, and management of a plurality or pool of containerized applications and/or services 140, that are generally referred to interchangeably herein as a "plurality or pool of containerized components 140," a "plurality or pool of micro-encapsulated execution environments 140 (MEEEs 140)," or a "plurality or pool of granules 140" of the NGPCAS 100. That is, the pool of containerized components/micro-encapsulated execution environments/granules 140 may include applications and/or services that have been configured into containers and/or other types of micro-encapsulated execution environments or granules, each of which can execute to provide a specific functionality and/or operation utilized by the system 100 to control the physical devices 105, 108, to support process and/or automation control and system management, and to administer, maintain, and manage the system 100 and its components across the lifetime of the system 100. Generally speaking, the containerized components/MEEEs/granules 140 of the NGPCAS 100 provide functionalities that traditional process control and automation techniques typically implement via a plethora of systems, networks, computing devices, DMZs, firewalls, and applications operating across Levels 1-5 of the Purdue model, e.g., from the basic control of physical industrial equipment and processes of the system 100 at Level 1 to enterprise-level IT functionalities that provide business directions and functionalities related to the system 100 at Level 5. Further, the containerized components/MEEEs/granules 140 may provide even higher-level functionalities such as coordination and/or management between multiple systems 100 of an enterprise or even coordination between multiple enterprises. Accordingly, and advantageously, rather than utilizing the cumbersome and resource-costly traditional architecture of Purdue Levels 1-5 and all of the numerous data diodes, firewalls, DMZs, etc. necessary to secure a process control or automation system in the traditional architecture, the NGPCAS 100 simply utilizes the set of containerized components/MEEEs/granules 140 executing in the compute fabric 102 to perform the same or similar set of process control and automation core and related functionalities without compromising security of the system 100, and often, with increased security for the system 100. A more detailed discussion of security techniques utilized within the architecture of the NGPCAS 100 is provided elsewhere within this disclosure.

Typically, different functionalities are implemented by different containerized components/MEEEs/granules 140 within the compute fabric 102. A single application or service can be configured into multiple different containerized components/MEEEs/granules 140 (e.g., different instances of the application or service implemented in respective containers), if desired, for example, to execute in conjunction with different physical devices, to execute on different portions of the hardware platform of the compute fabric 102, to create redundancy or hot spares, etc. Various containerized components/MEEEs/granules 140 can be created (e.g., spun up) and/or removed as or when needed by the system 100. Collectively, a group of containerized components/MEEEs/granules 140 may operate to form or provide a logical process control or automation system 145 (also referred to herein interchangeably as a "virtual process control system" 145) for controlling one or more industrial or physical processes by controlling and utilizing the physical components 105, 108 disposed in the field environment 120 of the NGPCAS 100. Typically, but not necessarily, the group of containerized components/MEEEs/granules 140 forming the logical process control system 145 is a subset of the entirety of containerized components/MEEEs/granules 140 provided by the compute fabric 102.

During execution, each containerized component/MEEE/granule 140 can communicatively connect to a particular physical component 135/138 or to another containerized component/MEEE/granule 140 via a respective, packet-based connection over the transport networks 130. As such, each containerized component/MEEE/granule 140 and each physical component 135/138 of the NGPCAS 100 is identified within the system 100 by a unique name, identifier, or identity which can be associated with a particular address (e.g., IP address) within the transport networks 130. Generally speaking, a physical component 135/138 may be a sender or provider of I/O data and information that one or more containerized components/MEEEs/granules 140 receive or consume. In some scenarios, a containerized component/MEEE/granule 140 can be a sender or provider of control signals or other instructions that a physical component 135/138 receives or consumes. In some scenarios, a containerized component/MEEE/granule 140 can be a sender or provider of data that another containerized component/MEEE/granule 140 receives or consumes. To maintain security of the NGPCAS 100, containerized components/MEEEs/granules 140 and physical components 135/138 may be authorized and authenticated on a per-component basis and optionally pair-wise with each other, e.g., by using keys or any other suitable authorization and authentication technique. Upon successful authorization and authentication, two endpoint components 140, 135/138 may communicate data, instructions, and other information with each other during a session that the two endpoint components 140, 135/138 establish over the one or more networks 130.

To further secure the NGPCAS 100, the one or more transport networks 130 may include one or more secured, point-to-point (PTP) and/or peer-to-peer (P2P) connections, which may include one or more secured, encrypted point-to-point and/or peer-to-peer connections such as virtual private networks (VPNs) and other types of secured, encrypted PTP and/or P2P connections. In an embodiment, a specific containerized component/MEEE/granule 140 communicatively connects with a specific physical component 135/138 using a secured, encrypted point-to-point or peer-to-peer connection (such as a VPN or other suitable implementation) that is exclusive to only the specific containerized component/MEEE/granule 140 and the specific physical component 135/138. For example, the specific physical component 135/138 and the specific containerized component/MEEE/granule 140 can be the endpoints of an exclusive point-to-point VPN that is utilized by only the two endpoint components 135/138 and 140 (e.g., and by no other components of the system 100) so that the components 135/138, 140 may securely communicate data, messages, instructions, and/or other information with each other via the exclusive, point-to-point VPN. In a similar manner, a particular containerized component/MEEE/granule 140 can communicatively connect with another particular containerized component/MEEE/granule 140 using a secured, encrypted peer-to-peer (P2P) connection (which may or may not be implemented via a VPN) that is exclusive to only the two containerized components/MEEEs/granules, and the two containerized components/MEEEs/granules may securely communicate data, instructions, and/or other information with each other via their exclusive, secured and encrypted peer-to-peer connection. The exclusive point-to-point and/or peer-to-peer connections between a single containerized component/MEEE/granule 140 and either a single physical component 135/138 or a single other containerized component/MEEE/granule 140 may be established as or when needed, and may be torn down when desired (e.g., upon completion of a data exchange, when system resources need to be freed up, etc.).

In an embodiment, a single physical location 115, 118 can be communicatively connected to the compute fabric 102 via a secured, encrypted location-to-location PTP or P2P connection (such as a location-to-location VPN or other suitable implementation) that is exclusive to the specific location 115/118 and the compute fabric 102 (not shown). Physical components 135/138 disposed at the specific location 115/118 and containerized components/MEEEs/granules 140 executing on the compute fabric 102 may communicate data and information to each other via the location-to-location PTP or P2P connection. To illustrate, in the example arrangement shown in FIG. 1 Location 1 (reference 115) includes an on-premises gateway/router/aggregator 148 that establishes a location-to-location VPN with the compute fabric 102, e.g., so that the on-premises gateway 148 is one endpoint of the location-to-location VPN, and a VPN gateway application 150 executing on the compute fabric 102 is the other endpoint of the location-to-location VPN. Containerized components/MEEEs/granules 140 and physical components 105 disposed at the location 115 can authenticate to the location-to-location VPN and establish respective sessions over the location-to-location VPN (e.g., via the VPN gateway application 150 and the on-premises gateway 148) for communicating data and information with each other. Additionally or alternatively, the architecture 100 may support subnets of the location-to-location VPN, so that various physical components 135/138 disposed at the location 115 and various containerized components/MEEEs/granules 140 communicate with each other via one or more subnets within the location-to-location VPN. Further, in the above illustration, types of secured, encrypted PTP and/or P2P connections other than VPNs may be additionally or alternatively utilized.

In an embodiment, a multi-location (e.g., multi-point) secured, encrypted connection may exclusively service the compute fabric 102 and the physical components 135/138 that are disposed at multiple, selected physical locations 115, 118 of the system 100, where the selected physical locations are a subset of an entirety of all physical locations serviced by the system 100. In this embodiment, each of the multiple physical locations 115, 118 may include a respective on-premises gateway 148 to the multi-location secured, encrypted connection, and may be associated with one or more gateway applications 150 executing on the computing fabric 102. Various physical components 135/138 disposed at the multiple locations and the containerized components/MEEEs/granules 140 corresponding to the multiple locations may authenticate to the multi-location secured and encrypted connection, and may establish sessions over the multi-location secured and encrypted connection (e.g., via the one or more gateway applications 150 and the respective on-premises gateways 148) for sending and receiving data and information to/from other components 140, 135, 138. A multi-location, secured encrypted connection may be implemented by using a VPN or other suitable mechanism, as desired, such as multiple PTP and/or P2P connections, point-to-multipoint (PTM) connections, etc.

In an embodiment, all of the containerized components/MEEEs/granules 140 of the compute fabric 102 and all of the physical components 135/138 of all of the physical locations 115/118 of the NGPCAS 100 may be serviced by a single, system-wide secured, encrypted connection, which may be implemented as a system-wide VPN or other suitable type system-wide, secured, encrypted connection. Each of the containerized components/MEEEs/granules 140 and the physical components 135/138 of the system 100 can authenticate to the system-wide connection, and can establish sessions with other components 140, 135, 138 over the secured, encrypted system-wide connection (e.g., via respective on-premises gateways 148 and one or more gateway applications 150) for sending and receiving data and information to/from the other components 140, 135, 138.

Further, if desired, various secured, encrypted PTP, P2P, PTM, and/or multi-point connection techniques may be combined (e.g., by utilizing subnets) to provide even more security. For example, a specific physical component 135/138 and a specific containerized component/MEEE/granule 140 can establish and utilize an exclusive point-to-point VPN as a subnet of a location-to-location VPN, a group of containerized components/MEEEs/granules 140 may be included in a subnet supported by the computing fabric 102, etc. Still further, any of the secured, encrypted connection techniques used within the NGPCAS 100 may be utilized in conjunction with endpoint authorization and authentication techniques to thereby provide even greater security for the NGPCAS 100.

Still further, in some implementations and as discussed above, in addition to or instead of using VPNs, the one or more transport networks 130 may utilize one or more point-to-point private connections (such as point-to-point and/or peer-to-peer Ethernet connections over private enterprise networks, and/or other types of secured, encrypted PTP, P2P, MTP, and/or multi-point connections) to securely deliver information between components of one or more NGPCAS systems 100. For example, point-to-point private connections can be established between two components 138, 140, between a physical site 115, 118 and the compute fabric 102, etc. For ease of discussion herein, though, the description refers to "VPN" techniques (not for limitation purposes) but to generally and categorically describe secured transport over the networks 130, although it is understood that any of the systems, methods, and techniques described herein may additionally or alternately utilize other types of secured, encrypted point-to-point, peer-to-peer, and/or multi-point connections for secured transport.

A user 155 of the NGPCAS 100 may authenticate to a VPN 158 in order to interact with the NGPCAS 100 (e.g., to interact with components 140, 135/138 of the NGPCAS 100) to, for example, view or obtain data and/or other information, change parameter values, configure or modify configurations of control routines and other aspects of the system 100, etc. As utilized herein, a "user" 155 may be a person or human user, or a user 155 may be an application or service executing on an external computing device that is not included in the system 100, e.g., an automated user. The users 155 depicted in FIG. 1 may be equivalent to the people and applications/services which accessed data and information related to a traditional process control or automation plant at any of Levels 1-5 of the Purdue model, for example.

A human user 155 may be a person who is an agent of the enterprise that owns, manages, operates, or otherwise is associated with the NGPCAS 100. For example, a user 155 may be an enterprise configuration engineer, system operator, asset manager, supply chain manager, project or product manager, technician, installer, authorized third-party (e.g., a contractor), business manager, etc. Typically, a human user 155 interacts with the NGPCAS 100 via a computing device operated by the user (e.g., laptop, tablet, mobile computing device, in-vehicle computing device, etc.) on which an application, web browser, or similar executable executes to provide both a user interface operable by the human user 155 and a secure communicative connection with the NGPCAS 100 via a VPN 158. For instance, to utilize his or her computing device to interface with the NGPCAS 100, a human user 155 may utilize a particular MEEE 140 that has been configured and authorized to execute at the user-operated computing device (e.g., an app that has been downloaded from the compute fabric 102), or the human user 155 may utilize a web browser executing at the user-operated computing device. In another example, a user 155 may be an automated user such as an external application or service, e.g., an application or service executing on an external computing device or system. An automated user 155 may not provide any user interface for human users, yet nonetheless may establish a communicative connection with the NGPCAS 100 via the VPN 158 to obtain or provide data and/or other information. Examples of automated users 155 include third-party generated applications, external data sources (such as weather data sources, materials management systems, etc.), and the like. In some situations, an automated user 155 may be a particular containerized component or MEEE 140 that has been configured and authorized to execute on a remote computing device or system such as an automated tuning application.

At any rate, irrespective of whether the user 155 is a human user or an automated user, the user 155 utilizes (via the VPN 158 to which the user 155 has authenticated) an API (Application Programming Interface) 160 to securely access data and/or other information at the NGPCAS 100. In an example implementation, different APIs 160 may be utilized by a user 155 to access different containerized components/MEEEs/granules 140 and physical components 135/138 of the compute fabric 200. In an additional or alternate implementation, a single API 160 may be utilized by the user 155 to access the NGPCAS 100, and the API 160 may form communicative connections, within the NGPCAS 100, with containerized components/MEEEs/granules 140 and physical components 135/138 as necessary to obtain or provide desired data and/or information to/from the user 155. The one or more APIs 160 may themselves be containerized components/MEEEs/granules 140 of the compute fabric 102, for example.

A particular user 155 of interest that is depicted separately in FIG. 1 is an architecture provider/manager 161 of the NGPCAS 100. Generally, the architecture provider/manager 161 provides administration, management, and support of the NGPCAS 100 and optionally of other systems 100 of the enterprise and/or one or more systems of other enterprises (e.g., of the systems' respective architectures, hardware and software resources, etc.). For example, the architecture provider/manager 161 may be under the purview of a provider of the system 100. The architecture provider/manager 161 may have exclusive access to a set of applications and services (e.g., which may, in an embodiment, be a subset of an entirety of the set of containerized components/MEEEs/granules 140 provided by the compute fabric 102) which may be created, configured, and/or executed by the provider and/or manager 161 of the NGPCAS 100. In a sense, the architecture provider/manager 161 administers and manages the architectural platform resources utilized by one or more NGPCASs 100 via this set of applications and services and, as such, may typically perform logic functionalities of a broader scope, such as engineering across various enterprise systems; providing an application/service "store" that includes a library of various applications and/or services, instances of which the architecture provider/manager 161 can configure and distribute to NGPCASs 100 for their uses; distributing and/or re-allocating system resources among different physical locations; etc. Each application or service that is created, configured, and utilized by the architecture provider/manager 161 may be implemented by one or more containerized components/MEEEs/granules 140. Additionally, as shown in FIG. 1, the architecture provider/manager 161 (whether a human user or an application or service executing on a remote computing device) may authenticate to a VPN 162, and may utilize one or more APIs 165 to securely read and/or write data and/other information, send instructions, and/or otherwise interface with various other containerized components/MEEEs/granules 140 and physical components 135/138 of the NGPCAS 100. The one or more APIs 165 may themselves be containerized components/MEEEs/granules 140 of the compute fabric 102, for example.

In an embodiment, different subsets of containerized components/MEEEs/granules 140 may communicate with a particular physical component 135/138, a particular location 115, a particular set of multiple locations, an entirety of all of the physical locations of an enterprise, or respective physical components and/or respective physical locations of multiple, different enterprises via respective VPNs 162. For example, containerized components/MEEEs/granules 140 that are exclusively utilized by the architecture provider/manager 161 may communicatively connect with other containerized components/MEEEs/granules 140 and/or physical components 135/138 of an enterprise via a different, provider-specific VPN 162 than the VPN(s) utilized by the other containerized components/MEEEs/granules 140 of the enterprise to communicate with the physical components 135/138 of the enterprise location(s). In another example, the containerized components/MEEEs/granules 140 that are provided by the architecture provider/manager 161 may utilize a first enterprise-specific VPN 162 to communicate with containerized components/MEEEs/granules 140 and physical components 135/138 of a first enterprise, and may use a different, mutually exclusive enterprise-specific VPN to communicate with containerized components/MEEEs/granules 140 and physical components 135/138 of a second enterprise (not shown). As such, the architecture provider/manager 161 is able to securely and independently administer and manage the respective resources of different portions of a single enterprise and/or of different enterprises in a highly secure manner. Indeed, by using one or more of the VPN techniques described herein, either alone or in combination, the security of the NGPCAS 100 (and in some situations, of multiple NGPCASs 100 supported by the architecture provider/manager 161) may be customized as desired or needed.

Thus, in view of the above discussion, containerized components/MEEEs/granules 140 provided by the compute fabric 102 of the NGPCAS 100 include run-time logic functionalities (e.g., control and automation logic, data acquisition, etc.) that traditional process control and automation systems typically implement at Levels 1 and 2 of the Purdue model. The containerized components/MEEEs/granules 140 also include other logic functionalities that are related to the run-time logic and that traditional process control and automation systems typically implement at Levels 2 and 3 of the Purdue model, such as: system and component deployment; engineering; configuration; provisioning; commissioning; security of the system, devices, applications/services, and users; safety logic and systems; networking; monitoring; analytics; maintenance and diagnostics of the industrial process and equipment/assets; simulation; testing; fault and performance degradation detection and repair/recovery; operator interfaces; redundancy, backup, and other functionality related to availability of the system 100 and its components and equipment; historization of data; regulatory compliance; management of manufacturing or production workflow, execution, and operations; etc. Further, the containerized components/MEEEs/granules 140 may include logic functionalities that are typically provided in traditional process control systems at the higher Levels 4-5 of the Purdue model, such as enterprise resource planning, production scheduling, material use, shipping, inventory levels, and other enterprise-level functionalities. Still further, such containerized components/MEEEs/granules 140 can include logic functionalities that are introduced into the compute fabric 102 via third parties, such as applications and/or services that have been authored by third-parties, and that have been approved and authorized by the enterprise to be utilized within the NGPCAS 100.

Further, the set of containerized components/MEEEs/granules 140 provided by the compute fabric 102 may include containerized components/MEEEs/granules 140 of a networking layer (not shown in FIG. 1) of the compute fabric 102, where such containerized components provide lower-level logic functionalities which can be utilized by or with respect to other containerized components/MEEEs/granules 140 as needed. Such lower-level logic functionalities may include, for example, the set of APIs 160, 165 that are utilized by users 155 to interface with various containerized components/MEEEs/granules 140 and physical components 135/138 of the NGPCAS 100; compute functionalities (e.g., for assigning and re-assigning various containerized components to compute fabric nodes Ny and/or data center clusters Cx, which is discussed in more detail elsewhere within this document); storage functionalities (such as management and allocation of storage areas for working data associated with an executing containerized component); networking functionalities (e.g., for data and information delivery between various containerized components, mechanics thereof, timing, etc.); other services which may be utilized by containerized components/MEEEs/granules 140 executing at an application layer (not shown in FIG. 1) of the compute fabric 102 (e.g., discovery, security, encryption, certificate authority, key management, authentication, time synchronization, service location, console support, service life cycle management, etc.); and the like.

Still further, the set of containerized components/MEEEs/granules 140 provided by the compute fabric 102 may include still lower-level logic functionalities (such as calculations, utilities, primitives, and the like) which may be utilized by containerized components/MEEEs/granules 140 at the application layer and at the networking layer of the compute fabric 102. Examples of such functionalities include computational functions (e.g., data aggregations and/or manipulations, such as averages, maximums, minimums, etc.); more complex calculations or algorithms (e.g., principal component analysis (PCA), partial least squares (PLS) predictions, and other types of statistical calculations and/or analytics); and process control-specific or automation-specific calculations (e.g., function block, shadow block, control module operations, etc.), to name a few.

Additionally, FIG. 1 depicts Location n 118 as including a backup control system 169, which may be partially or entirely failed-over to maintain run-time operations of the process control system 100 at Location n 118 when one or more remote portions of the system 100 (e.g., the transport networks 130, the compute fabric 102, etc.) are compromised, uncommunicative, or otherwise not operational. For example, the backup control system 169 may include a traditional, legacy control system, and/or may include a backup copy or virtual twin of at least a part of the virtual process control system 145 which executes on a computing platform that is located on premises to Location n 118.

Therefore, in view of the above, the compute fabric 102 of the NGPCAS 100 provides process control and automation functionalities and related functionalities that are required to be performed in traditional process control systems by different equipment and systems dispersed across Purdue Levels 1-5, and also provides additional, lower-level functionalities (e.g., from networking and platform resource management to calculations and primitives) which are available system-wide. Further, and advantageously, the NGPCAS 100 removes the necessity of DMZs at Level 3.5 and at other levels as well as eliminates the need for firewalls, data diodes, and other architectural security equipment and mechanisms utilized in traditional process control and automation systems, while simultaneously providing a more secured system 100.

In particular, as discussed above, any data or information transfer between two components (e.g., two different containerized components/MEEEs/granules 140, or a containerized component/MEEE/granule 140 and a physical component 125/135) of the NGPCAS 100 may be accomplished via a private session over a VPN, for example, a VPN utilized by the compute fabric 102 and a physical location at which physical components 102 are located, via a private VPN that is utilized by only the endpoint components, and/or one or more other types of VPNs. Further, for security purposes, any and all users 155/160 may be required to access the system 100 via one or more APIs 162/165 and a private VPN 158/162 established between the user 155/160 and the compute fabric 102. Still further, all users may be required to be multi-factor authenticated prior to gaining access to the system 100 via the APIs 162/165. In this manner, system data is exposed to only non-public addresses (e.g., addresses of components, compute fabric nodes, etc.) via VPN and authorized, credentialed entities. Applications may be exposed as websites or services, so that computing devices utilized by users access the system 100 via "thin" clients and do not have any system-related software (aside from, perhaps, the thin client such as a portal application) executing thereon. Further, all applications may be containerized, including the applications which execute locally at physical locations at which physical devices are disposed, and any system data may be encrypted at rest.

Additionally, within the NGPCAS 100, all communications transmitted and received over the network(s) 130 may be signed and encrypted, and plaintext protocols may be prohibited from use. Further, each NGPCAS 100 may have a single certifying authority (which can be associated with the enterprise, for example), and self-signed certificates and/or other forms of custom authentications may be prohibited.

Importantly, as illustrated in FIG. 1, one or more of the containerized components/MEEE/granules 140 may be used together to implement part of a configuration system 166 which may include various elements or sub-components described in more detail herein, including a configuration database, an enterprise configuration database services application, one or more translation service applications, and one or more configuration viewing applications, to name but a few. In addition, the configuration system 166 may include components located at the various physical locations or sites 115, 118, including, at each location, a bridge device 167 and a local configuration database services application 168. Generally speaking, the configuration system 166 located in the compute fabric 102 includes a centralized or common configuration database and a set of enterprise configuration database services. The enterprise configuration database may be a centralized or common configuration database that stores configuration data for each of various enterprise elements, such as control elements, implemented in the compute fabric 102 and/or at one or more of the physical locations 115, 118. Likewise, the enterprise configuration database services may enable a user (which may be a configuration engineer or other human user, or which may be an automated user, such as an automated tuning application or service) to access data in the configuration database and/or to make changes to the configuration database from configuration viewing devices connected via the compute fabric. Generally speaking, the enterprise configuration database services manage the enterprise configuration database, access the enterprise configuration database to read and make changes to configuration data stored in the enterprise configuration database, track configuration changes made to the enterprise configuration database either from configuration viewing (and changing) devices connected directly to the compute fabric or made from one or more of the local database configuration services applications 168. In a similar manner, the local configuration services applications 168 at the physical locations 115, 118 enable a user at the physical locations to access the centralized enterprise configuration database (via the bridge devices 167) to read and make changes to the configuration data stored in the configuration database. The configuration system 166 will be described in more detail herein with respect to FIGS. 4 and 5.

Figure 2:
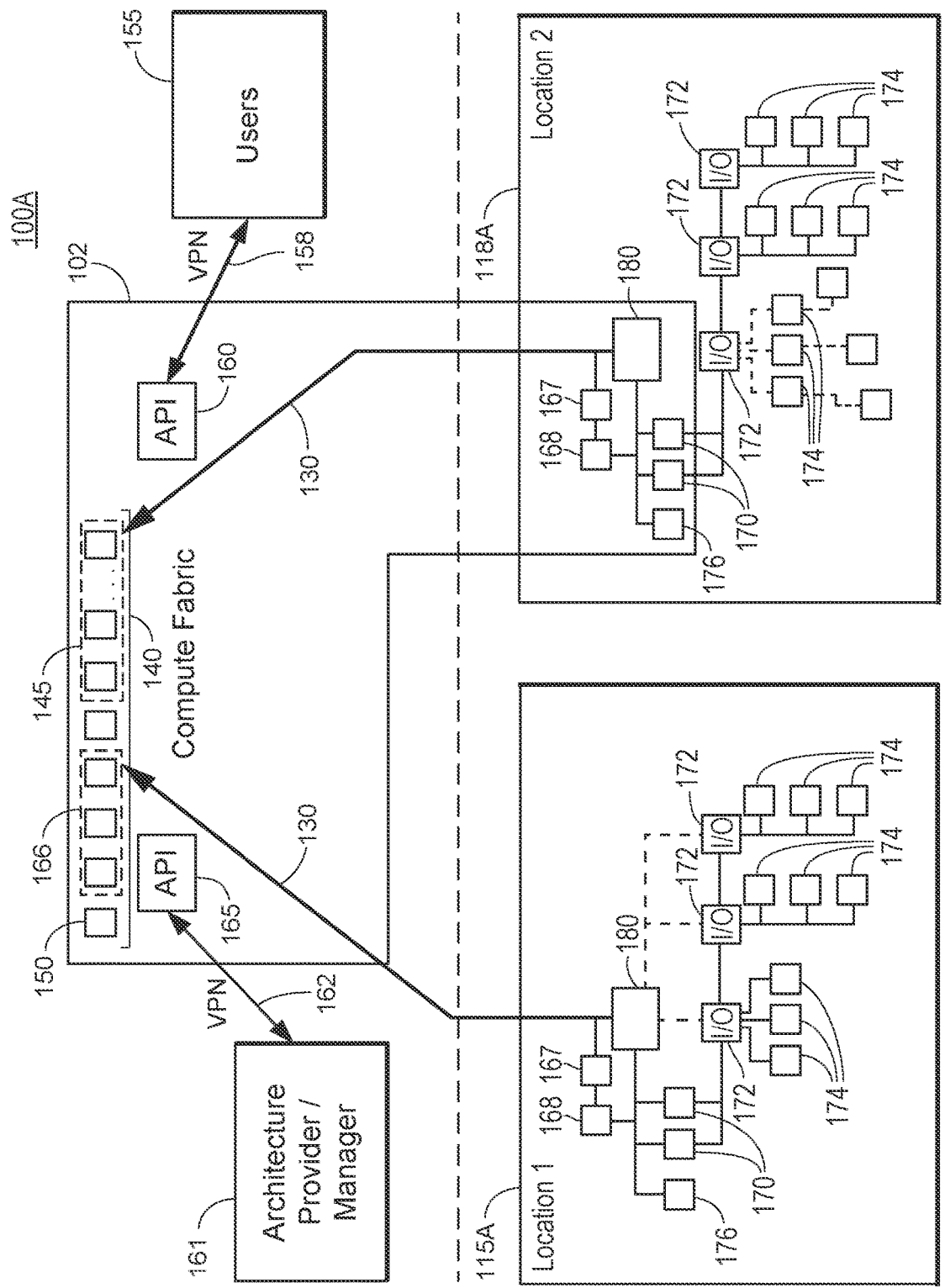
FIG. 2 is a block diagram of an example architecture of a Next Generation Process Control and Automation System ("NGPCAS") in which an advanced engineering and configuration system may be implemented to support industrial and/or automation processes having installed or legacy distributed control systems therein.

As another example, FIG. 2 illustrates a block diagram of an example architecture of a Next Generation Process Control and Automation System ("NGPCAS") 100A with the basic components of the system 100 of FIG. 1 but which is configured to support industrial and/or automation processes having installed or legacy distributed control systems therein, such as a DeltaV ° control system. In this case, the NGPCAS 100A includes all of the components of the system 100 of FIG. 1 but is connected to one or more plants or physical locations 115A and 118A that have already installed legacy control systems implemented therein. As illustrated in FIG. 2, the locations 115A and 118A may have distributed controllers 170, such as DeltaV controllers, connected through various input/output (I/O) devices 172 to various field devices 174, such as smart field devices, which may communicate with the I/O devices 172 using any desired or typical wired or wireless communication networks. The field devices 174 may, for example, be 4-20 ma, HART®, WirelessHART®, FOUNDATION® Fieldbus, Profibus, Canbus, APL or any other communication protocol compatible field devices that communicate using any standard or known communication networks or physical layers and communication protocols, including process control communication protocols (e.g., HART, fieldbus, etc.) Here, the process controllers 170 may store and implement legacy control programs that may use, for example, function blocks, control blocks, etc. to control the field devices 174. As illustrated in FIG. 2, the controllers 170 may be coupled to one or more databases, including a local configuration database 176 that stores configuration data for the system at the physical site at which the local configuration database 176 is located. Both the controllers 170 and the local configuration database 176 may be connected to the local database configuration services or applications 168.

As illustrated in FIG. 2, however, the process controllers 170 may also be connected to a data aggregator and VPN gateway 180 installed at or located at the physical locations or plants 115A and 118A, and the VPN gateway 180 is connected via a secured VPN link 130 to elements within the compute fabric 102. The VPN gateway 180 operates as a data aggregator to collect data from the process controllers 170 or, in another embodiment, directly from the I/O devices 172 (illustrated by the dotted lines at the location 115A) to obtain, manage, convert, aggregate and collect data from the field devices 174. The VPN gateway 180 also operates to encrypt and provide the collected data to other components in the compute fabric 102 (which perform control or other services using that data) via a VPN or other secured and encrypted communication link 130. In the case of the location 115A, the NGPCAS 100A may simply bypass the controllers 170 to obtain data from the field devices 174 and the I/O devices 172 in a manner similar to that illustrated with the I/O interfaces 125 and 128 and field devices 135 and 138 of FIG. 1. In this case, the controllers 170 may be operated and programmed to be a backup control system 169, such as that illustrated in FIG. 1, such that the controllers 170 of the location 115A take over control of the field devices 174 of the location 115A in a fail-over or backup situation. However, in another example, the controllers 172 may be or implement primary control of the processes at the locations 115A and 118A. In some cases, the bridge device 167 may be separate from or may be implemented in or as part of the data aggregator and VPN gateway 180.

On the other hand, as illustrated with respect to the physical location 118A of FIG. 2. the controllers 170, the local database configuration services 168 and the bridge device 167 may be operated as part of the compute fabric 102 and have software modules, such as containers, etc., associated with the compute fabric 102 stored and operated therein. In this case, the controllers 170 (of the location 118A), the local database configuration services 168 and the bridge device 167 are part of the compute fabric 102, which is illustrated by the compute fabric box of FIG. 2 extending down into the physical location 118A to include these elements. Thus, in this case, the compute fabric 102 may include cloud-based compute devices and compute devices (e.g., the controllers 170) located at a physical plant location not within the cloud. Further, in this case, the controllers 170 of the location 118A may be operated in conjunction with other computer equipment within the compute fabric 102 (such as computer equipment within a cloud environment) to perform control of the field devices 174 of the physical location 118A.

In both examples of FIG. 2, the data aggregator and VPN gateway 180 is included to enable the NGPCAS described herein to be connected to and to use installed legacy control system hardware (such a process controllers, field devices, I/O devices, etc.), which makes the NGPCAS described herein easier and cheaper to install in and use with plants or other physical locations that have control hardware already installed therein. The VPN gateway 180 thus enables the NGPCAS system 100A described herein to be used to quickly and easily convert a standard legacy control system, such as a distributed control system, to an NGPCAS. Of course, while FIG. 2 illustrates legacy or installed control systems as being distributed control systems, other legacy or installed control systems could be used in the same or a similar manner to support an NGPCAS.

However, similar to the control systems of FIG. 1, the systems of FIG. 2 include one or more of the containerized components/MEEE/granules 140 may be used together to implement part of a configuration system 166 including a configuration database, an enterprise configuration database services application, one or more translation service applications, and one or more configuration viewing applications. In addition, as illustrated in FIG. 2, the configuration system 166 may include components located at the various physical locations or sites 115A, 118A, including, at each location, a bridge device 167 and a local configuration database services application 168. Generally speaking, the configuration system 166 located in the compute fabric 102 includes a centralized or common configuration database and a set of enterprise configuration database services. The configuration database may be a centralized or common configuration database that stores configuration data for each of various enterprise elements, such as control elements, implemented in the compute fabric 102 and/or at one or more of the physical locations 115A, 118A. Likewise, the enterprise configuration database services (which may be modules) may enable a user (which may be a configuration engineer or other human user or which may be an automated user, such as an automated tuning application or service) to access data in the enterprise configuration database and to make changes to the enterprise configuration database from configuration viewing devices connected via the compute fabric. Generally speaking, the enterprise configuration database services manage the enterprise configuration database, access the enterprise configuration database to read and to make changes to configuration data stored in the enterprise configuration database, track configuration changes made to the enterprise configuration database either from configuration viewing (and changing) devices connected directly to the compute fabric or made from one or more of the local configuration services applications 168. In a similar manner, the local configuration services applications 168 at the physical locations 115A, 118A enable a user at the physical locations to access the centralized enterprise configuration database (via the bridge devices 167) to read and make changes to the configuration data stored in the enterprise configuration database. In this case, the configuration system 166 supports various different installed process control systems at the various different locations 115A and 118A, wherein the different process control systems at the different locations 115A and 118A may be different types of control systems, such as distributed control systems and programmable logic control (PLC) systems, control systems made by different manufacturers, such an Emerson control system and a Honeywell or an ABB control system, control systems that use different data models to perform communications, such as a DeltaV communication based control system and an OPC UA communications supported control system, and generally may be control systems that use different data models or different data and configuration schemas to perform operations.

Example Compute Fabric Architecture

Figure 3:
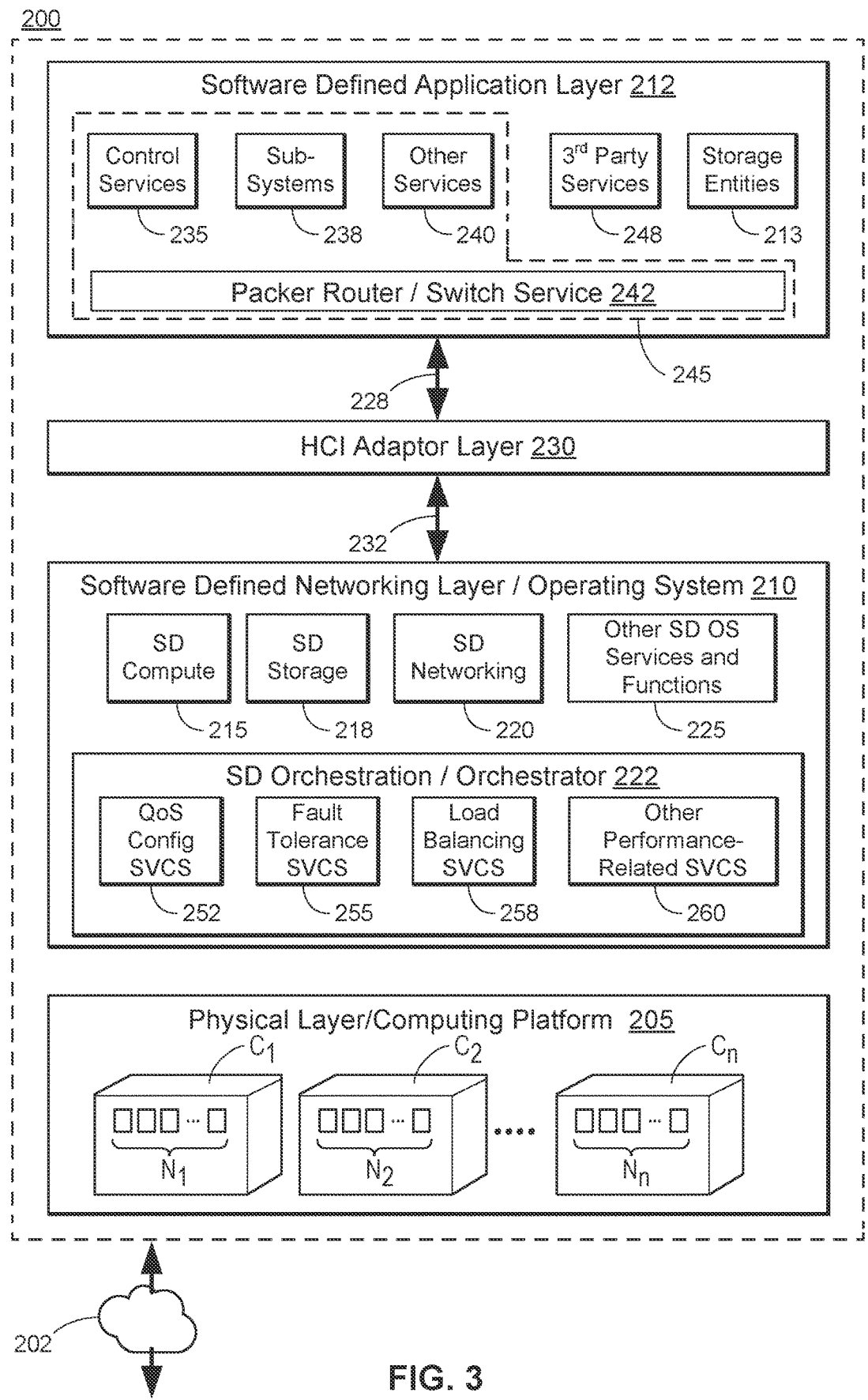
FIG. 3 is a block diagram of an example architecture of a compute fabric which may be included in the NGPCAS of FIGS. 1 and 2.

Prior to describing a configuration system that may be used in the enterprises of FIGS. 1 and 2, it will be helpful to describe the general make-up of the compute fabric of FIGS. 1 and 2. In particular, with regard to the compute fabric 102 of the Next Generation Process Control and Automation System 100 of FIGS. 1 and 2, FIG. 3 depicts a block diagram of an example architecture 200 of the compute fabric 102. Of course, the example architecture 200 may be utilized in compute fabrics and/or in process control and automation systems other than the compute fabric 102 of the NGPCAS 100. For ease of discussion herein, though, and not for limitation purposes, the architecture 200 is described below with simultaneous reference to FIG. 1. Additionally, for ease of reading, the architecture 200 of the compute fabric 102 is interchangeably referred to herein as the "compute fabric architecture 200" or simply the "compute fabric 200."

Generally speaking, and as is described below, the compute fabric 200 utilizes a layered architecture in which business logic of the compute fabric 200 is abstracted from the physical computing platform of the compute fabric 200. For example, the compute fabric 200 may utilize one or more techniques and/or features described in U.S. patent application Ser. No. 17/487,609 filed on Sep. 28, 2021, entitled "Software Defined Process Control System and Methods for Industrial Process Plants," and published as U.S. Patent Application Publication No. 2022/0404798 on Dec. 22, 2022, the disclosure of which is entirely incorporated herein by reference. For ease of discussion herein, the compute fabric 200 is described with simultaneous reference to the system 100 of FIG. 1; however, this is only for illustration purposes and is not limiting.

As shown in FIG. 3, the compute fabric 200 communicatively connects to the field environment 120 via one or more networks 202. The one or more networks 202 may be included in the networks 130 of FIG. 1, for example, in embodiments in which the compute fabric 102 of the NGPCAS 100 utilizes the compute fabric architecture 200. The networks 202 typically include high bandwidth data or communication links that support packet delivery to and from the compute fabric 200, and may include one or more wired and/or wireless networks which may include public networks (such as the Internet, public Wi-Fi networks, cellular networks, etc.) and/or private networks. At least some portion of the one or more networks 202 may include an Advanced Physical Layer (APL) or some other type of physical or other protocol layer that supports Ethernet and/or other packet-based protocols.

Physical Layer of Compute Fabric

As further shown in, the example architecture of the compute fabric 200 includes a computing platform 205 of hardware and software resources that support the higher layers of the compute fabric 200. Accordingly, the computing platform 205 is interchangeably referred to herein as the "physical layer 205" of the compute fabric 200, as it contains physical processors, processor cores, memories, and networking interfaces. The computing platform or physical layer 205 of the compute fabric 200 includes a set of data center clusters C1, C2, . . . Cn (which, for readability purposes, are generally referred to herein as data center clusters Cx), each of which includes a respective plurality of compute fabric nodes N1, N2, . . . Nn (which, for readability purposes, are generally referred to herein as nodes Ny), where the respective nodes Ny included within each data center cluster Cx may be at least partly, if not entirely, interconnected. Each different cluster C1, C2, . . . Cn may include a different total number of nodes N1, N2, . . . Nn. Each node Ny of each data center cluster Cx includes one or more respective processors and/or processor cores, one or more respective memories, and respective networking resources, such as one or more respective physical communication interfaces that communicatively connect the node Ny to one or more other nodes Ny of the data cluster Cx. For example, a node Ny may be implemented on a single server, or may be implemented on a bank or group of servers.

Each cluster Cx includes a plurality of nodes Ny that are communicatively interconnected to each other. Further, different clusters Cx may be physically disposed at the same or different physical locations (e.g., different locations 115, 118 of the NGPCAS 100 at which physical devices 105, 108 are disposed, and/or at one or more other locations at which no physical devices of the system 100 are disposed). A particular cluster Cx may be implemented solely at a single physical location or across multiple physical locations. Additionally, each data center cluster C1, C2, Cn is communicatively connected or networked with one or more of the other data center clusters C1, C2, Cn of the computing platform 205.

It is noted that although the physical layer 205 associated with the compute fabric 200 is described above as being implemented by using physical data center clusters C1-Cn, in some embodiments, at least a portion of the physical layer 205 may be implemented as a virtualized physical layer 205. For example, the data center clusters C1-Cn (or subset thereof) may be implemented as virtual machines, e.g., which execute on a computing resource platform, such as a cloud computing system.

Software Defined Networking Layer of Compute Fabric

The example architecture of the compute fabric 200 also includes a software defined (SD) networking layer 210 that interfaces the physical layer 205 of the compute fabric 200 with the software defined application layer 212 of the compute fabric 200. Accordingly, the software defined networking layer 210 is interchangeably referred to herein as the "operating system (OS) 210" of the compute fabric 200. Generally speaking, the OS 210 of the compute fabric 200 may assign, designate, or allocate various compute fabric nodes Ny to perform respective roles or functions to support the compute fabric 200, such as computing (e.g., via the nodes' respective processors and/or processing cores) or data storage (e.g., via the nodes' respective memories). Compute fabric nodes Ny that are assigned, designated, or allocated to perform computing activities of the compute fabric 200 are respectively referred to herein as "compute nodes" or "computing nodes." Similarly, compute fabric nodes Ny that are assigned, designated, or allocated to perform storage activities of the compute fabric 200 are respectively referred to herein as "storage nodes." An individual node Ny may be utilized as only a compute node, as only a storage node, or as both a compute node and a storage node, and the role(s) of each individual node Ny may dynamically change over time, for example, as directed by the OS 210. Advantageously, the computing platform 205 is scalable, so that individual nodes Ny and/or individual clusters Cx may be easily added, removed, swapped out, etc. as needed to support the compute fabric 200, and in particular, in accordance with the requirements of the other, higher layers of the compute fabric 200. For example, different nodes Ny of the compute fabric 200 may be assigned and re-assigned to different clusters Cx, and/or different nodes Ny and/or different clusters Cx may be physically disposed at different physical locations 115, 118 of the NGPCAS 100, as desired.

The operating system 210 of the compute fabric 200 executes on the computing platform 205 and, in an embodiment, may be built based on any suitable general purpose Hyper Converged Infrastructure (HCI) operating system (OS) such as Microsoft Azure Stack, VMWare HCI, Nutanix AOS, Kubernetes Orchestration, including Linux Containers (LXC/LXD), Docker Containers, Kata Containers, etc. As such, the OS 210 provides a set of computing, storage, and networking support services in a manner somewhat similar to general purpose HCI operating systems. However, in contrast to general purpose HCI OSs, and advantageously, in the compute fabric 200 of the Next Generation Process Control and Automation System 100, the OS support services are dynamically responsive to a logical or abstracted process control or automation system and other software components provided by the software defined application layer 212 of the compute fabric 200. That is, as performance, resource needs, and configurations of the various application layer services, subsystems, and other software components of the application layer 212 dynamically change (and/or are dynamically predicted, by services within the application layer 212, to change), the operating system 210 may automatically and responsively adjust and/or manage the usage of hardware and/or software resources of the physical layer 205 to support the needs and the requirements of the application layer 212 for computing, storage, and networking, as well as for other functionalities related to industrial process control and automation. To this end, the compute fabric operating system 210 may include a set of support services including, for example, a Software Defined (SD) computing (or compute) service 215, an SD storage service 218, an SD networking service 220, an SD orchestration service 222 (also interchangeably referred to herein as an "Orchestrator 222"), and optionally one or more other process control- and/or automation-specific SD OS support services and/or functions 225. For example, the process control- and/or automation-specific SD OS support services and/or functions 225 may include compute fabric individual resource and/or resource group management services that manage individual resources and/or groupings of resources provided by the software defined networking layer 210 and/or by the physical layer 205 of the compute fabric 200 such as, for example, virtual machines, containers, networks, network security groups, clusters, servers, and the like. As such, in an embodiment, the operating system 210 of the compute fabric 200 includes a general purpose HCI operating system platform (e.g., Microsoft Azure Stack, VMWare HCI, etc.) that has been particularly customized to include the SD computing service 215, the SD storage service 218, the SD networking service 220, the SD orchestration service 222, and the other process control and/or automation SD OS support services and/or functions 225, where the set of SD support services 215-225 is automatically responsive to and particularly supports application layer software components 212 of the compute fabric 200, that include, as previously discussed, process control- and/or automation-specific applications and services.

Interface Between Software Defined Networking Layer and Application Layer of Compute Fabric In particular, as the compute fabric operating system 210 manages the allocation of the hardware and software resources of the nodes Ny of the computing platform 205 via the SD OS support services 215-225, the SD OS support services 215-225 may also serve as interface services between the OS 210 and the higher level services, subsystems, and other software components of the application layer 212 of the compute fabric 200, and/or may provide a framework for these higher level services, subsystems, and other software components of the application layer 212. As such, the software components of the compute fabric application layer 212 may interface with the OS 210 (and in some cases, particularly with one or more of the SD-specific support services 215, 218, 220, 222, 225 provided by the OS 210) via a set of Application Programming Interfaces (APIs) 228, either via an HCI Adaptor 230 (also referred to herein as an "HCI Adaptor layer" 230) and another set of APIs 232, or directly (not shown in FIG. 3). The HCI Adaptor layer 230 enables the compute fabric application layer 212 to access the SD OS support services 215, 218, 220, 222, 225 while remaining agnostic of the particulars of the general purpose HCI operating system (e.g., Microsoft Azure Stack, VMWare HCI, etc.) that has been customized with such SD-specific services 215-225 to form the OS 210. Accordingly, the HCI Adaptor 230 transforms or translates the APIs 228 utilized by the compute fabric application layer 212 into a set of APIs 232 that are understood or otherwise known to or compatible with the customized or adapted general purpose HC operating system 210 of the compute fabric 200.

Thus, unlike generalized, layered IT (Information Technology) system architectures in which business logic applications are abstracted from the hardware and software computing platform and for which the management of computing platform resources is largely governed and designed by human IT administrators, the architecture of the compute fabric 200 not only abstracts the higher level, business logic services, subsystems, and other software components of the application layer 212 from the hardware and software computing platform 205, but also enables the higher level software defined services, subsystems, and other software components 212 to dynamically, automatically, and responsively direct and cause changes to the usage of the hardware and software resources of the nodes Ny and clusters Cx of the physical layer 205 and of the software defined networking layer 210 (and optionally, of groups of hardware and/or software resources thereof), e.g., via the APIs 228 and the SD OS support services 215, 218, 220, 222, 225, and without requiring any human intervention or direction. Particularly, and advantageously, the management of the resources of the physical layer 205 and of the software defined networking layer 210 is dynamically responsive to changes in the configurations and needs of these higher level SD services, subsystems, and other software components of the application layer 212, and in particular, with respect to the particular requirements, metes, and bounds of industrial process control and automation systems, such as timing, synchronization, and/or other control- or automation-specific constraints.

Containers and Other Types of Micro-Encapsulated Execution Environments

As shown in FIG. 3, industrial process control, automation, and other associated business logic are performed by the higher level software defined services, subsystems, and other software components 235-248 provided by the application layer 212. For ease of reading herein, this disclosure categorically and interchangeably refers to these higher level SD services, subsystems, and other software components 235-248 as "software defined application layer components" or "application layer software components" of the compute fabric 200. In an embodiment, a set of software defined application layer components 235-242 (and optionally at least some of the third-party services 248 executing at the application layer 212) may collectively form a logical process control or automation system 245 (also interchangeably referred to herein as a "virtual" process control or automation system 245) that executes in conjunction with the physical components 135, 138 of the NGPCAS 100 to control an industrial (e.g., a process control or automation) process. For example, the logical process control or automation system 145 of FIG. 1 may include the logical process control system 245 of FIG. 3. Generally speaking, application layer software components may be provided by the enterprise (e.g., via the architecture provider/manager 160), users 155 who are agents of or associated with the enterprise 155, third-parties, and/or other sources.

The application layer software components 235-248 of the application layer 212 may execute in containers and/or in other suitable types of micro-encapsulated execution environments (MEEEs) or granules, e.g., as Instantiated Software Components (ISCs). For example, an ISC may be a container configured with an instance of a particular application layer software component 235-248 to form a configured container, container image, or other type of micro-encapsulated execution environment or granule for the particular application layer software component 235-248, and the container image of the particular application layer software component 235-248 may be instantiated for execution on a particular compute fabric node Ny as a specific instantiated MEEE or ISC. Said another way, a configured container may be an instance of an application layer software component 235-248 that is configured into a respective container or other type of micro-encapsulated execution environment or granule.

Generally speaking, containerized or micro-encapsulated software components or MEEEs/granules (e.g., at the application layer 212, the HCI adaptor layer 230, and the software defined networking layer 210) are included in the set of containerized/micro-encapsulated components 140 of the NGPCAS 100 and, as such, are isolated from other containerized/micro-encapsulated services and applications (e.g., other containerized/micro-encapsulated components 140) that are executing on the same node Ny. As such, the terms "configured container," "container image," and "containerized component" are utilized interchangeably herein and, for ease of discussion but not for limitation purposes, are generally and categorically utilized herein to refer to any one or more suitable types of instantiated, micro-encapsulated execution environments or granules, such as software containers, virtual machines, software agents, scripts, functions, calls, actors (e.g., lightweight processes such as Erlang, Scala, Akka, etc.), unikernels (e.g., machine images which run on bare metal and contain all components necessary to execute an application, including the operating system component), other types of bare metal software (e.g., software running directly on hardware without any intermediate managing software, such as a hypervisor or other type of container/encapsulation manager), and/or other types of micro-encapsulated execution environments or granules.

Various MEEEs or granules can be configured to execute (e.g., when instantiated) various broad to granular operations within the NGPCAS 100. To illustrate using an example, a control routine may include multiple control modules which operate cooperatively to execute the control routine, a control module may respectively include multiple function and other types of blocks which operate cooperatively to achieve the control module, and a function block may respectively include multiple granular operations which operate cooperatively to execute the function block. Accordingly, in one implementation of this example, a single MEEE can be configured to execute (e.g., when instantiated) an entirety of the control routine. In another implementation of this example, each MEEE of a group of MEEEs can be respectively configured to execute (e.g., when instantiated) a different control module or portion of the control routine, and the group of instantiated MEEEs may operate cooperatively to thereby execute, as a group, the control routine in its entirety. Indeed, in some implementations, a second group of MEEEs can be respectively configured to execute (e.g., when instantiated) different granular operations or portions of a control module (such as an input function block, an error detection function block, a control function block, a logic function block, a script, an output function block, etc.), and this second group of MEEEs, when instantiated, may operate cooperatively to thereby execute, as a group, the control module in its entirety. In still other implementations, a single MEEE may be configured to execute (e.g., when instantiated) as a process controller, a process control subsystem, a unit, an area, or even the process control system 245 as a whole.

In another example, a single, individual MEEE can be configured to execute (e.g., when instantiated) an entirety of a complex data analytics routine for the entire NGPCAS 100. Alternatively, each MEEE of a group of MEEEs can be respectively configured to execute (e.g., when instantiated) a different simple data analytics routine (or some other respective portion of the complex data analytics routine), and the execution of the instantiated group of MEEEs in cooperation may thereby cause the execution of the entirety of the complex data analytics routine. In some implementations, another group of MEEEs, when instantiated, can execute respective granular actions or operations of a simple data analytics routine (or other types of respective granular actions of a simple data analytics routine) in cooperation to thereby cause the execution of the entirety of the simple analytics routine (or the entirety of the portion of the complex data analytics routine, as the case may be). For instance, granular analytics actions or operations may include computational functions (e.g., data aggregations and/or manipulations, such as averages, maximums, minimums, etc.), simplex data analytics routines may include more sophisticated statistical calculations or algorithms (e.g., principal component analysis (PCA), partial least squares (PLS) predictions, and other types of statistical calculations and/or analytics), and complex data analytics routines may include combinations of statistical calculations or algorithms, and in some cases in combination with other type of non-statistical calculations or algorithms.

Generally speaking, MEEEs, granules, or configured containers may be provided by the enterprise (e.g., via the architecture provider/manager 161, via an application/service store, out-of-the-box, etc.), users 155 who are agents of or associated with the enterprise, third-parties, and/or other sources. Various instantiated MEEEs may be assigned to execute on various compute nodes Ny of the system 200, which may be disposed in different physical and/or geographical locations. Further, the instantiated MEEEs may be dynamically migrated from executing at one node to executing at another node, e.g., based on detected and/or predicted resource usage, jurisdictional requirements and/or regulations, and/or other criteria. Still further, instantiated MEEEs may be allocated, pinned, dynamically assigned, and/or dynamically migrated, e.g., via the SD compute service 215, to execute on respective nodes Ny and/or data center clusters Cx. The SD compute service 215 may dynamically change, update, maintain, and/or otherwise manage the container images and their respective assignments to compute nodes Ny as or when needed, e.g., to load-balance across compute nodes Ny, for scheduled maintenance of compute nodes Ny and/or physical components thereof, in response to detected and/or predicted resource usage and/or performance issues, to support expansion or contraction of the logical process control or automation system 245, to support expansion or contraction of the computing platform 205, based on jurisdictional regulations and/or requirements, etc. As such, the NGPCAS 100 may be viewed as a dynamic, highly-distributed set of MEEEs or as a dynamic mesh of MEEEs, where the MEEEs may be located or disposed across multiple physical and/or geographical locations, and where one or more of the MEEEs may be dynamically reassigned and migrated, during run-time operations of the NGPCAS 100, to another node and/or another physical and/or geographical location while maintaining the execution of the run-time operations of the NGPCAS 100. Moreover, components of the dynamic meh of MEEEs forming a particular application, control routine, analysis routine, etc. may be dynamically moved or migrated or reassigned to other hardware in the compute fabric individually, in sets or groups, or altogether if desired without effecting or interrupting operation of the application, routine, etc. As such, individual components of the dynamic mesh of MEEEs for a particular application or usage may be managed in the compute fabric separately from other components of the same application or usage.

Within the compute fabric 200, some configured containers, granules, or instantiated MEEEs may be allocated or assigned to respective compute nodes Ny and dynamically re-assigned to different compute nodes Ny by the SD compute service 215 based on dynamically changing configurations, performance, and needs of the logical process control or automation system 245. In some situations, configured containers may be assigned (and re-assigned) to be executed by particular processors or particular processor cores of SD compute nodes Ny. Some configured containers, though, may be pinned to respective SD compute nodes Ny (e.g., by the SD compute service 215, by a configuration, by a user, etc.) and are not dynamically re-assigned by the SD compute service 215 due to dynamically occurring conditions. That is, a pinned configured container may execute on the compute node Ny to which the configured container is pinned until the configured container is unpinned from the compute node Ny, e.g., irrespective of dynamic conditions of the logical process control or automation system 245 (other than perhaps the failure of the compute node Ny to which the configured container is pinned). Said another way, the software defined networking layer 210 may limit the utilization, by the pinned configured container, to only the hardware and/or software resources to which it is pinned, and when the configured container is unpinned, the SD networking layer 210 removes the limitation. Configured containers may additionally or alternatively be pinned to other physical or logical components of the compute fabric 200, if desired. For example, a configured container may be pinned to another configured container, to a specific data cluster, to a particular processing resource (e.g., a particular physical processor or a particular physical processor core of a compute node Ny), to a physical rack or portion of a physical rack serviced by a particular power supply (where the physical rack physically houses the hardware of one or more compute fabric nodes), etc.

Further, configured containers, instantiated MEEEs, or granules may be nested within and/or pinned to other configured containers, which is particularly useful in configuring and organizing the logical process control or automation system 245. For example, when a particular process control subsystem 238 provides a particular set of control services 235 and/or other services 240, a configured container of each provided service 235, 240 of the particular set may be nested in the configured container of the particular process control system 238. In another example, multiple control routine and/or control module configured containers may be nested within a specific controller service 235, and the specific controller service 235 may be nested within the particular process control subsystem 238. In yet another example, a controller or control service 235 may be configured with one or more process control module services 235, parameters, and values of the industrial process plant 10, such as tags of inputs and outputs, reference values, and the like, thereby forming a configured or programmed controller service. The controller or control service 235 may be functionally equivalent to a traditional, dedicated, hardware controller device as understood in the Purdue model, or the controller service 235 may be functionally equivalent to a control routine or control module which is configured into an executed by the traditional, dedicated hardware controller device. A container may be configured with an instance of the configured controller service, thereby forming a container image or instance of the configured controller service that is executable to perform the specific, configured set of process control logic, e.g., by using the configured control module containers, tags, reference values, etc., when so configured. Multiple instances or container images of a configured controller service (or of other configured applications and services) may be instantiated and executed by the compute fabric 200.

In still another example, containers, granules, or instantiated MEEEs within the SD application layer 212 may be utilized to represent and/or logically organize physical and/or logical areas, regions, and components of the NGPCAS 100. For examples, units, areas, and the like may be represented by respective configured containers, and configured containers corresponding to physical and/or logical components of each unit, area, etc. may be nested within and/or pinned to their respective configured, organizational container(s). As such, within the compute fabric 200, a configured control routine container may be nested within or pinned to the configured controller container, and the configured controller container may be nested within or pinned to another configured container, e.g., a container that has been configured for a depropanizer.

For clarity and ease of discussion herein, the term "container" is utilized herein to generally refer to an instantiated software component (ISC) that is a configured container, container image, containerized component, or other type of micro-encapsulated execution environment (MEEE) or granule, e.g., a container or other type of micro-encapsulated execution environment that has been configured to include an instance of a respective controller service, subsystem, or other service or application provided by the application layer 212 of compute fabric 200.

At any rate, and in a manner similar to that discussed for the computing resources of the computing platform 205, containerized/microencapsulated components 140 of the system 100 may be dynamically allocated and/or assigned, pinned, and/or nested, e.g., via SD storage service 218, to various compute fabric storage nodes Ny to thereby support various storage needs of the logical process control or automation system 245. For example, the SD storage service 218 may administer and manage the logical storage resources utilized by configured containers of the logical process control or automation system 245 across various physical hardware memory resources of one or more nodes Ny. For instance, the configured container and the memory needed for its operations (e.g., Random Access Memory or similar) may be stored on a particular SD storage node Ny or a particular memory device or space of an SD storage node Ny. Additionally, if desired, some containerized components/MEEEs/granules 140 may be pinned to respective SD storage nodes Ny and/or to specific memory devices or memory areas of the SD storage nodes Ny. The SD storage service 218 may change, update, or otherwise manage the physical hardware memory or memories of the computing platform 205 to support logical storage resources of the compute fabric 200 when and as needed, e.g., due to disk or other types of errors, for scheduled maintenance, due to the addition/expansion of available physical memory in the computing platform 205, etc.

Still similarly, the SD networking service 220 may administer and manage the logical or virtual networking utilized by the containerized components/MEEEs/granules 140 of the logical process control or automation system 245 and/or by other containerized components/MEEEs/granules 140, which may be implemented by the SD networking service 220 across the compute fabric nodes Ny. For example, the SD networking service 220 may administer and manage networking and hardware resources of the computing platform 205 to support the logical networking functionalities included in the logical process control system 245, such as virtual interfaces, virtual switches, virtual private networks, virtual firewall rules, and the like, as well as to support required networking between various configured containers or container images executing on the compute fabric 200. Further, as the logical process control system 245 services the physical components 135, 138 of the NGPCAS 100, the timing and synchronization of the containerized components/MEEEs/granules 140 of the compute fabric 200, the physical components 135, 138 of the field environment 120, and the networking there between is critically important, as missed and/or lost messages or communications may result in the industrial or physical process becoming uncontrolled, which may in turn lead to catastrophic consequences such as overflows, gas leaks, explosions, loss of equipment, and, in some situations, loss of human life. Fortunately, the SD networking service 220 is responsive to the critical process I/O timing and synchronization of the compute fabric 200 so that communications (and in particular, communications to/from control services 235), may be reliably delivered in a timely and deterministic manner. For example, the SD networking service 220 may support the time synchronization of data center clusters Cx to within 1 millisecond to ensure required synchronization between process control services 235, process control subsystems 238, the packet router/switch service 242, and other software defined services 240, 248 of the software defined application layer 212.

In addition to the SD compute service 215, the SD storage service 218, and the SD networking service 220, the compute fabric operating system 210 may provide other OS support services 225 that are accessible via the set of APIs 228, 232 and which may be utilized or accessed by the application layer 212 to support the logical process control system 245 and other containerized components/MEEEs/granules 140 of the application layer 212 of the compute fabric 200. For example, the other OS services 225 may include a service life cycle management service, a discovery service, a security service, an encryptor service, a certificate authority subsystem service, a key management service, an authentication service, a time synchronization service, a resource and/or resource group management service, a service location service, and/or a console support service (all not shown in FIG. 3), to name a few. In some embodiments of the compute fabric 200, one or more of the support services may execute at the application layer 212, e.g., as other software defined services 240, instead of executing at the software defined networking layer 210 as OS support services 225.

Indeed, in an embodiment, one or more of the software defined components 215-225 and 252-260 of the software defined networking layer 210 are implemented as respective configured containers or container images of the compute fabric 200. That is, one or more services and other functionalities provided at the software defined networking layer 210 of the compute fabric 200 (and in some implementations, all of the services and functionalities provided at the software defined networking layer 210) may be implemented as respective containerized components/MEEEs/granules 140 of the NGPCAS 100. As such, in manners similar to those discussed herein for containerized components/MEEEs/granules 140 of the application layer 212, containerized components/MEEEs/granules 140 of the software defined networking layer 210 may be uniquely identified within the NGPCAS 100 by a respective address, may communicatively connect to other containerized components/MEEEs/granules 140 of the NGPCAS 100 and optionally to the physical components 135, 138 of the NGPCAS 100, can be spun up and removed as or when needed, etc.

Application Layer of Compute Fabric

Now turning more specifically to the application layer 212 of the compute fabric 200, and as shown in FIG. 3, the application layer software components 212 include a set of software defined services or applications 235 (such as software defined process control- or automation-related services 235) and a set of subsystems 238 of the NGPCAS 100 (such as subsystems for software defined process control or automation), and optionally may include a set of other software defined business logic services 240 of the NGPCAS 100 (e.g., enterprise business logic services relating to process control or automation). In some implementations of the compute fabric 200, the application layer software components 212 may include a set of third-party business logic services 248. For example, third-party services 248 may be generated by a software development kit (not shown) of the compute fabric 200, via which users may develop, generate, install, and manage third-party services 248 at the SD application layer 212. Generally speaking, the services and applications 235-248 provided at the application layer 212 form the logical process control system 245 and provide related functionalities. Generally speaking, applications 235-248 may be provided by the system 100 itself, third parties, suppliers, end users 155, and/or other sources. For example, one or more of the applications 235-248 may be built on the APIs 160, 165 provided by the compute fabric 102, and/or one or more of the applications 235-248 may be packaged as containers and distributed by the Orchestrator 222.

Each different control service 235 may be configured with desired parameters, values, etc. and optionally other control services 235; each instance of a configured control service 235 may execute in a respective container; and each configured container may be assigned (or pinned) to execute on a respective compute node Ny and/or cluster Cx. As such, each configured control service 235 may be a logical or software defined control entity which functionally may be configured and may perform in a manner similar to that of a traditional, hardware-implemented process controller device, control module, process control function block, etc. However, unlike traditional, hardware-implemented process controller devices, traditional control modules, and traditional control function blocks, and advantageously, the compute fabric 200 may easily replicate multiple instances of a same configured control service 235 for various purposes, such as performance, fault tolerance, recovery, and the like. For example, a controller service (that executes in its own container) may be configured to execute a control module service (that executes in its own container), and the control module service may be configured to execute a set of control function block services (each of which executes in its own container, and each of which may be configured with respective parameters, values, etc.). As such, the set of configured containers corresponding to the set of configured control function block services may (though need not necessarily) be nested in the configured control module service container, and the configured control module service container may be nested in the configured controller service container. The set of configured containers corresponding to the set of configured function block services may be assigned to execute on different cores of a particular processor of the compute platform 205, e.g., for performance load-balancing purposes. When loads change, one or more of the configured function block service containers may be moved to execute on different processor cores, different processors, or even different compute fabric nodes in attempt to re-balance loads; however, the moved function block service containers would still be nested under the configured control module service container, and would execute accordingly.

In addition to control services 235, other types of application layer services 240 related to industrial process control may be provided by the application layer 212, such as, but not limited to, operator displays and interfaces, diagnostics, analytics, safety routines, reporting, historization of data, configuring of services, configuring of containers, communicating information with external or other systems, enterprise-level applications, process control and/or automation resource and/or resource group management, etc. For example, a process control and/or automation resource group management service may allow a user 155 to group and/or isolate various resources based on the NGPCAS 100 and/or other process control or automation considerations. For instance, resource groups may be formed based on physical characteristics, such as sites or physical locations, groups of sites/physical locations, subsets of sites or physical locations, geographical regions, etc.; based on logical characteristics, such as categories, containers and/or container types, control strategies, capabilities, timing, performance, user characteristics, etc.; based on functionalities, such as storage items, networking items, etc.; and/or based on other types of groupings and/or combinations thereof corresponding to the NGPCAS 100. Generally speaking, any process control or automation system-related functionality or business logic, including one or more configurations services or applications, that executes during run-time of the NGPCAS 100 to control the industrial process, supports the NGPCAS 100, and/or relates to the NGPCAS 100 may be logically implemented in the compute fabric 200 as a respective application layer service 235, 240 executing in a respective container. For example, any one or more of the enterprise-level compute fabric functionalities may be implemented in respective containers or as containerized services. Further, any of the containerized services 235, 240 may communicatively connect, e.g., via the SD networking layer 210, with respective physical components 135/138 disposed in physical locations of the NGPCAS 100 when required to do so by the business logic of the service 235, 240 and/or by the recipient physical components 135/138. Still further, any of the containerized services 235, 240 may communicatively connect any other containerized service 235, 240 to transfer data and/or information there between when required to do so by their respective business logic.

In a similar manner, each different subsystem 238 of the application layer 212 of the compute fabric 200 may be provided by or execute in a respective container. The set of subsystems 238 provide the virtual or logical process control-related subsystems of the logical process control system 245. In some cases (not shown in FIG. 3), a subsystem 238 may provide or include one or more application layer services and, as such, the configured containers of the services 235, 238 provided by the subsystem may be nested in the configured subsystem container. Generally, the set of subsystems 238 allow control services 235 and other services 240 to be easily and coherently grouped and/or managed. In a preferred embodiment, each node Ny of the compute fabric 200 hosts a respective instance of each subsystem of the set of subsystems 238, e.g., so that subsystem services are proximately and readily available to other application layer services 235, 240, 248 that are presently executing on each node Ny. Accordingly, changes to one or more of the subsystems 238 may be coordinated among the corresponding instances thereof executing at each node Ny (e.g., under the direction of the OS 210). As such, not only is the set of subsystems 238 highly and proximately available for any application layer service 235, 240, 248 executing on a same node Ny, but in the event of a compute fabric node failure, the failure of a compute fabric node component, or the failure of a particular subsystem instance at a compute fabric node, the functionalities provided by the set of subsystems 238 may be easily maintained for the logical process control system 245.

Examples of subsystems 238 which may be provided by the application layer 212 of the compute fabric 200 include, but are not limited to:

- a continuous process control subsystem to manage the scheduling and execution of the business logic of logical and physical control system entities such as controllers, I/O assignments, control modules, function blocks, ladder logic, and structural text-based control algorithms, etc.;
- a state-based process control subsystem for managing, tracking, assigning, changing, deriving, transitioning, analyzing, visualizing, recording, etc. the state of the process control system 245 as a whole, of containerized components/MEEEs/granules 140 of the process control system 245, and/or of physical components 105, 108 controlled by the process control system 245, as well as for driving the industrial process to achieve a desired process state within defined constraints, such as safety, environmental, and/or profitability constraints;
- an event-based process control subsystem including various control services that may be triggered to execute based on occurrences of one or more events;
- a batch process control subsystem including various control services which may perform batch control and tracking of regulatory items (e.g., for governmental traceability and manage regulatory records that are related to batch process control and that are generated during batch execution and at other times;
- a historian subsystem including various application layer services to record time series data for process I/O and events within the system 100;
- a diagnostic subsystem including various application layer services for collecting and providing diagnostic data from various other application layer services, other subsystems, compute fabric nodes Ny, components of the software defined networking layer 210, and/or other components of the system 100;
- a process I/O subsystem including various application layer services to manage I/O connections and configurations for process I/O within the process control system 245, such as the packet router/switch service 242;
- a user subsystem including various application layer services 240 to verify and/or validate user credentials when users attempt to access the compute fabric 200, e.g., via APIs 160, 165;
- an alarm subsystem including various application layer service for maintaining the definitions, statuses, and states of alarms within the system 100 such as, for example, process alarms, hardware alarms, maintenance alarms, unit alarms, networking layer alarms, I/O alarms, hardware asset alarms, software asset alarms, diagnostic alarms, and the like;
- a licensing subsystem including application layer services 240 to verify or ensure that a user has privileges in accordance with the license level of the compute fabric 200 and/or system 100 (such as perpetual licenses, time subscription licenses, consumption-based licenses, remote licenses, etc.), to enforce licenses and prevent unlicensed activity from occurring, to provide for administration of licenses, to report and log licensing status and activities, and the like;
- a distributed event subsystem including various application layer services to distribute generated events (or notifications thereof) across all nodes Ny of the compute fabric 200, along with corresponding time stamps indicating respective times of occurrences at respective event sources so that consistent record keeping may be provided across all nodes Ny; and
- a configuration subsystem which manages the storage, updating, and version control of a configuration database that stores configurations of various services provided by the application layer 212, such as control configurations. A respective instance of the configuration database may be stored at each compute fabric node Ny, so that the compute fabric 200 provides fault tolerance of the configuration database across all nodes Ny. Writes to the configuration database may be atomic across all fault tolerant instances throughout the system 100, and reads from the configuration database may be from a single local instance of the configuration database. In some situations, a large read request may be segmented and the results provided in a parallel manner from the multiple nodes Ny.

Further, the application layer 212 of the compute fabric 200 may include additional or alternate subsystems 238 which may be utilized by the system 100. For example, the subsystem 238 may include a control strategy subsystem directed to higher-level and/or overall control strategies, e.g., to achieve product and process performance and quality targets; an analytics subsystem; an optimization subsystem, a mass and energy balancing subsystem, a security subsystem, which may include one or more specialized algorithms for detecting security intrusions, etc.

Software Defined Router/Switch Service

The software defined packet router/switch service 242 generally operates as an application or service that is responsible for transferring packetized I/O data (and, in some scenarios, other types of packetized data or information) between endpoints of the NGPCAS 100, e.g., from a physical component 135/138 to a containerized component/MEEE/granule 140 at the application layer 212 of the compute fabric 200 and vice versa; from a physical component 135/138 to a containerized component/MEEE/granule 140 at the networking layer 210 of the compute fabric 200 and vice versa; from a containerized component/MEEE/granule 140 at the application layer 212 to another containerized component/MEEE/granule 140 at the application layer 212; from a containerized component/MEEE/granule 140 at the networking layer 210 to another containerized component/MEEE/granule 140 at the networking layer 210; from a containerized component/MEEE/granule 140 at the application layer 212 to a containerized component/MEEE/granule 140 at the networking layer 210 and vice versa, and the like. For example, the packet router/switch service 242 may communicatively couple the respective endpoints and transfer data there between using any suitable data delivery or data transfer paradigm, including request/response, publish/subscribe, etc. In an embodiment, when at least some of the software defined application layer software components 235-248 are deployed as microservices/MEEEs/granules that are communicatively connected by a microservice/MEEE/granule bus (not shown), the packet router/switch service 242 (in some cases, in conjunction with the OS 210 and its support services 215-225) may support and/or manage the microservices/MEEEs/granules and microservice/MEEE/granule bus so that the microservices/MEEEs/granules may transfer data and/or information there between (e.g., in a packetized format). In an additional or alternative embodiment, the software defined packet router or switch service 242 may use any one or more packet-based networks or links (such as the networks 202 and/or software defined links provided by the compute fabric 200) to transfer packetized data and information between one or more containerized components/MEEEs/granules 140 and/or physical components 135/138 of the NGPCAS 100.

It is noted that FIG. 3 depicts the software defined packet router/packet switch service 242 as being a separate service at the application layer 212; however, this is for clarity of discussion (and not limitation) purposes. In other embodiments, the packet router/switch service 242 may be included in a subsystem 238 of the compute fabric 200, and/or at least a respective portion or an entirety of the software defined packet router/switch service 242 may be implemented in the HCI Adaptor 230 or in the compute fabric operating system 210. Alternately, the packet router/switch service 242 may be an application layer software defined service 240 which is in its own, stand-alone subsystem within the application layer 212, or which is not associated with any subsystem. At any rate, and generally speaking, the software defined packet router/packet switch service 242 may be typically implemented as a containerized component/MEEE/granule 140 of the compute fabric 200.

As such, the containerized packet router/switch service 242 may be accessed by other containerized components/MEEEs/granules 140 of the compute fabric 200 (both at the application layer 212 and the networking layer 210) for the purposes of data transfer or data delivery. In some situations, the packet router/switch service 242 may utilize the APIs 228 to thereby cause the transfer of packetized I/O data and/or other types of packetized data, e.g., via the OS support services 215-225. In some situations, the packet router/switch service 242 may cause data to be transferred via the microservice/MEEE/granule bus. In effect, the packet router/switch service 242 serves as a logical or gateway (e.g., an API gateway) that causes packetized process I/O and/or other types of packetized data to be routed between configured containers of the compute fabric 200, and that causes packetized process I/O, packetized control signals or instructions, and other types of packetized information to be routed between configured containers of the compute fabric 200 and physical components 135, 138 deployed in the field environment 120 of the NGPCAS 100.

As will be understood, one significant advantage of the system described herein is that it reduces the data movement and data storage needed to support applications or other usages executing in in real-time in the compute fabric. In particular, because of the secured, real-time communication structure provided in the NGPCAS described herein, including the use of secured, encrypted data links (e.g., VPNs) between various software and hardware elements both in the compute fabric and in the physical locations (e.g., the plants), elements such as MEEEs in the compute fabric can access data from anywhere in the system (i.e., from any other element where that data was created or resides) in real-time. This feature means that applications and other application usages executed in or by higher level system elements or platforms (e.g., a control application, a maintenance application, a data logging or tracking application, a fleet management application, etc.), or any individual MEEE or granule thereof can access data wherever this data resides (e.g., in another MEEE or granule anywhere in the system, in a compute fabric database, in a physical location database or server, in a field device at a physical location, etc.) in real-time using, for example publish/subscribe communications, dedicated data calls, etc. In fact, individual MEEEs or other compute elements (granules) that make up or implement a particular application or usage can include a pointer or reference that points to the data it needs for operation wherever that data resides in the system and the granule can access that data in real-time when it is needed or used by the MEEE or granule. Thus, granules can, for example, access and use data wherever that data is created and/or initially stored. This feature means that data does not need to be moved from, for example, a server in a physical location to a cloud-based server in the compute fabric prior to being usable or accessible in real-time by an application or element (e.g., granule) in the compute fabric. This feature thereby speeds up computing operations and reduces data flow that was, in the past, performed simply for the purpose of moving data from one location to another to make that data available for use in real-time to applications which use that data. The system described herein thus enables data to be used wherever it resides or is generated by direct data calls or publish/subscribe communications, whether that data resides in or is generated by a device within the compute fabric or by a device at a physical location or plant.

Logical/Virtual Components

Further, at the application layer 212 of the compute fabric 200, at least some physical process control devices or components (e.g., controllers, safety logic solvers or devices, data storage devices, etc.) of traditional process control systems may be logically implemented in the logical process control system 245 as a respective service 235, 240 or subsystem 238 executing in a respective container. Such logical or virtual instances of process control devices or components may be configured in a manner similar to their physical counterparts, if desired, by configuring the logical devices with control routines, other application layer software components 212, parameters, reference values, lists, and/or other data. For example, a controller service may be configured with several control modules, a display view service may be configured with user access controls and graphical elements, etc. Configured logical or virtual process control devices or components (e.g., container images of process control devices or components) may be identified within the logical process control system 245 via a respective device tag or identification, for example, and respective signals that are received and generated by configured logical or virtual instances of process control devices may be identified within the logical process control system 245 via respective device signal tags or identifiers. A logical or virtual instance of a process control device may be uniquely identified within the system 100 and operate as an individual entity in lieu of any corresponding physical device of the system 100, or a logical or virtual instance of a process control device may be a proxy or digital twin of a physical device included in the system 100, such as previously described.

At the software defined application layer 212, the compute fabric 200 also includes software defined storage entities or components 213, which may provide abstracted data storage (and access thereto) for the services and subsystems 235-248 of the SD application layer 212. For example, historian databases, configuration databases, and other types of process control system databases and data storage entities as well as temporary storage utilized by various process control application services 235-248 during execution may be provided by the software defined storage entities 213. The storage databases, areas, devices, etc. may virtualized or logical storage entities or components, which may be assigned or allocated (and may be re-assigned and re-allocated) to various storage resources of the nodes Ny of the computing platform 205 by the compute fabric operating system 210. For example, a single software defined logical database may be implemented over the hardware memory resources of multiple nodes Ny. Additionally, the SD Storage service 218 of the compute fabric operating system 210 may assign/re-assign and re-assign/re-allocate software defined storage entities 213 at the application layer 212 to different storage resources provided by the nodes Ny based on performance, resource, and configuration needs of the storage entities or components 213 and optionally of other components of the SD application layer 212.

Orchestration

Returning now to the software defined networking layer 210 of the compute fabric 200, FIG. 3 depicts a particular compute fabric OS service, i.e., the Orchestration service 222, separately from the depictions of the other compute fabric OS services 215-220, 225 for ease of discussion purposes. Generally speaking, the Orchestration service 222 instantiates container images (e.g., of application layer control services 235, subsystems 238, third-party services 248, and other software defined services 240) into running or executing containerized applications or services on respective hardware and/or software physical compute nodes Ny, as well as assigns various SD data storage entities to reside on respective hardware storage and/or software storage nodes Ny. For example, the Orchestration service 222 may instantiate and assign various instantiated container images to execute on and/or utilize resources of a single node Ny, or resources of two or more nodes Ny. Further, the Orchestration service 222 may assign various SD data storage entities or components 213 of the application layer 212 to reside on physical layer storage resources of a single node Ny, of multiple nodes Ny, etc., e.g., for ease and speed of access by resident containerized components, for redundancy purposes, for balancing of memory usage across the physical platform, etc. In doing so, the Orchestration service 222 not only establishes the running containerized applications and services, but also manages the fault tolerance, load-balancing, quality of service (QoS), and/or other performance aspects of the running containerized applications and services of the compute fabric 200, e.g., via QoS configuration services 252, fault tolerance services 255, load-balancing services 258, and optionally other performance-related services 260 provided by the OS 210. As such, the Orchestration service 222 may be invoked or accessed by the other OS services 215, 218, 220, 225, and the Orchestration service 222 may in turn invoke or access one or more of the performance-related services 252-260. Generally speaking, the Orchestration service 222 allocates resources to containerized components and SD data storage entities of the logical process control system 245 so that the containerized components are able to operate efficiently and safely, e.g., to control the industrial process, at least at a best-effort performance level.

To this end, the performance-related services 252-260 of the OS 210 may monitor performance parameters, resource usage, and/or criteria during run-time, detect any associated conditions which occur and/or which are predicted to occur, and provide and/or implement any changes in assignments of application layer software components (e.g., containerized components) 212 to hardware and/or software resources of the computing platform 205. Accordingly, during run-time of the system 100, as various expected and/or unexpected hardware and/or software conditions arise and are detected, the Orchestration service 222 responsively adjusts the allocation of hardware and/or software resources of various compute fabric nodes Ny to instantiated container images to maintain (or attempt to maintain) a target or best-effort level of performance and fidelity of operations. Detected conditions which may cause the Orchestration service 222 to modify allocations and/or assignments between containerized components 212 and physical resources of nodes Ny may include, for example, hardware faults or failures, software faults or failures, overloading of a specific compute fabric node, increased or decreased bandwidth of various networking components, addition or removal of compute fabric nodes and/or clusters of compute fabric nodes, hardware and/or software upgrades, pinning and/or unpinning of containerized services and/or applications, diagnostics, maintenance, and other routines which may cause hardware and/or software resources to be temporarily unavailable for run-time use, etc. Possible responsive and/or mitigating administrative actions which may be taken by the Orchestration service 222 may include, for example, re-assigning containerized services and/or applications to execute using different software and/or hardware resources (in some cases, on different nodes Ny), activating and/or deactivating software and/or hardware resources, changing priorities of various containerized components' access to various software and/or hardware resources, etc.

Accordingly, and generally speaking, the services, sub-systems, and other software components of the software defined application layer 212 (e.g., 235, 238, 240) may determine, define, or specify the processing, containerization, networking, and storage needs of the logical process control system 245, both at an individual container level and at aggregate levels (e.g., at a subsystem level, unit level, area level, and/or the process control system 245 as a whole). By way of the APIs 228 (and, in some configurations, also by way of the HCI adaptor layer 230 and APIs 232), the OS 210, its support services 215, 218, 220, 222, 225, and its Orchestration service 222 administer and manage the hardware and software resources of the compute fabric nodes Ny to support those needs. For example, in some embodiments, the SD Orchestrator 222 may cause different instances of a particular control routine 235 or of a particular other service 240 to execute on different nodes Ny, e.g., for fault tolerance, quality of service, and/or other performance criteria of the compute fabric 200. Advantageously, as the needs of the logical process control system 245 dynamically change over time, the OS support services 215, 218, 220, 222, 225 and/or the Orchestration service 222 may modify, change, and adjust the usage of the hardware and software resources of the nodes Ny, e.g., in a responsive and/or in a predictive manner.

For example, when the logical process control system 245 creates additional instances of control services 235 executing in additional containers, the OS support services 215-225 may responsively (via the APIS 228 and optionally the HCI adaptor 230 and the APIs 232) assign the newly created containerized components to execute on corresponding compute fabric nodes Ny, may re-balance existing containerized components among nodes Ny, may assign specific hardware memory resources to support the logical memory resource needs of the additional containerized components, may adjust routing tables utilized by the nodes Ny to support the logical routing needs of the newly created containerized components, etc. In another example, when a particular cluster C2 needs to be taken out of service (e.g., expectedly for maintenance purposes or unexpectedly due to a lightning strike), the OS support services 215-225 may pre-emptively re-assign containerized components that are presently assigned to execute on cluster C2 to other clusters in accordance with the present needs of the logical process control system 245 and the availability of hardware and/or software resources of the other clusters, and the support services 215-225 may adjust routing tables utilized by the clusters Cx accordingly so that continuity of execution of said containerized components is maintained even when the cluster C2 is taken out of service.

As such, the software defined networking layer 210 automatically, dynamically, and responsively determines, initiates, and performs changes to the allocation of hardware and software resources of the nodes Ny of the computing platform 205 to different application layer software components 212 based on detected conditions, such as improvement in performance of individual logical and/or physical components or groups thereof, degradation of performance of individual logical and/or physical components or groups thereof, fault occurrences, failures of logical and/or physical components, configuration changes (e.g., due to user commands or due to automatic re-configuration by services of the compute fabric 200), etc. Consequently, the compute fabric 200 may automatically redistribute hardware and software resources of the nodes Ny responsive to changing conditions and components of the compute fabric 200 to thereby support the process control system 245 and other services executing at the application layer 212 of the compute fabric 200.

Simulation

In some implementations, the compute fabric 200 may implement simulations of or changes to various application services 235, 240, 248, to the entire software application layer 212, to various support services 215-225, 252-260, and/or to the entire software defined networking layer 210. That is, a simulation of the target components/layers may execute in concert with the active software defined components/layers on top of the computing platform 205, and thereby receive run-time data from the field environment of the industrial process plant and operate accordingly, e.g., with the same logic, states, timing, etc. as the active target components/layers, or with the simulated test logic, states, timing, etc. However, the I/O and other types of data generated by the simulation are prevented from being delivered to the field environment, and simulations may be paused, sped up, slowed down, fed test inputs, and otherwise managed to observe behavior and make modifications to the simulated components/layers. Accordingly, upon approval of a simulated portion of the compute fabric 200, the simulated portion may simply be activated for use during run-time operations of the industrial process plant, without needing to pause or take part of the compute fabric 200 out of service to do so.

Example Security Features of the NGPCAS

Next, various security features of the Next Generation Process Control and Automation System (NGPCAS) 100 are described. As previously discussed, present-day process control and automation systems that are designed around the Purdue model suffer from many drawbacks, including increased complexity (and thus, more opportunity for component and process failure), decreased performance, and greater risk of cyber-intrusion, to name a few. For example, in present-day process control and automation systems, typically at least three different domains may exist between Levels 2, 3, and 4, and the security policies for each domain may be different and require different security management techniques. As such, cross-level connectivity is challenging to implement, as well as can introduce significant delays for the delivery of data across multiple Purdue levels, e.g., from Level 2 to Level 4 and above. Further, industries are looking towards being able to deliver instructions, commands, and/or other information from higher levels of the Purdue model to lower levels. For example, a technician or other process plant personnel may be working remotely via his or her portable computing device, and may want to monitor run-time process plant operations and adjust configurations, parameter values, settings, etc. within the process control system in response to monitored conditions. In such situations, when instructions and information move from higher levels of the Purdue model to lower levels (e.g., via "holes" that are added to the established security mechanisms for these purposes), outbound firewalls and other currently implemented security mechanisms that are designed and utilized to prevent the inflow of external information into the plant must necessarily be compromised, thereby introducing significant additional risk of external parties accessing the information and data in the protected lower levels of the plant and other types of cyber-intrusion. Moreover, the multiple security mechanisms implemented between Purdue layers, either as initially designed or with any added "holes,"

create a highly complex network, which is difficult to engineer, maintain, and utilize to efficiently deliver information between Purdue levels.

Further, in present-day systems that perform some process control and/or automation functionality in the cloud, other undesirable issues are introduced. For example, when the process plant of such systems loses Internet connectivity, the cloud cannot be accessed, and any control or automation functionality provided by the cloud is unavailable. Additionally, still further latency, bottlenecks, and complexity are added with cloud-based implementations beyond those introduced by Purdue-model implementations. Moreover, sufficiently secure mechanisms for supporting native communication between process control devices (e.g., field devices) and the cloud do not exist.

The security features of the NGPCAS 100 address at least these known security issues of Purdue model implementations as well as provide additional security, improved performance, easier engineering and maintenance of the NGPCAS 100, as well as other benefits and advantages. Examples of such security features are described below. Any of the described security features may be used as a stand-alone security feature or in combination with any other one or more security features. In some embodiments, various security features of the NGPCAS 100 may be implemented as services 225 provided by the software defined networking layer 210 of the compute fabric 200. Additionally, the software defined networking layer 210 may provide other services 215 that manage resources and/or groupings of hardware and/or software resources of the software defined networking layer 210 and/or the physical layer 205 of the compute fabric 200 that are allocated and/or utilized to support the security features of the NGPCAS 100.

Example Network Security Features of the NGPCAS

As previously discussed, communications between nodes, configured containers, locations, devices, and/or other portions of the NGPCAS 100 as well as human-operated computing devices 155 (if any) may be secured via one or more VPNs, which may include mutually-exclusive and/or nested VPNs. As previously indicated, for ease of discussion and not limitations purposes, the term "VPN" is utilized herein to generally and categorically refer to various types of secured, encrypted point-to-point (PTP), peer-to-peer (P2P), and/or point-to-multipoint (PTM) connections. At any rate, each VPN, nested or otherwise, may block traffic from nodes, components, etc. that are not included in the VPN, and endpoints of the VPN may communicate with each other over the VPN via respective sessions. The VPN configuration (e.g., the number of VPNs, types of VPNs, nesting of VPNs, etc.) of the NGPCAS 100 may be implemented over one or more public and/or private networks, including private enterprise networks, the public Internet, etc. Additionally, the VPN configuration of the NGPCAS 100 may be customized to meet the security needs and requirements of the enterprise and/or of the architecture provider manager, for example. If desired, at least one of the VPNs of the NGPCAS 100 may be a permanent VPN.

Referring to FIGS. 1 to 3 to illustrate, in an example minimal VPN configuration, communications between the physical or field environment 120 of the NGPCAS 100 (e.g., all of or an entirety of the components, devices, etc. of the NGPCAS 100 that are disposed in the field environment 120) and the compute fabric 102 of the NGPCAS 100 (including all of or an entirety of the containerized components included in the compute fabric 102) may be protected via only a single VPN. In an example maximal VPN configuration, communications between any pair of entities of the NGPCAS 100 (e.g., exposed APIs 160, 165, other containerized components/MEEEs/granules 140, the compute fabric 102, physical components 135, locations 115, 118, the entire physical environment 120, user applications and/or devices 155, architecture provider/manager applications and/or devices 161, etc.) may be protected via a respective VPN. For instance, in the maximal VPN configuration, a configured container providing control service functionality that requires the use of a utility functionality to execute the control service may communicate with a configured container providing the utility functionality via a respective VPN. In embodiments, a VPN configuration of the NGPCAS 100 may include one or more of:

A point-to-point VPN, e.g., a VPN exclusively servicing communications between only one physical component 135 and only one containerized component/MEEE/granule 140;

A point-to-multipoint VPN, e.g., a VPN exclusively servicing communications between only one physical component 135 and multiple containerized components/MEEEs/granules 140, a VPN exclusively servicing communications between multiple physical components 135 and only one containerized component/MEEE/granule 140, etc.;

a multipoint-to-multipoint VPN, e.g., a VPN exclusively servicing communications between only a subset of an entirety of physical components 135 at a location 115 and a subset of an entirety of containerized components/MEEEs/granules 140 at the compute fabric 120;

a VPN exclusively servicing communications between different layers of the compute fabric 200, e.g., communications between the software defined application layer 212 and the software defined networking layer 210;

a VPN exclusively servicing communications between one or more selected services, subsystems, and functionalities of different layers of the compute fabric 200, e.g., between a selected one or more of the services and/or subsystems 235, 238, 240 at the application layer 212 and a selected one or more of the software defined services and/or functions 215, 218, 220, 225 at the networking layer 210;

a VPN exclusively servicing only an API 160 and an instance of a user application 155, and one or more other VPNs exclusively servicing the API 160 and one or more containerized components/MEEEs/granules 140 and/or physical components 135, 138 needed to obtain or provide data to the user application 155, e.g., in point (e.g., API 160)-to-point and/or point (e.g., API 160)-to-multipoint manners;

a location-to-location VPN, e.g., a VPN exclusively servicing communications between only a single location 135 and the compute fabric 102 as a whole;

a multi-location VPN, e.g., a VPN exclusively servicing communications between the compute fabric 102 and multiple locations 115, 118 that collectively are only a subset of an entirety of the locations of the NGPCAS 100;

and/or other types of VPNs that protect and secure communications between designated or defined endpoints within the NGPCAS 100 (e.g., nodes, configured containers (which may include APIs 160, 161), locations, devices, and/or other portions of the NGPCAS 100). Indeed, in embodiments, each endpoint may be required to authenticate to each VPN that the endpoint will utilize for sending and/or receiving communications with one or more other entities that have respectively authenticated to the VPN.

Example User Security Features of the NGPCAS

As previously mentioned, the users 155 of the NGPCAS 100 may include a human user operating a computing device at which one or more applications (e.g., a web browser, a thin client, or another user interface) execute to communicate with the NGPCAS 100, such as an operator, a configuration engineer, a third-party person who has been approved by the enterprise to access at least a portion of the system 100, another agent of the enterprise, or an agent of the architecture provider/manager 161, to name a few. Additionally or alternatively, the users 155 may include an automated user such as an external application or service that does not have a user interface and that executes on an external (e.g., remote) computing device or system. The external application/service users 155 may be enterprise-based, e.g., applications and/or services that have been configured by enterprise personnel, or may be third-party applications and/or services. Some of the external application/service users 155 may be applications and/or services provided by the architecture provider/manager 161, for utilization by the architecture provider/manager 161 and/or by enterprises. At any rate, to secure the system 100 against possible cyber-attacks when legitimate users 155 access system data and/or functionalities, each user 155 may be required to utilize one or more exposed APIs 160 to interface with and/or access the system data and/or functionalities provided by the NGPCAS 100. For example, the functionalities that are provided by the NGPCAS 100 for users 155 to utilize may be implemented in the compute fabric 102 as respective containerized components/MEEEs/granules 140, and such containerized components may be exposed to users 155 only via APIs 160 (e.g., as websites, services, etc.), where the APIs 160 may be accessed by the users 155, for example, via web browsers or thin clients. Typically, any functionality (e.g., all functionalities) that are provided by the NGPCAS 100 for users 155 to utilize is accessible to users 155 only via one or more respective APIs 160. Further, for still additional security, communications between the user 155 and the one or more APIs 160 may be secured via respective VPNs 158. For yet further security, the user 155 may be required to first be authenticated to the VPN 158 before being able to take advantage of the APIs 160, and human users in particular may be subject to multi-factor authentication in order to obtain access to the VPN 158.

In some situations, particular users 155 may be authenticated and/or authorized to utilize only a subset of the available, exposed APIs 160. That is, the set of APIs 160 that are exposed to different users 155 and/or that different users are authorized to access may differ based on the users' respective credentials. For example, authorization of different users 155 to different APIs 160 may be based on the containerized component(s) 140 (e.g., applications and/or services) to which access is provided by the APIs 160. Additionally or alternatively, authorization of different users 155 to different be APIs 160 may be implemented on an enterprise-basis (e.g., users 155 of enterprise A are allowed access to a first subset of the APIs 160 and users 155 of enterprise B are allowed access to a second, different subset of the APIs 160); on a location-basis; on a node-basis, on a user-credential basis (e.g., roles, responsibilities, and/or skills of the user), on a time-basis, and/or based on combinations thereof.

As such, by using VPNs to secure communications within the NGPCAS 100, security mechanisms which are utilized between layers of Purdue model-based systems (e.g., firewalls, data diodes, DMZs, and other mechanisms) to secure cross-level communications may be eliminated. Indeed, in an embodiment, the NGPCAS 100 does not include (e.g., excludes) any firewalls, data relays, data diodes, and DMZs that are utilized to secure communications and data delivery to, from, and within the NGPCAS 100, thereby simplifying the design, engineering, configuring, maintenance, and run-time performance of the NGPCAS 100 as compared to Purdue model-based systems. Further, as each VPN blocks or does not process any traffic that originates from outside of the VPN, and as any and all human users and/or automated users 155 of a VPN must be authenticated to the VPN, data utilized within the process control or automation system is exposed only to those components/entities that have been authorized to access the VPN over which the data is delivered. Accordingly, opportunities for externally-initiated cyber-security breaches and the spread of malware are significantly decreased as compared to present-day systems, or even, in some cases, are eliminated.

Still further, as access to selected functionalities provided by the NGPCAS 100 is provided to users 155 via APIs 160, and as users 155 must be authenticated to a VPN 158 and optionally authenticated to utilize particular APIs 160 as discussed above, cyber-security risk is even more significantly decreased as compared to the cyber-security risks of present-day systems. For example, such security techniques utilized within the NGPCAS 100 eliminate the need for any NGPCAS-specific software to be installed on some external computing devices (such as those operated by human users). That is, such external computing devices may have no (e.g., zero) installed, NGPCAS-specific software, thereby eliminating another possible avenue for cyber-security breaches. In another example, computing devices which are operated by users 155 (human or automated) may be authenticated to a VPN 158 that is not utilized by any component of the NGPCAS 100. That is, the VPN(s) that are utilized by users 155 (and optionally by the APIs 160 which are exposed to the users 155) and the VPN(s) that are utilized by other, non-user components and/or entities of the NPGCAS 100 may be mutually exclusive VPNs, thereby further eliminating other possible avenues for cyber-security breaches. In yet another example, unauthorized (but otherwise valid) users 155 may be prevented from any access at all (including read-only access) to the NGPCAS 100 or portions thereof.

Example Identity Security Features of the NGPCAS

As previously mentioned, each component of the NGPCAS 100 (each containerized component/MEEE/granule 140, each physical component 135, each device 105, 125, 108, 128, 148, each location 115, 118, the compute fabric 145, the architecture provider/manager 161, or generally speaking, any component which may serve as an endpoint within NGPCAS 100 networks) may be uniquely identified within the NGPCAS 100 by a unique network identifier. In embodiments, the unique network identifier of a subject component is based on an identification of the subject component as defined within a configuration database of the NGPCAS 100. In a manner similar to that discussed above for the users 155 of the NGPCAS 100, each component may be authenticated and authorized based on its unique network identifier in order for the component to access one or more VPNs, to communicate with one or more nodes, configured containers, locations, devices, and/or other components, etc. Generally speaking, components of the NGPCAS 100 (e.g., all components of the NGPCAS 100) having unique network identifiers can be discovered within the NGPCAS 100 and may be required to utilize a respective certificate to be authenticated and authorized for access.

At least some of the physical devices 105, 125, 108, 128, 148 included in the NGPCAS 100 may also include a device identifier that is unique across an enterprise. In these devices, an indication of the association between the device's unique device identifier and the device's unique network identifier may be stored, e.g., within the device itself, in a configuration database of the NGPCAS 100, in a network manager of the NGPCAS 100, etc.

Example Communications Security Features of the NGPCAS

To further secure the NGPCAS 100, all communications that are sent and received via the networks of the NGPCAS 100 (e.g., via the VPNs 130, 158, 162 between various authenticated and authorized components) may be required to be signed and encrypted. Additionally or alternatively, plaintext protocols (such as HTTP) may be forbidden or otherwise prevented from being utilized within the NGPCAS 100. For still further security in arrangements in which an architecture provider/manager 161 manages multiple NGPCASs 100 for multiple enterprises, each enterprise may have a different Certificate Authority (CA), and self-signed certificates may be forbidden or otherwise prevented from being used. Generally speaking, to maintain security within the NGPCAS 100 over time, certificates may support revocation, have modifiable key sizes (e.g., to support system growth), and may auto-refresh without any enterprise intervention.

Example Compute Fabric Security Features of the NGPCAS

With particular regard to securing the compute fabric architecture 200 and components thereof, various security techniques may be employed within the NGPCAS 100. For example, as mentioned above, containerized components/MEEEs/granules 140 of the compute fabric 102/200 (e.g., APIs 160, 165; services and subsystems 235, 238, 240 248, 213 242 at the software defined application layer 212; services and functions 215, 218, 220, 222, 225, 252, 255, 258, 260 at the software defined network layer 210; APIs 228, 232 and/or other services provided at the adaptor layer 230, etc.) may be configured for client certificate access, where the client may be, for example, another containerized component/MEEE/granule 140, a user 155, or the architecture provider/manager 161. That is, no anonymous access to containerized components/MEEEs/granules 140 may be allowed, and only certain clients may be provided access to certain containerized components/MEEEs/granules 140 (e.g., via corresponding client certificates). Further, client certificates may be automatically and frequently rotated. Additionally, in embodiments, unused features (e.g., applications, services, etc.) may be placed in a disabled (not enabled) state.

Further, containerized components/MEEEs/granules 140 may be signed and scanned regularly for known vulnerabilities. Containerized components/MEEEs/granules 140 may be required to execute or run (e.g., always run) with least privilege, and the runtime of containerized components/MEEEs/granules 140 may be required to utilize a maximum level of container isolation, e.g., by default. In some implementations, the definition of groupings of containerized components may be prevented or restricted. For example, the NGPCAS 100 may be allowed to only define groups of containerized components that are specifically related to process control system components. For instance, a group of containerized components utilized for a bioreactor maybe defined or configured as a bioreactor grouping (e.g., by using a pod or other suitable mechanism provided by the operating system 210 of the compute fabric 200) so that the bioreactor grouping of containerized components can be co-located and moved together, e.g., to execute on different nodes, clusters, segments, etc.

At the physical layer 205 of the compute fabric 200, access to different nodes Ny, different segments of hardware, different clusters C1, . . . Cn, etc. may be controlled, e.g., on a server-basis, on an API-basis, etc. Still further, static data and disks may be encrypted at rest.

Example Hardware Security Features of the NGPCAS

In embodiments, field devices, hardware I/O devices, gateways, and other devices may include one or more forms embedded device identification ("EDID"). In the same way that a serial number indicates a specific instance of a product, and may indicate additional information about the model, options, or other data about the product, the EDID is associated with and/or indicates an individual instance of a device or product and/or may be associated with and/or indicate additional information. As will be described below, the EDID may facilitate faster and less labor-intensive commissioning of process plants, in addition to a variety of security and other benefits.

Configuration System Components within an NGPCAS

As will be understood, the NGPCAS with the compute fabric structure as described herein provides for or enables the software implemented components thereof to be highly configurable, transportable and editable, as most of the control and support components (e.g., control modules, containers, etc.) are located in and are executed in the compute fabric without needing to be tied to specific or pre-determined computer hardware (e.g., specific servers, processors, computer nodes, etc.) This feature enables system set up and configuration activities to be performed more quickly and easily than traditional control systems, as it enables enterprise system owners or managers to store configuration components for their systems in the compute fabric, to access these components from anywhere, to copy these components to create or add additional control system structure associated with, for example, new plants or new physical locations being added to the enterprise, to new hardware installed at an existing physical location, etc. without needing to specify the location of or specifics of the computer hardware used to implement the additional configuration components. Moreover, this system can still be used to support multiple different sites, locations, regions, and divisions of an enterprise having plants or processes located at different physical sites, in different regions, associated with different divisions to support the manufacture of one or more different products.

Still further, the architecture described herein enables faster development of and testing of components to be added to a control system as the architecture enables control or other system containers or products to be developed and provided in a container registry or in a product registry for download and implementation by an enterprise system at the will of and the timing of the enterprise system or the enterprise system manager. Feedback from the operation of these downloaded and implemented containers or products can also be automatically provided back from the compute fabric of an enterprise to the developer to test, upgrade and change the container or product as part of the development cycle. This architecture enables or results in a quicker development cycle as it provides for quicker implementation of new features or products and provides for automatic feedback regarding the operation of new or changed components. However, this development is still performed and implemented in a manner that enables each enterprise operator or manager to control when new containers or products are downloaded to and implemented in their systems.

In any event, as illustrated in FIGS. 1 and 2, each enterprise may include a configuration system (166, 167, 168) having one or more configuration databases (which may be one or more different computer databases or memories) that stores configuration elements for the enterprise or for portions of that enterprise and one or more configuration applications that enables a user to view, change and manipulate the configuration database to effect and to implement configuration changes of the enterprise, including both configuration changes within elements executed in the compute fabric of the enterprise and within hardware and software within or associated with one or more physical locations of the enterprise. The enterprise configuration database of the configuration systems may, for example, store libraries of elements (e.g., containers, modules, applications, products, etc.) used in the enterprise and may store information defining the identity of and configuration of each element, groups of elements, containers, control systems, etc. as currently operating in the compute fabric or in devices within the physical locations of the enterprise. Moreover, the configuration applications may enable the enterprise owner or manager to view and to make changes to the configuration of any of the elements of the enterprise including making changes to the control systems, adding or deleting logical or physical equipment or components (and even physical locations) to or from the enterprise system, changing the location of or the pinning of various different resources or components (e.g., containers) within the compute fabric, adding new field devices, I/O devices, etc. Additionally, the applications of the configuration system may, upon instructions by the user, implement the configuration changes by downloading or changing logical or software elements (e.g., containers) within the compute fabric or within devices at the physical locations according to the user's changes. The configuration system described herein enables configuration changes to be made from any location within the enterprise, including from configuration interfaces connected directly to the compute fabric of the enterprise or from configuration interfaces connected to or located at physical locations of the enterprise, wherein such configuration interfaces may be associated with a legacy control or other system at the physical location.

In any event, as the control elements within the compute fabric are generally not tied to specific computer hardware within the compute fabric, the configuration system described herein can easily make changes, deletions, additions, etc. to the elements actually running in the compute fabric without the user needing to specify where exactly to install those components, making it possible for the user to specify logical configuration changes to be made and pushing a button to implement those changes in actual hardware as currently operating in the compute fabric. The underlying compute fabric management system can then locate (or assign) the computer hardware implementing the changed or new components and make the changes seamlessly to the user. While the configuration systems described herein are generally illustrated as being stored in and executed in the compute fabric of the enterprise, one or more components of the configuration systems could be located in computer hardware at one or more of the physical locations of an enterprise, in off-site compute fabric resources, spread or shared between compute fabric at one or more physical locations and offsite or licensed compute fabric hardware, stored in dedicated machines in the compute fabric or in one or more of the physical locations, or in any other manner.

FIGS. 4-11 and the description associated therewith illustrate and describe a configuration system that may be used in the enterprise based control and automation systems of FIGS. 1-3. This configuration system may be used to implement, view and track configuration changes made to different devices and software components across an entire enterprise, including devices and software components (e.g., containers) of the same or different sites of an enterprise (e.g., plants, areas of a plant, physical locations of an enterprise), regions of an enterprise (e.g., geographical regions defined by an enterprise), divisions of an enterprise (e.g., product lines or management divisions of an enterprise), etc. FIGS. 12-15 and the description associated therewith illustrate some applications or high level systems that may use the underlying configuration system components of FIGS. 4-11 to make configuration changes in various portions of an enterprise in an organized or useful manner. While the configuration systems of FIGS. 4-15 are generally described as being associated with a process control configuration system, which is used to configure one or more process control or automation systems associated with an enterprise, the configuration systems described herein could be associated with any other type of configuration systems, such as configuration systems associated with maintenance or monitoring systems which monitor devices or systems within various different areas, locations sites, regions, divisions, etc. of an enterprise. It will therefore be understood that a process control configuration system is described herein only as an example of a configuration system that may be implemented using the techniques described herein.

Figure 4:
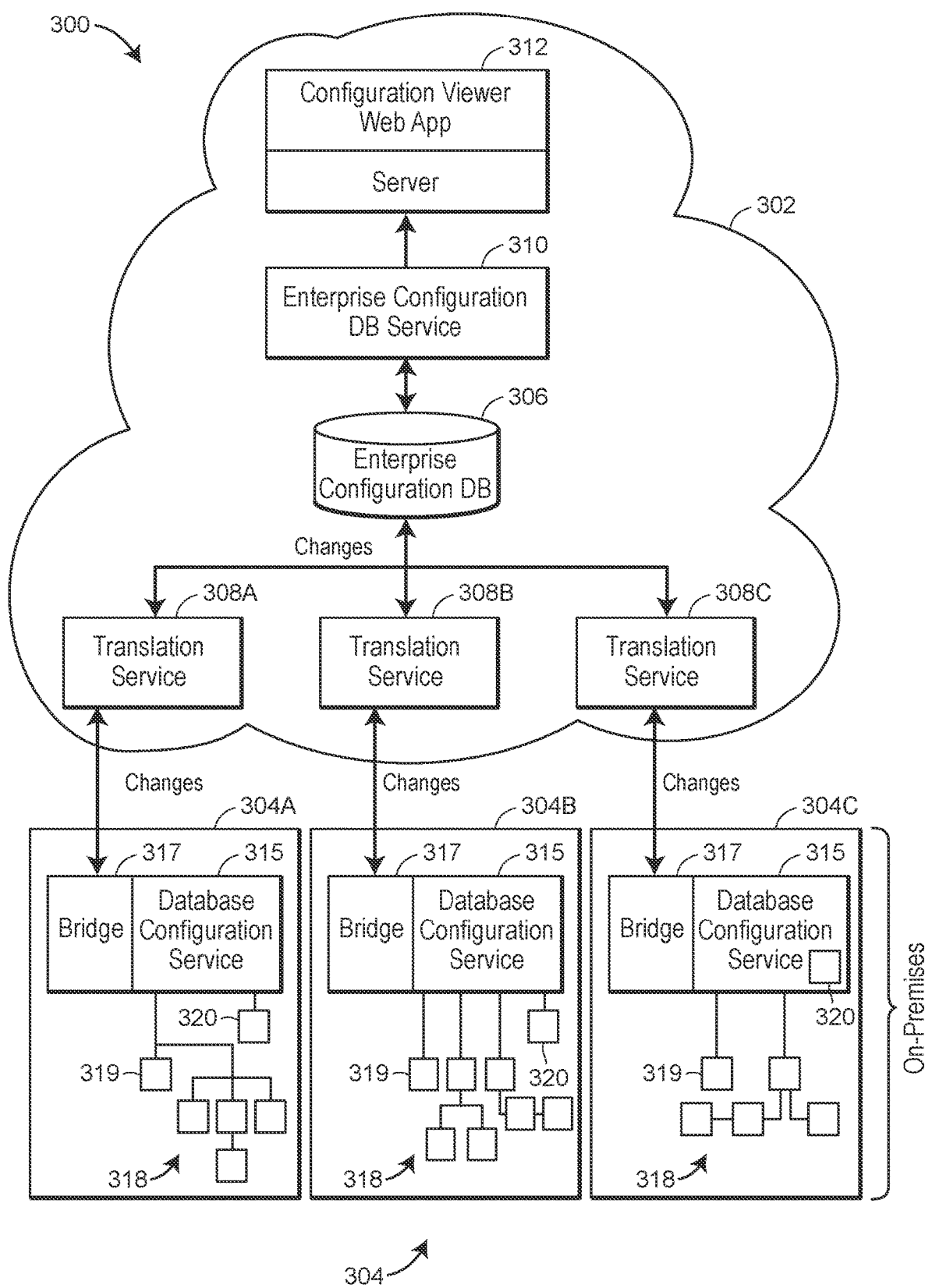
FIG. 4 is a diagram of an enterprise engineering and configuration system which may be used in the systems of FIGS. 1 and 2.

Referring now to FIG. 4, a configuration system 300 for an enterprise having the NGPCAS described herein is illustrated in more detail. In particular, the configuration system 300 includes components implemented in a compute fabric 302 of the enterprise (which could be the compute fabrics of any of FIGS. 1-3) and has components implemented in one or more physical locations 304 of the enterprise. In the example enterprise system of FIG. 4, the compute fabric 302 is connected to three different sites or physical locations, 304A, 304B and 304C using the techniques described herein. Each of the different sites or physical locations 304 may include different process control systems, or portions of different process control systems, used to control and/or monitor devices, such as field devices, at the physical locations 304. Such process control or automation systems may include field devices, input/output (I/O) devices, process controllers, user interfaces, communication networks, local configuration databases, etc. associated with or implementing any desired type of control or automation system. In this example, the site or physical location 304A may include a first distributed process control system which implements a legacy DeltaV process control system, such as that manufactured by the Emerson Electric Co. Moreover, the site or physical location 304B may include or implement a second distributed process control system which may be provided by or associated with a different manufacturer, such as a Hive process control system manufactured by Honeywell, or a process control system manufactured by ABB, Siemens, Yokagawa, etc. Still further, in this example, the third site or physical location 304C may include a different type of process control system, such as a PLC based process control system and/or may include a process control system that uses the well-known OPC UA communication standard to interface with and provide communications with or within the process control system. While only three sites or physical locations 304A, 304B, 304C are illustrated in FIG. 4, the enterprise could include any other number of physical locations and each of these other sites or physical locations, or portions thereof, may include any type of legacy process control or automation system therein made by any desired manufacturer, or may include a process control system as generally described with respect to FIGS. 1 and 2 in which field devices and I/O devices are located at the physical site and control elements for the physical site are implemented in the compute fabric, either in the cloud, for example, or at the physical site.

The configuration system 300 of FIG. 4 generally includes an enterprise configuration database 306 stored in and implemented in the compute fabric 302, and the enterprise configuration database 306 is connected to one or more translation services 308 (each of which is, in turn, connected to one of the sites or physical locations 304) and to one or more enterprise configuration database services modules 310. Both the translation services 308 and the enterprise configuration database services modules 310 are stored in an executed in the compute fabric 302 of the enterprise. As illustrated in FIG. 4, the enterprise configuration database service module 310 is also connected to or accessible by a configuration viewing system, device or application 312 which may be implemented in or connected to the compute fabric 302 in the manners described herein for the users 155 of FIGS. 1 and 2. Because the components 310, 306 and 308 are disposed within the compute fabric 302, these services, applications and database structures may be implemented as, and may be managed, supported, updated and controlled in the manners described above with respect to the granules 140 of FIGS. 1 and 2 using the compute fabric structures described with respect to FIG. 3.

As also illustrated in FIG. 4, the configuration system 300 may include one or more components disposed at each of the sites or physical locations 304 at which control, monitoring and automation activities are implemented. In particular, the configuration system 300 includes a local database configuration service 315 and a bridge device 317 disposed at each of the physical locations 304A, 304B, 304C. Generally, each of the local database configuration services 315 is tied into or connected to a (e.g., legacy) process control or automation system 318 at the associated physical location 304 and receives data indicating changes being made to that system or data indicating read requests from the enterprise configuration database 306 in the compute fabric from users of that system. Each of the local database configuration services 315 may be also connected to a local configuration database 319 which stores configuration data for the devices and systems at a particular physical location 304 (or some portion thereof) and/or each of the local database configuration services 315 may include, be connected to or may implement a local configuration viewing application 320. Such a local configuration viewing application 320 may be an application produced by or provided by the manufacturers of the process control systems at the physical locations 304, for example, which enables a user to access the local configuration database 319, to view configuration data associated with and to make configuration changes to the devices, software and systems in the process control system at the physical location 304. (Such a configuration viewing application could be, for example, a DeltaV Control Studio application for a DeltaV process control system.) As will be understood, each of the local database configuration services 315 sits on top of or is integrated with the process control system at one of the sites 304 and has access to data generated in and used by the control system at that site 304. The local database configuration service 315 may also include a user interface device which enables a user at the physical location 304 to view and make changes to the configuration of the devices and systems at the physical location or site 304. However, generally speaking, each local database configuration service 315 is limited to viewing and changing the configuration data for the process control system devices and software at or associated with the physical location 304 at which the local database configuration service 315 is located.

The bridge device 317 is a communication gateway device that connects the process control system (and the database configuration service 315) at each of the physical locations 304 to the compute fabric 302 and, in particular, to one of the translation services 308 implemented in the compute fabric 302 of the enterprise. The bridge device 317 provides the communication structure to connect the physical location 304 to the compute fabric 302, and may be implemented as any of the gateway devices 148, 180 of FIGS. 1 and 2 and may include the communication and security features described with respect thereto.

Generally speaking the enterprise configuration database 306 stores and manages the data, i.e., configuration data, from each of the control systems within the plant facilities or sites 304A, 304B, 304C, and any configuration data for control elements implemented in the compute fabric 302 for any of the control or automation systems implemented in the physical locations 304A, 304B, 304C. The enterprise configuration database 306 thereby integrates the configuration data from across multiple sites or locations 304 of the enterprise into a common database generally accessible from anywhere in the enterprise. In some cases, the enterprise configuration database 306 may integrate the configuration data for devices and systems across the entire enterprise, i.e., from each and every one of the sites 304 of the enterprise, and in other cases may integrate the configuration data for devices and systems across a subset of the sites 304 of the enterprise. Generally speaking, the enterprise configuration database 306 stores the configuration data in a common framework or using a common configuration data schema that uses a single data model to manage and understand the types of and interrelationships between configuration data from the various different locations, sites, control and automation systems, etc. to which the configuration data pertains. Moreover, the enterprise configuration database 306 and the enterprise database services 310 allow users to configure, debug, diagnose, and track configuration across multiple sites 304 (or parts of sites 304). The enterprise configuration system 300 also allows users to develop standardized classes and then apply those classes across all locations, and enables users to track versions of components across systems, compare performance, etc.

Generally speaking, the enterprise configuration database services modules 310, also referred to herein as the enterprise configuration database services 310, receives and manages the reads from and the writes to the enterprise configuration database 306 and operate to enforce the common configuration data schema or data model when reading from or writing to the enterprise configuration database 306. The enterprise configuration database services 310 additionally may include services (applications, containers, granules, etc.) that track configuration data changes made to the enterprise configuration database 306 (such as what data was changed, who made the change, the authorization for the change, the time of the change, etc.), that schedule changes to be made either to the enterprise configuration database 306 or to the process control and automation systems implemented at the sites 304 (and in some cases at least partially in the compute fabric 302), to enforce data rules for the configuration data stored in the enterprise configuration database 306, to send notifications of read and/or write requests being made from or to the engineering configuration database 306 to other users, etc.

The configuration viewing application 312 may be a configuration viewing and changing interface or application that enables a user, such as enterprise configuration engineer, to access the configuration data stored in the enterprise configuration database 306 to read that data and to change that data, i.e., to make writes to the configuration data, etc. It will be understood that the configuration viewing application 312 may by any type of configuration viewing application and may operate using any desired configuration data schema or data model. Thus, for example, the configuration viewing application 312 may be a configuration viewing application associated with a legacy process control system, such as a DeltaV Control Studio application, may be a configuration viewing application associated with or that uses a known generic data model to perform data calls, such as those that use or support the OPC UA communications data model, or may be a configuration viewing application that uses the common data framework or data model used in the enterprise configuration database 306.

As noted above, the translation services 308 additionally interface with the enterprise configuration database 306 to make reads from and writes to the enterprise configuration database 306 using the common configuration data framework or schema. To do so, each translation service 308 is configured to translate configuration data or data calls received from a local database configuration service 315 from the configuration data framework or data schema used by the local database configuration services 315 (e.g., using the configuration data framework or schema used in the process control or automation system at the associated site 304) to the common configuration data framework or data schema used in the enterprise configuration database 306. Likewise, each translation service 308 is configured to translate configuration data or data messages received from the enterprise configuration database 306 from the common configuration data schema or framework used in the enterprise configuration database 306 to the configuration data framework or data schema used by a particular one of the local database configuration services 315 (e.g., using the configuration data framework or schema used in the process control or automation system at the associated site 304) prior to sending that data and/or messages to the local database configuration services 315 via one of the bridge devices 317. While the translation services 308 are illustrated as communicating directly with the enterprise configuration database 306, the translation services 308 may instead communicate with the enterprise configuration database 306 via one or more of the enterprise configuration database services modules 310.

During operation, the configuration system 300 of FIG. 4 enables users using one or more of the configuration viewing applications 312 connected directly to the compute fabric 302 of the enterprise to view and make changes to the configuration data as stored in the enterprise configuration database 306 so as to view and make changes to the configuration of devices or systems in or implemented at one or more of the physical locations 304 (and/or at least partially in the compute fabric 302 itself). As will be understood, the configuration viewer 312 may be used to implement configuration data reads and writes for configuration data used at or associated with any of the systems at any of the sites 304. Thus, the configuration viewer 312 may be advantageously used by a configuration engineer that has responsibility for the configuration of multiple sites 304. More particularly, when a user at the configuration viewer 312 makes a read of configuration data from the configuration database 306 (which reflects the configuration of the process control and automation systems within the enterprise), the configuration viewing application 312 sends a read call or message to one of the enterprise configuration database services modules 310, which then parses this message to obtain or determine which configuration data is being read (in addition to implementing security features such as determining if the requestor has the appropriate authority for reading the data). To perform the function, the enterprise configuration database services module 310 translates the configuration data from the configuration data schema used by the configuration viewing application 312 into the common configuration framework or data schema using a data model associated with or defining the common configuration data schema. The configuration database services module 310 then accesses and reads the appropriate configuration data from the enterprise configuration database 306, translates that data (again using the common configuration schema data model) into the configuration data schema used by the configuration viewing application 312 and sends that data to the configuration viewing application 312.

Likewise, when a user at the configuration viewing application 312 wants to make a write to or to change the configuration data within the enterprise configuration database 306, the configuration viewing application 312 sends a write call or message to the enterprise configuration database services 310, which then parses this message to obtain or determine which configuration data is being changed or written over (in addition to implementing security features such as determining if the requestor has the appropriate authority for writing or changing this data). To perform this function, the enterprise configuration database services module 310 translates the configuration data from the configuration data schema used by the configuration viewing application 312 into the common configuration framework or data schema using a data model associated with or defining the common configuration data schema. The configuration database services module 310 then accesses the enterprise configuration database 306 and writes the appropriate configuration data into the enterprise configuration database 306 using the common configuration data schema. The enterprise configuration database services module 310 additionally sends a configuration data change message to the appropriate local database configuration services 315 via the appropriate translation service 308 and bridge device 317. The appropriate translation service 308 translates the configuration data and configuration data change message from the common configuration data schema as used in the enterprise configuration database 306 to the particular configuration data schema or data format used by the control and automation system at the appropriate site 304. The local database configuration services 315 then applies the configuration change to the appropriate devices or systems at the site 304 (or associated with the control or automation system at the site 304) to implement the configuration change. In some cases, the configuration changes may be made to elements, such as containers or granules within the compute fabric 302 that are associated with and provide control services to the control system for the site 304. In this case, the appropriate translation service 308 may make the configuration changes to these elements in the compute fabric directly, or the local database configuration services 315 may make or apply these configuration change to the appropriate containers or granules in the compute fabric via the associated bridge device 317.

Likewise, the configuration system 300 of FIG. 4 enables users using one or more of the local database configuration services 315 to make reads from and writes to the enterprise configuration database 306, so as to enable personnel at the sites 304 to view and to make configuration changes to the elements that are at or used by the control and automation systems at those particular sites 304. In this case, the local database configuration services 315 may be advantageously used by a configuration engineer that has responsibility for the configuration of devices or systems at a single site 304 to make configuration changes locally from that site (e.g., on premises). This feature may be necessary if, for example, the communication connection between the local site 304 and the compute fabric 302 is down or is temporarily unavailable when configuration changes need to be made.

More particularly, when a user at the local database configuration services 315 makes a read of configuration data from the configuration database 306 (which reflects the configuration of the process control and automation systems within the enterprise), a configuration viewing application used as part of or connected to the local database configuration services 315 sends a read call or message to the translation services 308 associated with the local site 304, via the associated bridge device 317. The appropriate translation service 308 then parses this message to obtain or determine which configuration data is being read (in addition to implementing security features such as determining if the requestor has the appropriate authority for reading the data). To perform this function, the translation service 308 translates the configuration data from the configuration data schema used by the local database configuration services 315 into the common configuration framework or data schema using a data model associated with or defining the common configuration data schema. The translation service 308 then accesses and reads the appropriate configuration data from the enterprise configuration database 306, translates that data (again using the common configuration data schema or data model) into the configuration data schema used by the local database configuration services 315 and provides that data to the configuration viewing application used in or provided as a part of the local database configuration services 315.

Likewise, when a user at one of the local sites 304 wants to make a write to or to change the configuration data within the local site or within systems, devices or software modules associated with the local site 304, the user may use a configuration viewing application at the local site 304 to make a configuration change at the local site 304. The local database configuration service 315 then sends a write call or message to the enterprise configuration database 306 to reflect that configuration change. In particular, the local database configuration service 315 sends a write call or message to the associated or appropriate translation service 308 via the associated bridge device 317 when a communication connection exists or is possible. If such a connection does not currently exist, the local database configuration services 315 (or the bridge device 317) may store a change message to be sent and send that message when the communication connection to the compute fabric 302 exists or is possible. In any event, when received at the translation service 308, the translation service 308 parses the message to obtain or determine which configuration data is being changed or written over (in addition to implementing security features such as determining if the requestor has the appropriate authority for writing or changing this data). To perform this function, the translation service 308 translates the configuration data from the configuration data schema used by the local database configuration service 315 or the configuration viewing application associated therewith into the common configuration framework or data schema using a data model associated with or defining the common configuration data schema. The translation service 308 then accesses the enterprise configuration database 306 and writes the appropriate configuration data into the enterprise configuration database 306 using the common configuration data schema. As noted above, the translation service 308 may access the enterprise configuration database 306 directly or may coordinate access via one of the enterprise configuration database services modules 310.

In this manner, configuration changes may be made from anywhere in the enterprise, including by a user located remote from the site 304 at which configuration changes are being made as well as by a user located at the site 304 at which configuration changes are being made, thereby making the configuration system robust. Still further, because the enterprise configuration database 306 uses a common configuration data schema or framework for configuration data from each of the different process control and automation systems at the various different sites 304 of the enterprise, the enterprise configuration database 306 enables configuration data for all or some of the different sites 304 (or portions of the sites) 304 to be integrated in a single or common database, thereby reducing the need to manage configuration data across various different sites using multiple different configuration database that use different data models or data schemas. This common framework configuration database 306 enables reads of configuration data from anywhere in the enterprise (e.g., from anywhere in the world) and additionally enables configuration changes to be made from anywhere in the enterprise (e.g., from anywhere in the world) including by a user at the site at which the configuration changes are to be applied. In this later instance, the configuration changes may be applied to the local control system prior to changes being made to the enterprise configuration database 306. This feature enables configuration changes to be made locally even when the centralized configuration database 306 is unavailable to the local site for some reason.

Still further, because the configuration system 300 described herein provides translation services both between a generic configuration viewing system that accesses the configuration database directly via the compute fabric and between configuration systems used at or associated with process control and automation systems at the physical locations or sites of the enterprise, the configuration system 300 described herein enables the integrated support and use of a large number of different types configuration viewing applications associated with different types of process control and automation systems, even when these systems use different or even vastly different data schemas, formats, etc. Moreover, as will be explained in more detail below, the enterprise configuration database services modules 310 and the translation services are configured in a manner that enables different types of database technologies or structures to be used as the, or as part of the enterprise configuration database 306, thus making the enterprise configuration database 306 robust and easy to port, change, or move within the compute fabric 302.

Figure 5:
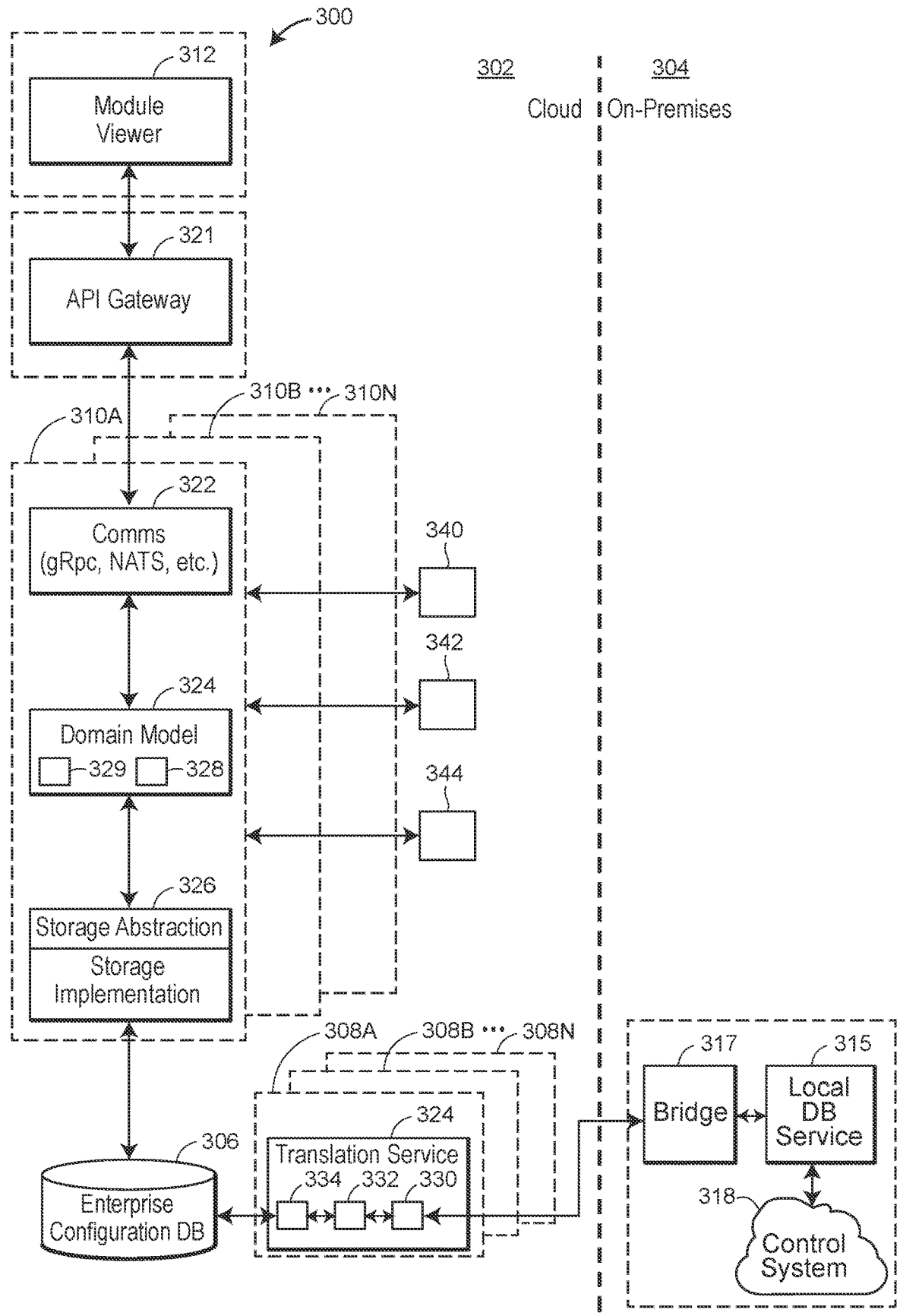
FIG. 5 is a diagram of the enterprise configuration system of FIG. 4 illustrating the enterprise configuration database services in more detail.

FIG. 5 illustrates elements of the configuration system 300 of FIG. 4 in more detail and, in particular, illustrates the enterprise database services modules 310 and the translation services 308 in more detail. As illustrated in FIG. 5, the configuration system 300 of FIG. 5 includes a mobile configuration viewer 312 (which may be the configuration viewer 312 of FIG. 4) connected through an API gateway 321 to one of the enterprise configuration database services modules 310A. Here, the API gateway 321 may be any of the APIs 160, etc. described with respect to FIGS. 1-3 and provides secured communications and security within the compute fabric 302. As also illustrated in FIG. 5, the enterprise configuration database services module 310 is connected to the enterprise configuration database 306, which is connected to a set of translation services 308 (only one of which 308A is shown in detail in FIG. 5). Similar to the system of FIG. 4, the translation services 308 are connected to local sites 304 (only one of which is illustrated in FIG. 4), via a bridge device 317 which has access to data at the physical location or site 304, including configuration data generated at or present at the physical location 304, including from one or more local database configuration services 315 and elements of the control system 318 at the site 304.

As more particularly illustrated in FIG. 5 by the partially hidden dotted boxes (marked 310B, . . . 310N), the configuration system 300 includes multiple instances of the enterprise configuration database services modules 310, with each module 310 being associated with a particular usage, such as a particular configuration viewing application 312, a particular translation service 308, etc. Likewise, as illustrated in FIG. 5 by the partially hidden dotted boxes (marked 308B, . . . 308N), the configuration system 300 includes multiple instances of the translation services 308, with each translation service 308 being associated with a particular usage, such as a particular site 304 or a particular local database configuration services 315.

As illustrated for the enterprise configuration database services module 310A, each of the enterprise configuration database services modules 310 includes a communication service or communication layer 322, a domain model layer 324 (e.g., including a data model) and a storage service or layer 326 which, in turn, is connected to the enterprise configuration database 306. Generally speaking, the communication services or layer 322 is a communication interface that interfaces with and provides communications with one or more configuration viewers 312 (via the API gateway 321, for example). The communication layer 322 provides a specific communication implementation for a particular configuration viewing application 312 or for a particular type of configuration viewing application 312 that hooks up to the common handling in the domain model layer 324. The communications layer 322 knows how (includes the logic) to interpret the technology specific data read and write requests sent from the configuration viewer 312 and how to extract the action (e.g., a read request, a write request, etc.) and the parameters associated with the action from the data message based on the specific data model or schema used by the configuration viewer 312. The communication layer 322 also knows how or has the logic to take the result (data) from the domain model layer 324 and convert this result into the technology specific format or data schema (and message schema or format) used by the configuration viewer 312.

Still further, the domain layer 324 includes a domain data model 328 that defines or implements the common format data structure of configuration data as stored in the configuration database 306, including the various types of data in the model, the meaning of different types of data in the model, the interrelationships between the different types of data (e.g., whether data structures contain or reference other data structures, etc.), the structure of the data, etc. Moreover, the domain layer 324 includes business logic 329 that defines how to navigate and parse the domain model 328 including the interrelationships of the data in the domain model 328.

The storage abstraction layer 326 handles the specific technology needed to implement and track storage in the actual enterprise configuration database 306. The storage abstraction layer 326 stores the logic that knows how to read data from and how to write data to the enterprise configuration database 306 based on the actual database technology used to implement the enterprise configuration database 306, including the addressing schemes, the data format schemes, the physical parameters (voltages and currents, e.g.), etc. needed to actually implement and manage storage in the database 306 using the specific database structure or technology actually being used to implement the database 306. The storage abstraction layer 326 thus enables different types of computer implemented databases that use different database technologies to be used to implement or provide the actual enterprise configuration database 306. Using this structure, different types of databases could be used in the compute fabric 302 to implement different parts or portions of the enterprise configuration database 306. Moreover, the storage abstraction layer 326 enables the configuration database 306 to be migrated to a different type of database that uses different database technology by simply changing the abstraction layer 326 within the enterprise configuration database services modules 310 for that new type of database technology. Thus, the storage abstraction layer 326 enables the configuration system 300 to be agnostic to the particular type of database technology used to implement the configuration database 306 in the compute fabric 302.

As noted above, each of the enterprise configuration database services modules 310 may include a set of individual module services that are configured for a particular technology implementation (with respect to the configuration viewer 312 using the module 310 and the configuration database 306 that is used to store configuration data). As a result, a number of different individual configuration database service modules 310 may be instantiated to support different types of configuration viewing applications 312 that use different communication and configuration data formats or schemas and/or to support different configuration database technologies 306. Thus, a first instantiated services module 310A may include a communication layer that supports a first type of configuration viewer (such as a DeltaV configuration application) and a second instantiated services module 310B may include a communication layer that supports a second type of configuration viewer (such as an OPC UA supported configuration application). In this case, the various different instantiated services modules 310 would include a common data model 328 as part of the domain layer 324 and would generally include the same business logic 329 for managing the configuration data as defined in the domain data model 328.

Still further, each of the translation service 308 may include components similar to the enterprise configuration database services modules 310. In particular, each of the translation services 308 may include a communication layer 330, a domain model layer 332 and a storage abstraction layer 334 which operate similarly to the same components 322, 324, 326, respectively, described above for the enterprise configuration database services modules 310. In particular, the communication layer 330 provides a specific communication implementation for a particular site 304 or a particular local database configuration service 315 that hooks up to the common handling in the domain model layer 332. The communications layer 330 knows how to (has logic to) interpret the technology specific data read and write requests sent from the configuration database service 315 and how to extract the action (e.g., a read request, a write request, etc.) and the parameters associated with the action from the data message based on the specific data model or schema used by the local database configuration service 315. The communication layer 330 also knows how or has the logic to take the result (data) from the domain model layer 332 and convert this result into the technology specific format or data schema (and the message schema or format) used by the local database configuration service 315 or the bridge device 317.

Still further, the domain layer 332 includes a domain data model that defines or implements the common format data structure of configuration data as stored in the configuration database 306, including the various types of data in the model, the meaning of different types of data in the model, the interrelationships between the different types of data (e.g., whether data structures contain or reference other data structures, etc.), the structure of the data, etc. Moreover, the domain layer 324 includes business logic that defines how to navigate and parse the domain model 328 including the interrelationships of the data in the domain model 328. Note that, because the translation services 308 are using the same enterprise configuration database 306, these services 308 use the same domain model 328 and business logic 329 as used in the enterprise configuration database services modules 310.

In a similar manner, the storage abstraction layer 334 of the translation services 308 handles the specific technology needed to implement and track storage in the actual enterprise configuration database 306. The storage abstraction layer 334 stores the logic that knows how to read data from and how to write data to the enterprise configuration database 306, including the addressing schemes, the data format schemes, the physical parameters (voltages and currents, e.g.), etc. needed to actually implement and manage storage in the database 306 using the specific database structure or technology actually being used to implement the database 306 or the portion of the database 306 that stores configuration data for the associated site 304. Again, the storage abstraction layer 334 of the translation services 308 is generally the same as the storage abstraction layer 326 of the enterprise configuration database services modules 310 as it is connected to the same configuration database.

It will be noted that the translation services 308 of FIG. 5 are illustrated as being connected directly to the enterprise configuration database 306 to interface therewith directly. However, in another embodiment, the translation services 308 may be connected to different enterprise configuration database services modules 310 and access the configuration database 306 via these services modules 310. In this case, the translation services 308 may include the communication layer 330 which then connects into or communicates with the domain module layer 324 of an associated enterprise configuration database services module 310 to which the translation service 308 is connected and the translation services 308 performs the essential functions of the communication layer 322 described above for the enterprise configuration database services modules 310. In this example, all communications with the enterprise configuration database 306 are performed via an enterprise configuration database services module 310. As a result, the translation services 308 are referred to herein as a subset of the enterprise configuration database services 310. Moreover in this case, different instantiated service modules 310 may be created for and used with or to support different translation services 308. Of course, as noted above, different translation services 308 will include different sets of rules for converting between the configuration data schemas used in the control and automation systems at the various different physical locations or sites 304 and the common configuration data schema used in the configuration database 306.

In any event, similar to the manner in which the different instantiated enterprise configuration database services 310 support various different configuration viewers 312 which may use different configuration data formats or data schemas, different ones of the translation services 308 may support different sites (e.g., different process or automation equipment) which use different configuration data formats or schemas. Thus, the translation services 308 as well as the various enterprise configuration database services modules 310 enable the use of common or single enterprise configuration database 306 to store configuration data for many if not all of the process control and automation systems associated with an enterprise, even though these process control and automation systems are located at different geographical locations that may include different types of process control and automation system components (e.g., devices, control systems, etc.) that may be made by completely different manufacturers and that may use vastly different data format or configuration data schemas.

Still further, the configuration services 310 (and the translation services 308) may include further services which provide other management functions with respect to the configuration data and in particular with respect to reads, writes and changes made to the configuration data in the enterprise configuration database 306. These services are illustrated in FIG. 5 as including a change management service 340, a tracking or track change service 342, and a scheduling service 344, although other management and support services could be provided as well or instead. In particular, the change management service 340 may manage or oversee reads to and writes from the enterprise configuration database 306, including enforcing rules on the reads or writes being made, such as enforcing rules related to data sizes, data read and write limits, timing of data reads and writes, managing data read and write queuing, managing and implementing priority of data reads and writes (e.g., applying rules related to implementing priority within data reads and writes), etc. Still further, the change management service 340 may recognize when changes are being made to the configuration database 306 by a user using the viewer 312, and may coordinate and send those changes to the appropriate devices, systems, etc., at the physical locations 304 to implement those changes to the actual systems to which the configuration changes are to be applied. Still further, the track changes services 342 may store data that tracks the changes made to (or even the reads from) the enterprise configuration database 306, including when changes (or reads) were made, the requestor or the user (either by name or role) of the read or write, the authorization for the read or write, a reason why the change (or read) is made (as provide by the user, for example), etc. The track changes service 342 may store and provide a listing of changes made to the database 306, including any of the information mentioned above, to users at a later time to enable those users to see the specifics and timing of changes made to (or reads from) the configuration database 306. Still further, the scheduling service 344 may schedule changes to be made to configuration data in the database 306, or reads from the database 306, to control the accessibility of the database 306 and may, for example, implement bulk changes at particular times to manage how and when changes are made to the database 306. In a similar manner, the scheduling services 344 may schedule configuration changes to be made to the devices and systems within or at the sites 304 individually or in a bulk or coordinated manner to make a series of changes in a particular order or to make sure sets of configuration changes are implemented together or at the same time. The scheduling services 344 may, for example, schedule changes to be made to a particular plant or location (or to a subset of a location, such an area, a unit, a device, etc.) at a particular time or in a particular order, may schedule a group of changes to be sent together to reduce overhead and in order to assure that the configuration changes are all implemented together in the plant, to accommodate for a lost or unavailable communication connection between the compute fabric 302 and the plant or site 304, etc., as it cannot always be assumed that the communication connections between the plant and the compute fabric 302 exists at all times or for other reasons. Of course, other configuration support services could be provided in the services modules 310 and in the translation services 308 instead or as well.

Figure 7:
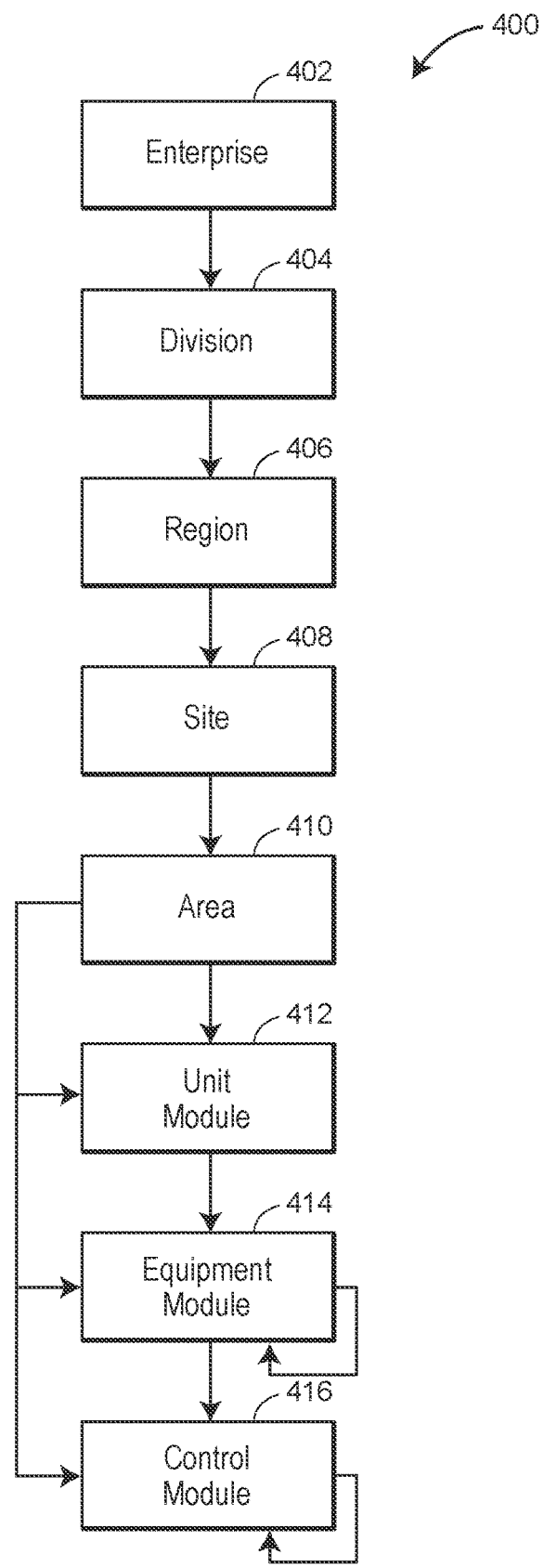
FIG. 7 is a diagram illustrating an extended S88 hierarchy that supports enterprise configuration activities using enterprise, division and region categories.
Figure 8:
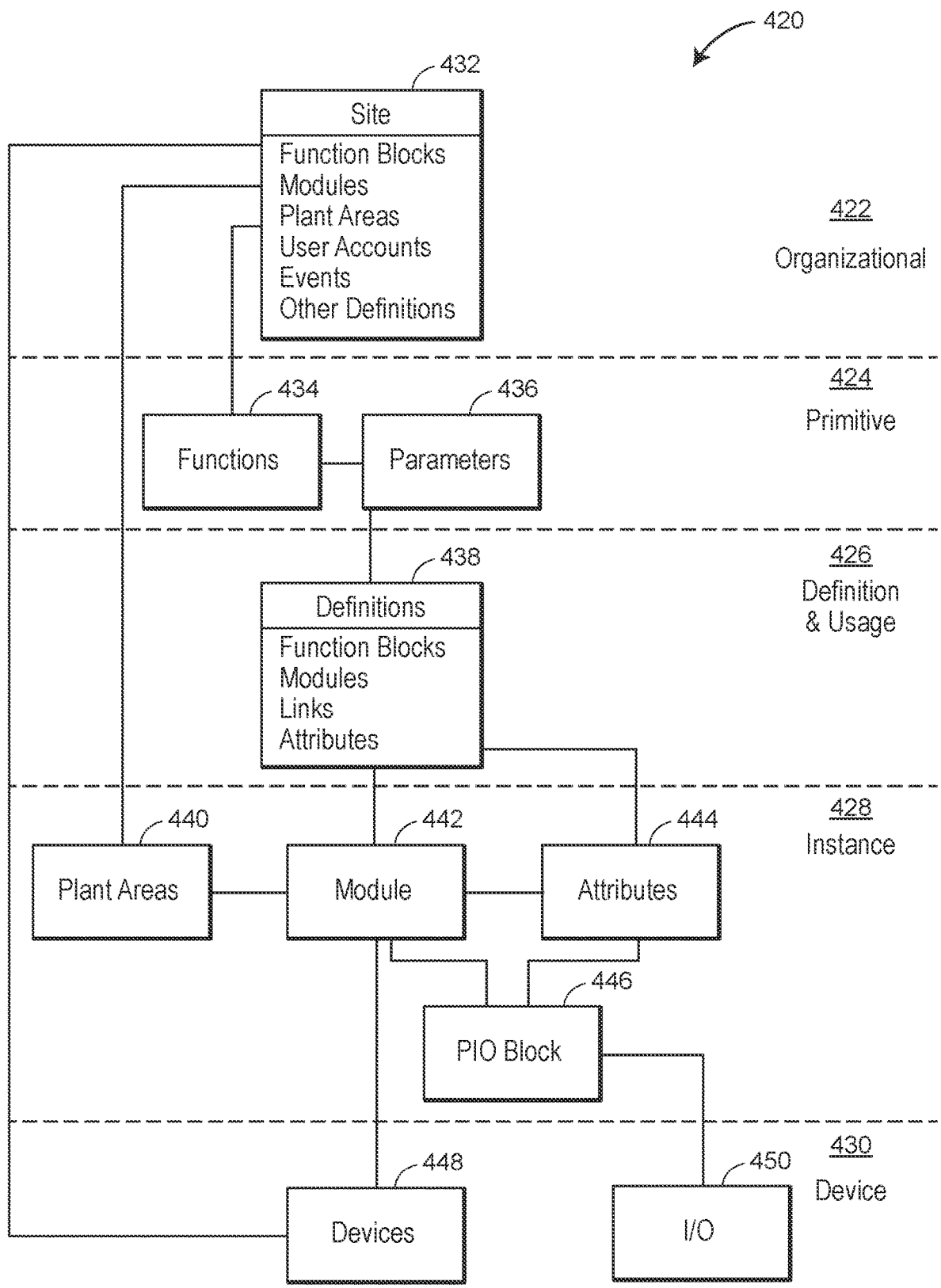
FIG. 8 is a diagram illustrating an example organization or data schema for process control elements that may be used as part of a common data model or configuration data schema in the configuration systems of FIGS. 4 and 5.
Figure 9:
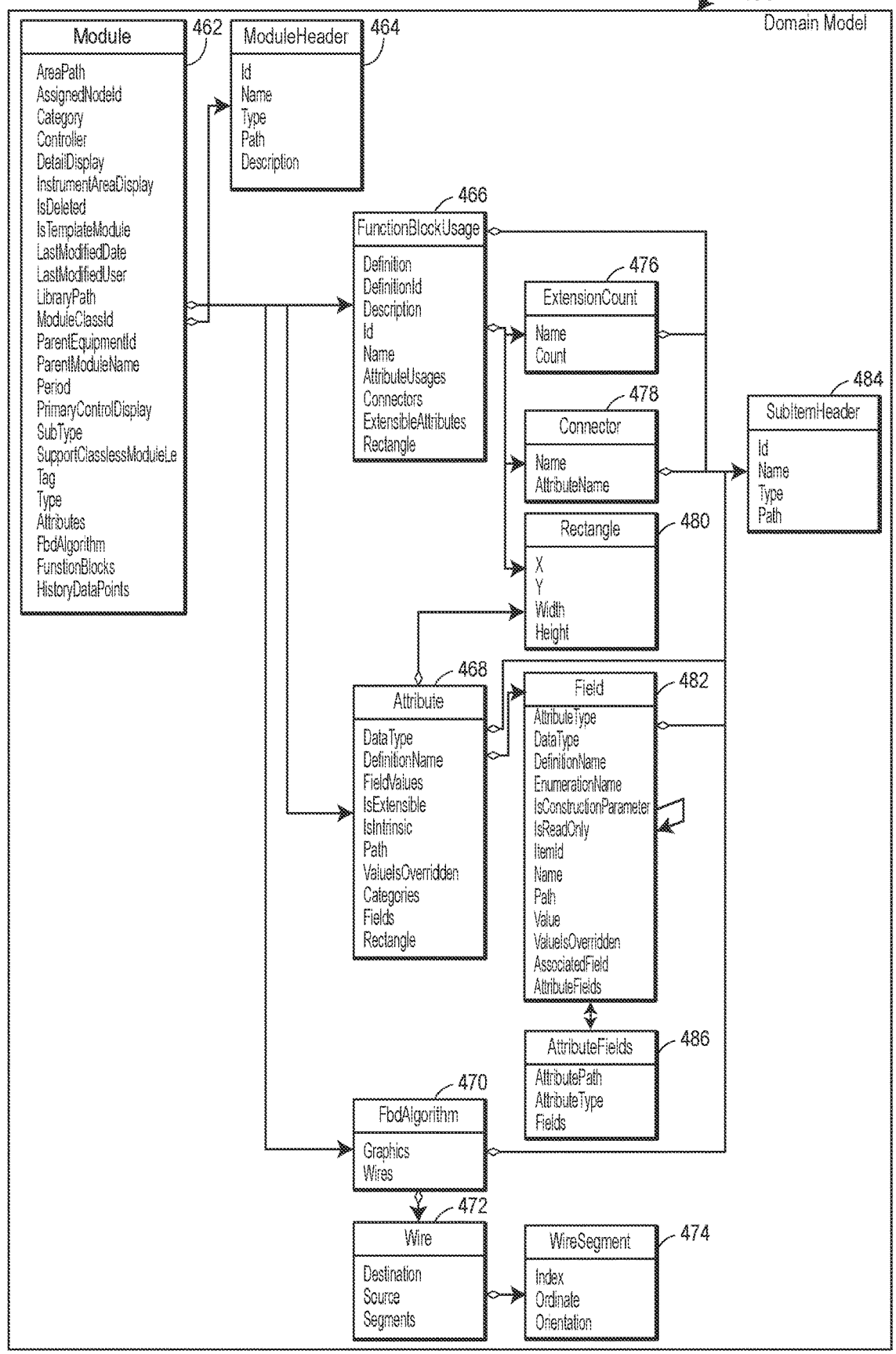
FIG. 9 is a diagram illustrating an example domain model that may be used to organize configuration elements for an enterprise control system.

To better understand the operation of the configuration system 300 described herein with respect to FIGS. 4 and 5, an example data model layout or makeup of a configuration database data model (such as the data model 328 of FIG. 5) will be described herein with respect to FIGS. 6 and 7, while an example control module configuration data schema (or data model) will be described with respect to FIGS. 8 and 9. As will be understood, these data models define the data available in the model, including names and uses, and define interrelationships between the data in the model. It should be noted, however, that the general data model layouts of FIGS. 6 to 9 are examples only, and that other data layout or organizational structures could be used instead as the common configuration data schema.

Again, as an example, the configuration database 306 may use a data model 350 (which may be the data model 328 of FIG. 5) that includes or supports many different interrelated facets or data structures. FIG. 6 illustrates one example data model 350 including a number of interrelated facets including a site facet 352 which contains zero, one or more library components 354, areas 356, process control equipment 358 and security items 360. The darker lines used in FIG. 6, such as those between the site facet 352 and the library facet 354, the area facet 356, the process control equipment facet 358 and the security items facet 360 indicate containment, so that, in this example, the site facet 352 may contain zero, one or more library facets 354, zero, one or more area facets 356, zero, one or more process control equipment facets 358 and zero, one or more security item facets 360. Likewise, the lighter lines disposed between various facets in FIG. 6 indicate that these interconnected facets may reference one another (while not being contained by one another). Thus, as illustrated in FIG. 6, each library facet 354 may contain one or more equipment model definitions 362, control module definitions 364, I/O module definitions 366, device definitions 368, and composites or classes 370. The library facet 354 in general, and the sub-elements 362-370 thereof define generic versions of the various library components that may be stored in the configuration database 306, and provide generic definitions for these elements. In the case of FIG. 6, the library sub-elements define different types of equipment modules, control modules, I/O modules, devices and composites and classes. Likewise, as illustrated in FIG. 6, the areas facet 356 (which may implement control strategies) may contain one or more units 372, each of which may contain one or more equipment modules 374, each of which may contain one or more control modules 376. At least some of these elements are instantiated versions of library elements and so are tied to particular equipment, control logic, systems, sites, etc. of the enterprise. As will be understood from FIG. 6, the control modules 376 may reference particular existing I/O blocks 378 and field devices 380. Again, from the data model of FIG. 6, each process control equipment facet 358 may contain one or more networks 382 (defining communication networks within or associated with the enterprise), which may contain one or more network devices 384, which may contain one or more subsystems 386 which may contain one or more physical I/O facets 388 (devices, cards, etc.) Likewise the security facet 360 may contain one or more users 390, which may be defined as persons, roles, or any combination thereof or in any other manner. Still further, as will be understood by the lighter connecting lines of FIG. 6, various ones of the facets may reference other ones of the facets to define looser interrelationships between the various facets in the data model. For example, equipment modules 374 and control modules 376 may reference (and thus be associated with) a network device 384 while an I/O block facet 378 may reference physical I/O facets 388. Of course, other reference pairs are illustrated in FIG. 6. Generally speaking, the data model 350 defines the various types of elements which can exist in the model and the interrelationships therebetween and may be used as a common data framework for storing and accessing configuration data of any type within the enterprise.

Figure 6:
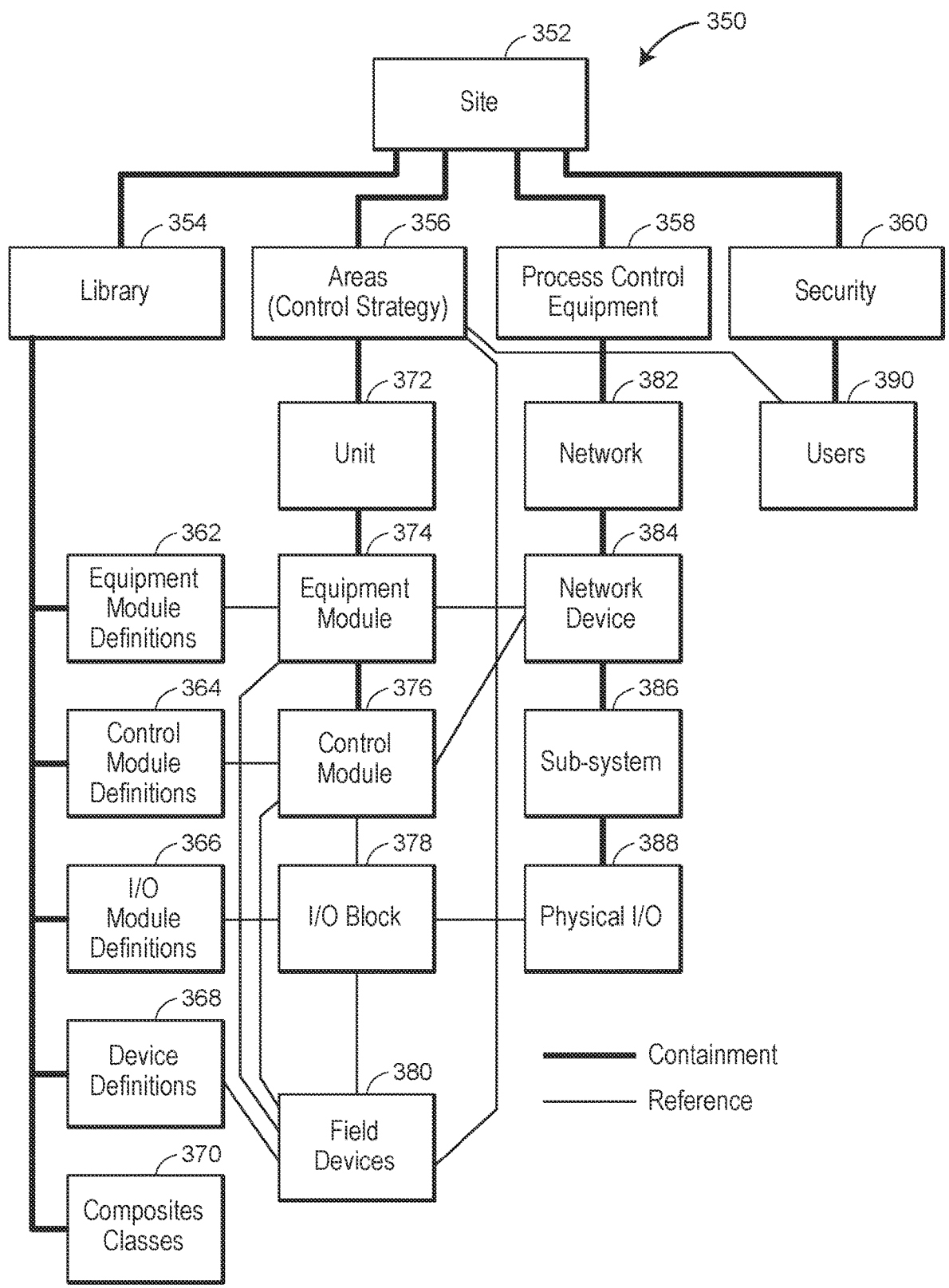
FIG. 6 is a diagram illustrating an example set of facets for a configuration system supporting a process control system.

As will be understood, engineering a process control or automaton system involves configuring each of the items included in the data model of FIG. 6. For example, control operations within the enterprise are engineered through the use of control modules definitions 364 and actual instantiated control modules 376, which may include, as an example only, function block diagrams, sequential flow charts (SFCs), units, equipment, and in the case of batch process control, procedures and operations. Batch process control may also include recipes (not shown in the data model of FIG. 6). In the past, it was common to engineer the control systems within an enterprise individually and separately on-premises (e.g., at the physical locations) or in the cloud (one system at a time) and then deploy the configuration on-premises. Once a system had been commissioned and was in operation, configuration was maintained at a configuration database on-premises at the individual sites or locations. However, with the configuration system described herein, the control and automation systems may be engineered, commissioned, and maintained from the compute fabric (e.g., in the cloud), on-premises, or using a combination of both.

As an example only, the following description assumes that the common configuration data model used to configure or define the configuration of a control system uses control modules and control module configuration. Generally, the well-known S88 hierarchy defines control modules that are generally used in process control and automation systems and this hierarchy includes modules in the form of sites, areas, unit modules, equipment modules and control modules. However, to fully support the configuration activities described herein for an entire enterprise, and to create a data model for the entire premises, it is advantageous to extend the S88 hierarchy to include some additional modules and module definitions. In particular, FIG. 7 depicts an extended S88 hierarchy 400 including additional modules related to or defining modules within a control hierarchy of an enterprise. The lines connecting the modules in FIG. 7 indicate what modules may contain other modules. More particularly, the hierarchy 400 includes an enterprise module 402 (which is the company or legal entity that owns, operates, uses and/or has access to the various modules there-below). Each enterprise module 402 may contain one or more division modules 404, each of which defines some technical or business unit of the enterprise 402. A division 404 may be a business unit of the enterprise 402, a technology area of the enterprise 402 or any other logical unit of an enterprise 402 defined in any manner. Of course, as illustrated in FIG. 7, each division 404 may include one or more region modules 406. Each region 406 may be a geographical or geo-political region, for example, such as a country, a continent, a state, a local region, etc. Regions can be, but need not necessarily be geographically contiguous in nature. Thus, Alaska and Hawaii may be part of a Unites States region, for example.

As illustrated in FIG. 7, each region 406 may include or contain one or more site modules 408. Each site module 408 defines a particular site or location (or portion of a site or location) of a region 406 of a division 404 of an enterprise 402. For example, each site module 408 may be used to define or implement the scope of a single or individual control system, such as a DeltaV control system. Each site module 408 may include or contain one or more area modules 410 which are uniquely named or tagged, and which define a physical area at a site 408, such as a building, a room, a pad, a skid, or any other geographic area associated with a particular site 408. Moreover, as illustrated in FIG. 7, each area 410 can include or contain zero, one or more of each of a unit module 412, an equipment module 414 and a control module 416. As is known, a unit module 412 is associated with a particular unit (set of equipment) in an area (and so is uniquely named in the area at least) and may contain zero, one or more equipment modules 414. The control for a unit module 412 is generally described in terms of SFCs. An equipment module 414, which may contain other equipment modules 414, control modules 418 and function blocks, defines the control for a sub-set of the equipment in the unit module 412. This control is usually described in terms of SFCs and function blocks. Finally, a control module 416, which may contain other control modules 416, may also include or contain function blocks and performs lower level control functions.

As will be understood, the module hierarchy 400 extended with enterprise, division and region modules 402, 404, 406 enables configuration data for different enterprises, different divisions of an enterprise and different regions of an enterprise to be stored in and separated in and otherwise managed in the configuration database 306 of FIGS. 4 and 5, which enables configuration data from different sites of an enterprise to be stored in a common database and managed and viewed at an enterprise level.

In one further example, function block modules (such as those used in FIG. 7) may be made up of function blocks such as analog input (AI), analog output (AO), digital input (DI), digital output (DO), PID and other blocks. Function block modules also include parameters and links connecting function blocks and attributes (also referred to as parameters). These links illustrate the flow of signals as well as other content and may reference I/O and other devices. FIG. 8 illustrates an example configuration data model 420 used for function blocks that includes elements (illustrated on the left) organized into various different levels or organizational structures (listed on the right) separated by dotted lines. In particular, the configuration data model 420 for control modules of FIG. 8 includes an organizational level 422, a primitive level 424, a definition and usage level 426, an instance level 428 and a device level 430. Here, the organizational level 422 includes a site element 432, the primitive level 424 includes functions 434 and parameters 436, the definition and usage level 426 includes definitions 438, the instance level 428 includes plant areas 440, modules 442, attributes 444 and PIO blocks 446, and the device level 430 includes devices 448 and I/O 450. The various elements 432 to 450 are related and connected to each other as illustrated by the lines between these various elements.

Generally, the organizational level 422 contains all of the "named items" in the system organized by site, such as the user accounts, libraries, and other site wide information. Examples of named items includes block definitions, equipment module definitions, control module definitions, plant area names, events, function block names, etc. The primitive level 424 includes the underlying primitives used in the control hierarchy, such as functions 434 and parameters 436. The functions 434 are the lowest level functions in the system. For example, the set of function blocks in the system are all primitives. Primitive functions have site-wide name scope. Parameters 436 are the lowest level of data in the system. Parameters may be integers, real values, vectors, arrays, etc. Attribute values are mapped to parameters so that they may be used within a function. The definitions and usages level 426 defines the algorithms and interfaces for function blocks, control modules, equipment modules, units, links and attributes and represent or define usages of one definition within another.

The instance level 428 defines or includes actual "tagged" or instantiated items in the system. For example each of the plant areas 440, the modules 4442, the attributes 444 and the PIO blocks and devices 446 are instances with tags (e.g., unique identifiers). Instances are generally based on the definitions of the definition and usage level 426. More particularly, the plant areas 440 represent a geographical or logical segmentation of a process site. Process areas have names. Modules 442, which are module instances, are installable items, which may be organized by control strategy. Attributes 444 are the visible parameters in modules, devices, etc. They may be used for inputs, outputs, or data storage. PIO blocks 446 are abstractions that represent the various I/O devices, networks and field buses.

The device level 430 represents the physical process control equipment (e.g., devices 448 and I/O 450) associated with the plant or a site. The devices 448 are process control equipment in the plant (at a site) and may include the controllers, I/O devices, field devices, workstations, consoles, etc. I/O elements 450 are the physical process I/O in the system or site and include measurement devices such as sensors and control devices such as valves, as well as other types of field devices.

As noted herein, additional details of the data model based on the module concept may include a data model for each of the types of control modules within the data model. In particular, each module may include a module type, module parameters (such as name, ID, etc.) and links that connect the module to other modules (wherein such links may define contained or referenced relationships between the modules). As one example, function blocks modules are one type of module which may be configured in the data model of the configuration system described herein. Function block modules are made up of function blocks such as AI, AO, PID and other blocks, and also are made-up of parameters and links connecting function blocks and attributes.

FIG. 9 depicts an example control module domain model 460 that may be used as part of the data model in the configuration database 306 to define the control modules (which may include function blocks) available in the configuration database 306. As illustrated in FIG. 9, the control module model 460 includes various blocks which define possible features or components of the module connected with lines which define interrelationships between the components. Lines in FIG. 9 that originate with a diamond indicate that the component with the diamond next to it may contain the component at the other end of the line (with the arrow). Lines in FIG. 9 without the diamond indicate a reference between components.

Thus, as illustrated in FIG. 9, the control module domain model 460 may include one or more modules 462, each of which may include various parameters, such as an area path, an assigned node ID, a category, a controller (to which it is assigned), a detail display, an instrument area display, an is-deleted field, an is-template module, a last modification date, a last modification user, a library path, a model class ID, a parent equipment ID, a parent module name, a period (update rate), a primary control display, a sub-type, a support classes module, a tag, a type, attributes, function block algorithms, function blocks, and a history data points, as well as any other desired types of parameters. As illustrated in FIG. 9, each module element 462 may contain a module header 464, including an ID, a name, a type, path, and a description. Moreover, the module 462 may contain one or more function blocks usages 466, which may include the parameters of a definition, a definition ID, a description, an ID, a name, one or more attribute usages, connectors, one or more extensible attributes, and a rectangle (which might indicate a graphical element) used in a display. Still further, the module 462 may contain one or more attribute elements 468 which may include parameters of a data type, a definition name, field values, and indication of whether it is extensible, an indication of whether it is intrinsic, a path (e.g., a communication path indication), an indication of whether a value can or is overwritten, categories, fields, and a rectangle. Additionally, the modules 462 may contain one more function block algorithm elements 470 which may include graphics and wires. Additionally, the function block algorithm elements 470 may contain wire elements 472, which might include parameters of a destination and a source and segments of the wire. Each wire element may contain one more wire segments 474 each having parameters of an index, an ordinate and an orientation.

Moreover, the function block usages 466 may contain extension count elements 476 (illustrated with parameters of a name and count), connectors 478 (illustrated with parameters of a name and an attribute name), and rectangle elements 480 (illustrated with parameters of an X and Y coordinate and a height, defining a graphical element, such a rectangle). Still further, the attributes elements 468 may also contain a rectangle element 480 as well as one or more field elements 482 and one or more sub-item headers 484. The field element 482 may include parameters of an attribute type, a data type, a definition name, an enumeration name, an indication of whether it is a construction parameter, whether it is a read only field, an item ID, a name, a path, a value, an indication of whether the value can be overwritten, and associated fields and attribute fields. Still further as indicated in FIG. 9, the field element 482 may reference other fields and may reference attribute fields elements 486 (which may include parameters of attribute paths, attribute types and fields). Still further, as indicated in FIG. 9, each of the function block usages elements 466, extension count elements 476, connector elements 478, attribute elements 468, field elements 482, and function block algorithm elements 470 may contain one or more sub-item header elements 484 (which may include parameters of an ID, a name, a type and a path).

It will be noted, of course, that the control module domain model 460 of FIG. 9 is merely one example of a domain model defining the elements, parameters of the elements and the interrelations of elements in a control modules of a configuration data model. Other data models could be used as well or instead.

As noted above, the enterprise configuration database services 310 of FIGS. 4 and 5 include or are made up of various different instantiated module configuration services modules (310A, 310B, etc.) which may be used to interface with the configuration database 306 which houses module configuration data as defined in, for example, the data models described herein. The configuration data (for control modules for example) is accessed from compute fabric-based applications such as a configuration viewer 312 and is synchronized with an on-premises configuration system 315 through one of the translation services 308. Of course, the translation services 308 convert data from data providers into a common form that works for the domain model used in the enterprise configuration database 306. Still further, as noted above, the bridge devices 317 connect a local database configuration services 315 and other data sources to the configuration framework as provided and used in the configuration database 306. Generally speaking the bridge device 317 enables the configuration of a legacy control system at a site 304 to be ported to the configuration database 306. The bridge device 317 performs this action by replicating the local configuration to an associated cluster in the compute fabric 302 and managing changes originating from the legacy system (via the local database configuration services 315) or coming from the compute fabric 302.

The bridge device 317 may be configured to implement enhanced or efficient communications between the local site 304 and the compute fabric 302 using a further data model or configuration schema designed to gain access to information in the local database (via the local database configuration services 315), wherein this further data model is designed to be very generic with the flexibility for stronger typing when needed. In particular, the data model used by the bridge device 317 preferably supports the schema of any local process control system, including different versions thereof, includes the ability to send out the right amount of data at any given time, includes the ability to support change deltas (creates, updates, deletes) and does not impede overall performance of the local system.

Figure 10A:
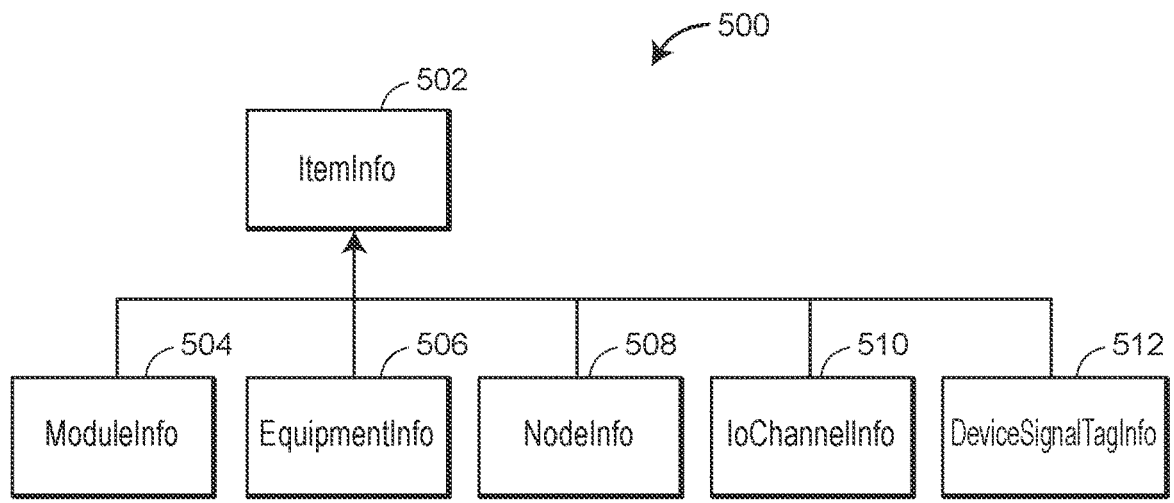
FIGS. 10A-10C are diagrams illustrating example data element hierarchies that may be used to perform communications in the enterprise configuration systems of FIGS. 4 and 5.
Figure 10B:
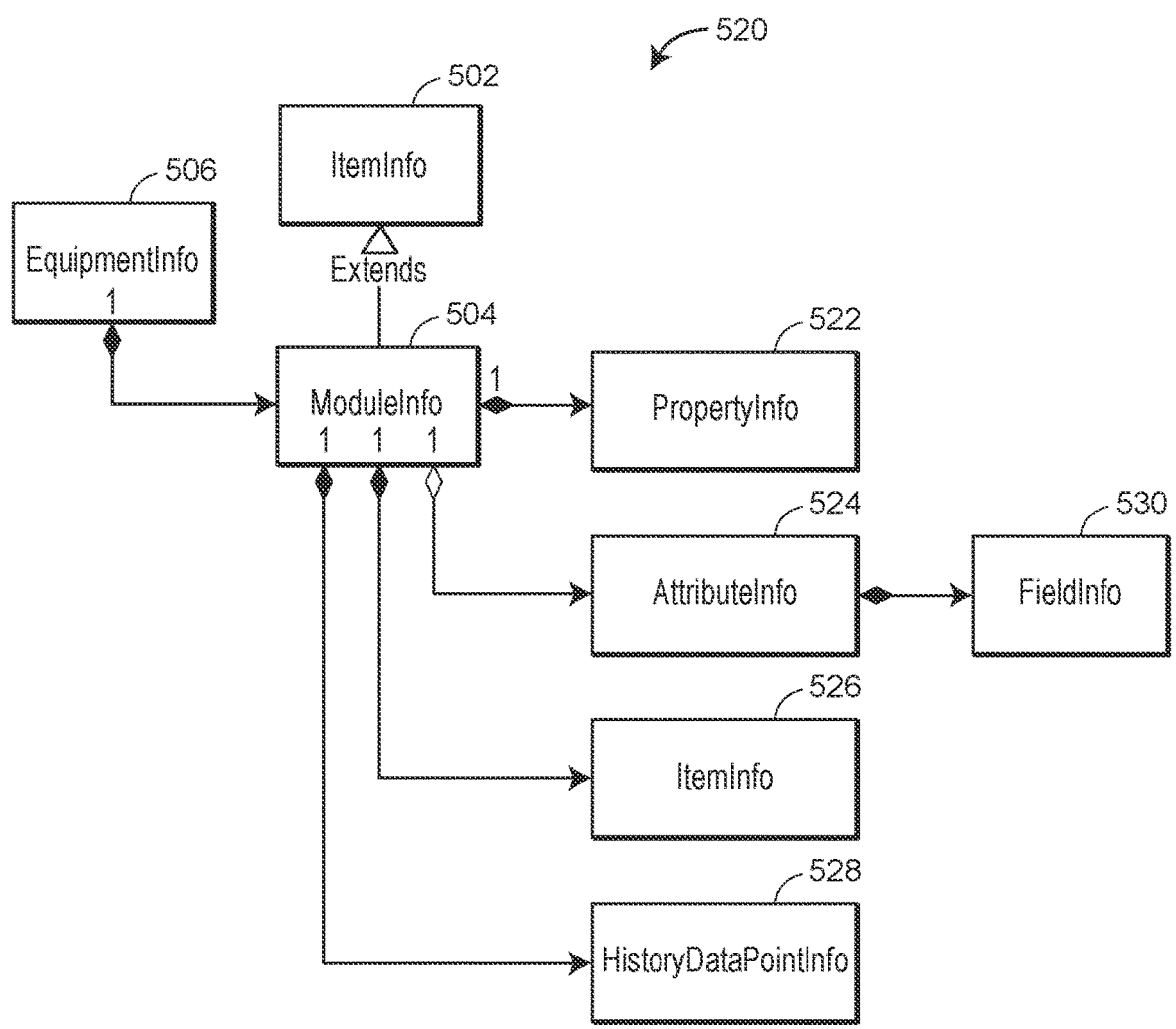
Figure 10C:
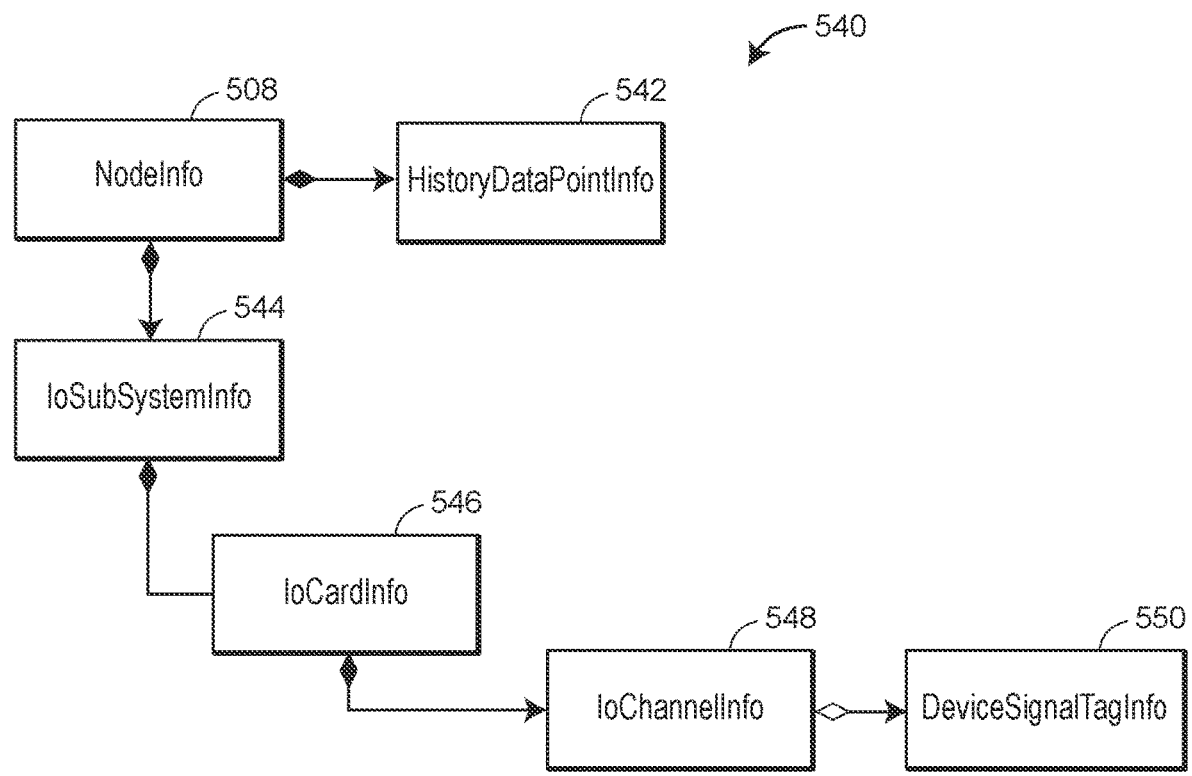

To obtain these advantages, the bridge device 317 may map communications from the local configuration or process control system (at one of the sites 304) into information packages in a manner described with respect to FIGS. 10A-10C to perform efficient communications between the local process control or automation site 304 and the compute fabric 302 or a translation service 308 in the compute fabric 302. For example, as illustrated in FIG. 10A, the bridge device 317 may use a communication data model 500 that enables various different types of configuration data from the local site 304 to be mapped into the common configuration data schema used by the enterprise configuration database 306 and vise-versa. In particular, the data model 500 converts local data elements into an item information illustrated as a generic ItemInfo element 502, which may receive or request data related to various different types of data at the site 304 or in the configuration database 306. As illustrated in FIG. 10A, the generic ItemInfo element 502 may receive or obtain data related to any of various data model categories, including module information, equipment information, node information, I/O channel information, and device signal tag information, illustrated as a ModuleInfo element 504, an EquipmentInfo element 506, a NodeInfo element 508, an IOChannelInfo element 510 and a DeviceSignalTag element 512, respectively.

Now each of the various elements 504 to 512 of FIG. 10A may have or may be connected to or may contain various sub-elements in the data model to be used. For example, FIG. 10B illustrates a data model 520 illustrating further data that may be available via a module (i.e., a ModuleInfo element 504). In this case, a generic ItemInfo element 502 (which may be a set of data), may be obtained from or via a ModuleInfo element 504. As illustrated in FIG. 10B, the data available to or through the ModuleInfo element 504 may include property information (of the module), attribute information (of the module), item information (of the module) and history data points (of the module), illustrated in FIG. 10B as a PropertyInfo element 522, an AttributeInfo element 524, an ItemInfo element 526 and a HistoryDataPointInfo element 528, respectively. As will be understood, the ModuleInfo element 504 contains one or more of each of the elements 522-528. Moreover, as illustrated, the AttributeInfo element 524 may contain one more fields or field information illustrated in FIG. 10B as FieldInfo element 530. Likewise, an EquipmentItemInfo element 506 may contain the ModuleInfo element 504.

In any event, based on the data model 520, any information from any of the elements 504, 506, 522, 524, 526, 528, 530 may be obtained from the local site 304 (or from the enterprise configuration database 306) as a generic ItemInfo element 502. This data mapping enables the support of a local configuration data schema (such as that used at any of the sites 304) in a very generic manner with the flexibility for stronger data typing when needed. Generally speaking, the generic part of the data model 520 is based on receiving a combination of data (e.g., a triplet of data) from various different elements in the model 520 (e.g. an ItemInfo 526, a PropertyInfo 522, and an AttributeInfo 524) as the data received in or used in the generic ItemInfo element 502. However, stronger data typing can be used when needed (e.g., obtaining data from others of the EquipmentItemInfo 506, a ModuleInfo 504, a FieldInfo 530). Generally, the combination of data requested or obtained in the generic ItemInfo element 502 may be preset or predetermined, e.g., as a particular triplet of information (or other amount of information), because these types of data are expected to be requested or used together in a lot of data access operations (as, in many cases, a fixed or common set of data is needed or used with business rules that are very integral to the process control operation at the site 304).

Thus, the triple-based access model (or any other number of data item access, e.g., two, four, six, etc.) allows for fine-grained control on how much data is sent during data access operations via the generic ItemInfo element 502. For example, when a configuration application, such as a DeltaV Explorer-type application, tries to build its tree to enable a view into the configuration, this application can retrieve just the "header" data of several types (i.e. Equipment Items and Modules in this case) without retrieving the "body" of the data. The "header" data in this case is the ItemInfo object in the diagram in FIG. 10B. Of course, when other data is needed, the application can then request that other, more specific data.

In another example, when a configuration application, such as a DeltaV Control Studio-type application, opens a Module, this application may retrieve the "header" of Attributes and Function Block Usages (AttributeInfo and ItemInfo in the diagram of FIG. 10B) necessary to render the module. When a user clicks on a Function Block, the "href" attribute of the "header" allows the application to retrieve the body of the block directly. The majority of the use cases that need to retrieve data require a significant subset of the configuration data stored in the database. This triple-based communication model allows for sending precise amounts of data as required by different uses cases together in an automated manner. This communication structure reduces network utilization and storage I/O at the expense of marginally increased CPU utilization.

FIG. 10C illustrates another data model 540 that may be used to obtain node information data via the NodeInfo element 508 of FIG. 10A. In particular, in the model 540, the NodeInfo element 508 contains history data point information and I/O subsystem information, illustrated as HistoryDataPointInfo element 542 and IOSubsystemInfo element 544, respectively. Likewise, the IOSubsystemInfo element 544 contains one or more I/O card information (IOCardInfo element 546), each of which contains I/O channel information (IOChannelInfo element 548), each of which contains device signal tag information (DevieSignalTagInfo element 550). Again, in a similar manner, any set or subset of predetermined information, e.g., a triplet, may be obtained via the NodeInfo element 508 in a generic manner when requesting data from the local system to make the communications more efficient.

Of course other or similar data models can be used for each of the elements 504-512 of FIG. 10A to enable the bridge device 317 to perform efficient and very targeted communications between the local site 304 and the compute fabric 302.

Figure 11:
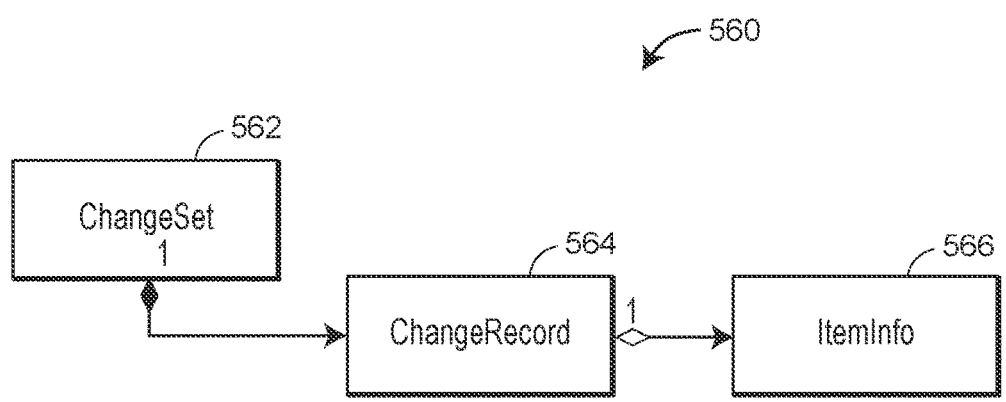
FIG. 11 is a diagram illustrating an example organization of a change set that may be used in the enterprise configuration systems of FIGS. 4 and 5 to implement and coordinate configuration changes.

Still further, to enhance communications, the bridge device 317 may use change deltas, in the form of change sets and records to communicate changes to be made to the local system 304 (from the compute fabric 302) or changes to be made to the enterprise configuration database 306, when made at the local system 304. FIG. 11 illustrates a data or communication model 560 that may be used at the bridge device 317 to manage changes and to communicate changes. In particular, the communication model 560 includes change sets (ChangeSet element 562), each of which may contain one or more change records (ChangeRecord element 564), each of which may contain one or more item information elements (ItemInfo element 568). Here, the ItemInfo elements 568 may map to the generic ItemInfo elements 502 of FIG. 10A. The change records 564 or change sets 562 contain details of what has changed on data that can be represented as the "header" ItemInfo element of FIG. 10A. Each header is associated with data that may have been created, updated or deleted. Thus, a change set 562 represents a unit of synchronization between a bridge device 317 and its associated cluster in the compute fabric 302 (so that one synchronization operation will result in one change set). Change sets 562 may contain multiple change records 564 originating from different users, for example. Moreover, change records may contain the actual changes that occurred per each ItemInfo object 566. In this manner, the bridge device 317 may store and implement (communicate) changes to the configuration data in an organized and communication efficient manner using the change sets 562 of the model 560 as communication elements.

In some cases, the bridge device 317 may impersonate the user specified in the change record 564 when applying the change to the local configuration database at the site 304 so as to have the security credentials to make the changes.

Moreover, the change sets 562 may be maintained by the bridge device 317 throughout the lifetime of a specific local database, until these change sets 562 are pruned through user action. Change records 564 may be organized using their ItemInfo "header" and the baseline of the change records 564 may be created during the first initialization of a configuration managing device or application at the local site 304. Together, the baseline and change records of an ItemInfo reflect the change history to the ItemInfo.

Still further, change records originating from either source, the local site 304 or the compute fabric 302 may be saved locally (i.e., at a site 304) before they are either sent to the compute fabric 302 or committed to the local configuration database, respectively. The former is needed because it cannot be assumed that a connection to the compute fabric 302 will be always available, e.g., when the configuration change is made locally. The latter is needed because it cannot be assumed that the local database or the item being changed in the local database will always be accessible. For example, someone may have a long lock on an object in the local database.

An advantage of maintaining change records coming from either or both the local site 304 and from the compute fabric 302 is that it enables the bridge device 317 to perform merge-/change and conflict detection. For example, if two different users modified the same ItemInfo, PropertyInfo and/or AttributeInfo, the bridge device 317 may detect a conflict and institute a predetermined resolution procedure to manage or resolve the conflict. The bridge device 317 may also or instead merge changes in, for example, the order they were received or made or based on the time they were made, to reduce the need to make multiple changes to the same element or to combine changes of related elements to reduce the size of or number of the change records 564 in a change set 562.

As will be understood, the configuration system 300 described herein manages access to the configuration of various elements of the enterprise from a centralized location. In particular, during installation, a user persona with the ability to modify the installation directory at a local site will need to install the system, as the bridge device 317 needs to have its data elements managed or added to the same directory as the local database server. Then, after installation, the bridge device 317 needs to be registered with services (e.g., the translation services 308) within the compute fabric cluster associated with the local site 304. This operation may require a user persona with permissions to do so (i.e., that has access to the user and/or role permission assignments in the compute fabric). A token is generated during this registration process and this token can then be used to identify and authenticate the bridge device 317 with its cluster in the computer fabric 302 and this token is used to secure future communications between the bridge device 317 and the appropriate compute fabric cluster. Still further, during data access operations, the bridge device 317 will need to marshal and implement users and permissions for security purposes, such as the security permissions for Windows, for the process control system at the local site 304, and for the compute fabric systems.

As will be understood, the configuration system 300 described herein enables an enterprise to store configuration data for both on-premises devices and systems (e.g., at the local sites 304) and for applications or components used in or executed in the compute fabric 302 of an enterprise in a central location using a common configuration data format or schema (i.e., using a common data model). This feature enables enterprise users to more easily maintain corporate standards and to manage roll-outs and updates of configurations (e.g., different configuration versions) centrally or in a coordinated manner, as configuration data changes made to the central configuration database 306 can be timed and grouped together, and can be automatically made or rolled out together to the systems and components at the local sites 304, as well as to the system components executed in the compute fabric 302. Likewise, as noted above, users can work on, view, manage and change configuration data (and thus the configuration of a system) associated with any system within the enterprise from any location in or associated with the enterprise or from anywhere in the world at which there is a connection to the compute fabric 302. In addition, the enterprise configuration system 300 described herein enables users to manage, compare, and support the configurations of many different sites and even of many different types of systems that use different configuration data formats or data models at different sites or at different portions of the same site. For example, the enterprise configuration system 300 described herein may simultaneously support classic or legacy control systems, such as DeltaV control system configurations, future control systems, and emerging systems using OPC UAFX as well as other systems which may use different configuration data schemas. Likewise, the enterprise configuration system 300 described herein enables users at enterprises to organize configurations and configuration data into divisions, regions, and sites in addition to lower level categories, such as areas, unit modules, etc., and to utilize change sets to synchronize configurations in both directions (from the compute fabric and from the local site). Still further, the enterprise configuration system described herein enables the use of centralized authorization and authentication to access and/or change the configuration data of the enterprise. Moreover, the enterprise configuration system 300 described herein enables an enterprise to use compute fabric based (e.g., cloud-based) configuration tools that can work with an enterprise configuration service.

Moreover, due to the decentralized and highly configurable nature of the compute fabric of the NGPCAS described herein, the NGPCAS for a particular enterprise may be configured or set up by an enterprise to enable new types of data management and execution management to be performed within the compute fabric, which enables an enterprise to uniquely configure global, or inter-plant data flow and execution management in manners not possible with previous control systems. In particular, the compute fabric of an enterprise that has multiple physical plants or locations can be set up in a hub and spoke configuration in which multiple different compute fabric "hubs" may be created to support various different physical locations or plants which are connected to the hubs via communication networks which implement the communication "spokes." Each hub may have compute resources confined to or implemented in a particular geographical or sovereign region. These regions may be, for example, continents (e.g., North or South America, Europe, Africa, etc.), countries (e.g., the United States, Russia, China, Australia, Germany, France, etc.), states or defined regions of a particular country (e.g., California, Florida, etc.) or any other geographical or geopolitical region. In this case, the compute fabric hardware may be implemented in a cloud environment or at other physical locations that is physically disposed in or contained within a particular region (or a particular set of regions) to form a compute hub. Each compute hub may be connected to one or more physical locations or plants of the enterprise via the communication infrastructure described herein that forms a spoke from the compute fabric hub to the physical location. In some cases, more than one compute fabric hub may be connected to the same physical location and each such compute fabric hub may receive all or a subset of the data from that physical location. Moreover, in some cases, a compute fabric hub may connect to one or more physical locations within the same region as the hub via one or more communication spokes, and/or may connect to physical locations in one or more different regions than the hub via other communication spokes. In these types of systems, a configuration system, such as that described above, may be provided for each different hub, or a particular configuration system may be used to support multiple hubs but may have different authorizations and access privileges or rights based on the hub to which an authorized user belongs.

Figure 12:
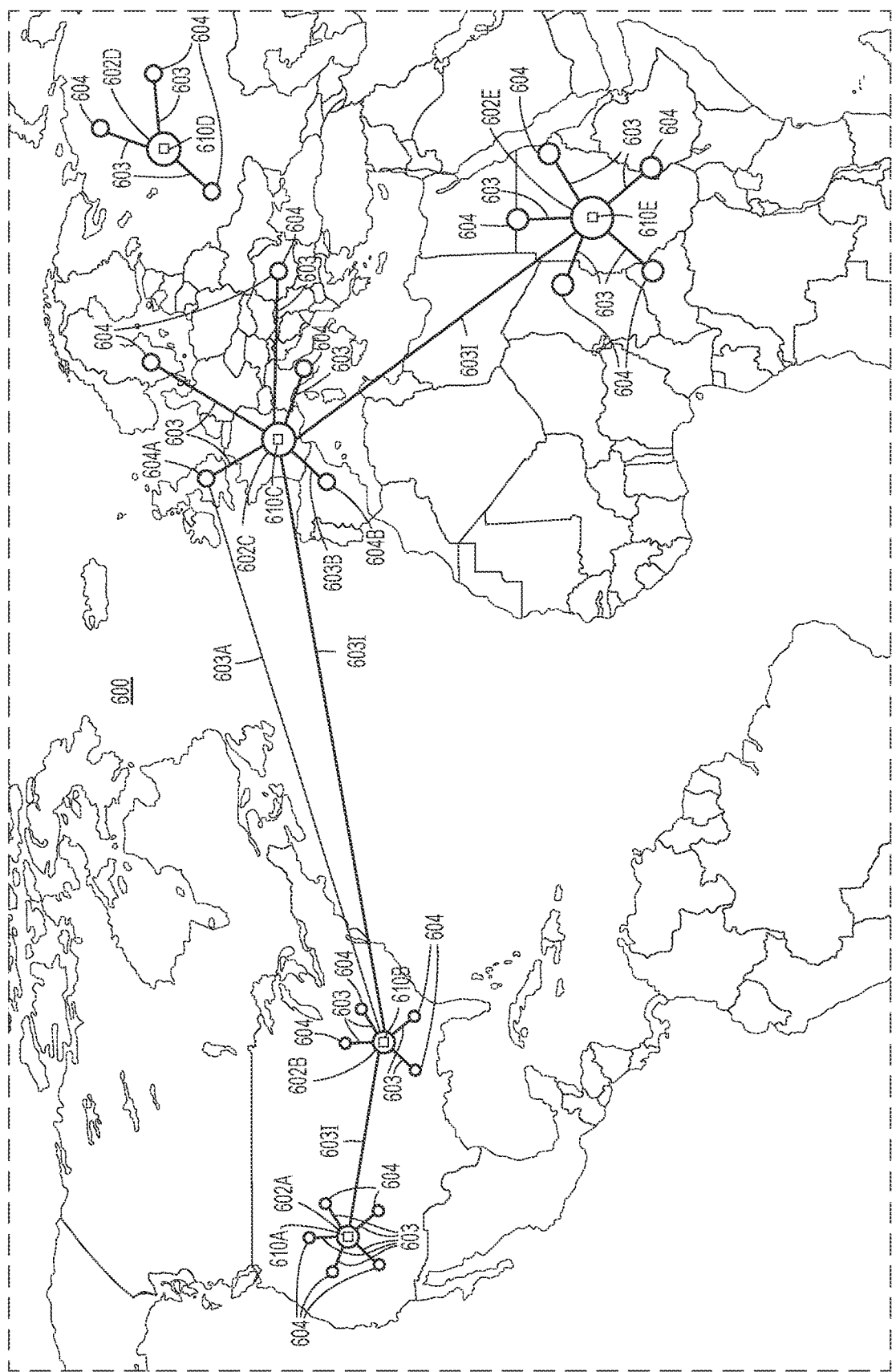
FIG. 12 illustrates an example manner in which an enterprise may implement the configuration system described herein to support an enterprise using a compute fabric hub and communication spoke configuration to support a plurality of different enterprise sites which may use different data and execution governance rules and different process control systems.

FIG. 12 illustrates an example enterprise NGPCAS system 600 having a number of compute fabric hubs 602 located in various regions, in this case countries or common political regions (e.g., the European Union), connected to various physical locations via one or more communication spokes 603. In this example, the enterprise includes two compute fabric hubs 602A and 602B located in the United States, one compute fabric hub 602C located in Europe (e.g., in one or more countries associated with the European Union (EU)), one compute fabric hub 602D in Russia and one compute fabric hub 602E in Africa. Each of the compute fabric hubs 602 includes one or more terminal communication spokes 603, with each terminal communication spoke 603 going from a hub 602 to a physical location 604. As will be understood, the spokes 603 associated with a particular hub 602 may connect the hub 602 to different physical locations which may be in the same region or within different regions as the hub 602. Moreover, if desired, one or more communication spokes 6031 may be disposed or configured to provide communications between two hubs 602 to enable direct inter-hub communications. In this manner, data received from a particular physical location 604 at a first hub 602 via a communication spoke 603 at that hub 602 may be routed to a second compute fabric hub 602 via an inter-hub spoke 6031. Likewise, communications from a first hub 602 (such as control signals, data requests, configuration changes, etc.) may be sent to a particular physical location 604 by a first hub by sending that data via an inter-hub spoke 6031 to a second hub 602, which may then provide that communication to a physical location 604 via a communication spoke 603 established between the second hub 602 and the physical location 604. As illustrated in FIG. 12, a particular compute fabric hub 602, such as the hub 602A, may in some cases only include terminal spokes 603 to physical locations 604 in the same region (for example, the United States). Of course, in other cases, a particular compute fabric hub 602, such as the hub 602B, may include terminal spokes 603 going to physical locations 604 in multiple different regions (such as to physical locations in both the US and the EU). Likewise, such as the case with hubs 602B and 602C and the physical location 604A, multiple different hubs 602 may be connected through different spokes to the same physical location 604. As will be understood configuration databases, such as the configuration databases 306 described herein (along with the enterprise configuration database services 310 and the translation services 308), may be located in the compute fabric of each of the different ones of the hubs 602 of FIG. 12 and may operate support the sites 604 associated with the hub 602 via the spokes from that hub 602. In other cases, the common configuration database 306 (with associated enterprise configuration database services 310 and translation services 308) may be stored in and executed in one of the hubs 602 and support the sites 604 associate with multiple different hubs 602.

Importantly, this hub and spoke configuration enables data and execution management to be configured and maintained separately at each compute fabric hub 602 to enable an enterprise having physical locations in multiple different regions comply with various different laws or data governance rules within the particular regions at which the physical locations and/or the compute fabric hubs 602 are disposed. For example, different regions (such as the United States and the EU) may have different data privacy, data export and data management laws and regulations, and so it may be important to separate and track the different data that is sent to and stored at a particular compute fabric hub 602 for treatment and handling in a manner that is in compliance with appropriate laws and regulations of the hub 602. However, these laws and regulations typically apply only to data at rest, and not to data in motion. The hub and spoke structure described herein therefore also enables data (either all of the data or some subset of the data) collected by devices at a particular physical location to governed by a set of data privacy laws associated with one particular region by enabling that collected data to be sent to and only stored at a compute fabric hub 602 located in a region at which the data privacy laws and regulations are to be applied. The configuration system described herein may be located to support this data management and data storage paradigm. Thus, data collected at a physical location 604A disposed in the EU may be sent directly to a compute fabric hub 602B, for example, in the United States, without being stored at the hub 602C at the EU. In this case, a direct communication spoke 603A may be established between the hub 602B in the United States and the physical location 604A in the EU and this data may or may not be sent to or stored in the hub 602C in the EU. However, in another case, the data from the physical location 604B in the EU may be first sent via a spoke 603B to the hub 602C in the EU. However, the compute fabric hub 602C in the EU may immediately send that data via the inter-hub communication spoke 6031 to the hub 602B in the United States without storing that data, to thereby assure that the data is not governed by the data laws and regulations in the EU.

Of course, the hub and spoke configuration described herein may also or instead be used to manage or direct execution, configuration and operation activities at various different hubs and/or at various different physical locations using the same concepts. For example, different compute fabric hubs 602 may manage the execution of applications and services (including configuration services) and provide for or manage user or application authorizations differently by storing and applying different sets of rules or policies to be implemented by each compute hub 602 at the physical locations 604 to which the hubs 602 are connected. The ability of each compute fabric hub 602 to be able to store and to apply different data governance, application and other system execution rules provides for great flexibility within the enterprise in configuring, managing and storing data and in configuring, managing and controlling application execution differently at different physical locations 604 and at different compute fabric hubs 602. This feature therefore enables different configuration paradigms to be used at each different hub 602 or even at each different physical location 604, even though each of the different hubs 602 or physical locations 604 are associated with the same enterprise.

Generally speaking, to perform these data and execution management activities, the compute fabric for a particular hub 602 stores a set of rules, such as data governance rules, execution rules, access authorization rules, etc. (illustrated as components 610A, 610B, 610C, 610D and 610E at the hubs 602A, 602B, 602C, 602D and 602E, respectively), which are then implemented or applied automatically by the appropriate compute fabric components at the hubs 602A to 602E to manage data flow, application and services execution, user and services authorizations, etc. Moreover, the architecture provider/manager may provide an interface for each hub 602 to enable the enterprise (e.g., one or more authorized configuration engineers associated with the enterprise) to define, set up and store the data governance and execution rules 610 to be used at each of the hubs 602. The configuration systems described herein may also use these rules 610 to perform configuration activities and may be used to manage these rules 610, to enable the rules 610 to be changed, to track the changes to the rules 610, etc. Of course, the hub and spoke system described with respect to FIG. 13 may include one or more configuration systems, wherein each configuration system may be limited to configuring the sites 604 associated with a particular hub 602, or may enable configuration activities for sites 604 associated with different hubs 602. In some cases, different hubs 602 may each include a separate configuration system, but the configuration system of a first hub 602 may manage the configuration of elements some or all of the sites 604 connected to the first hub 602 in addition to one or more sites 604 connected to a second hub 602 (using, for example, the inter-hub communication spokes 603).

Figure 13:
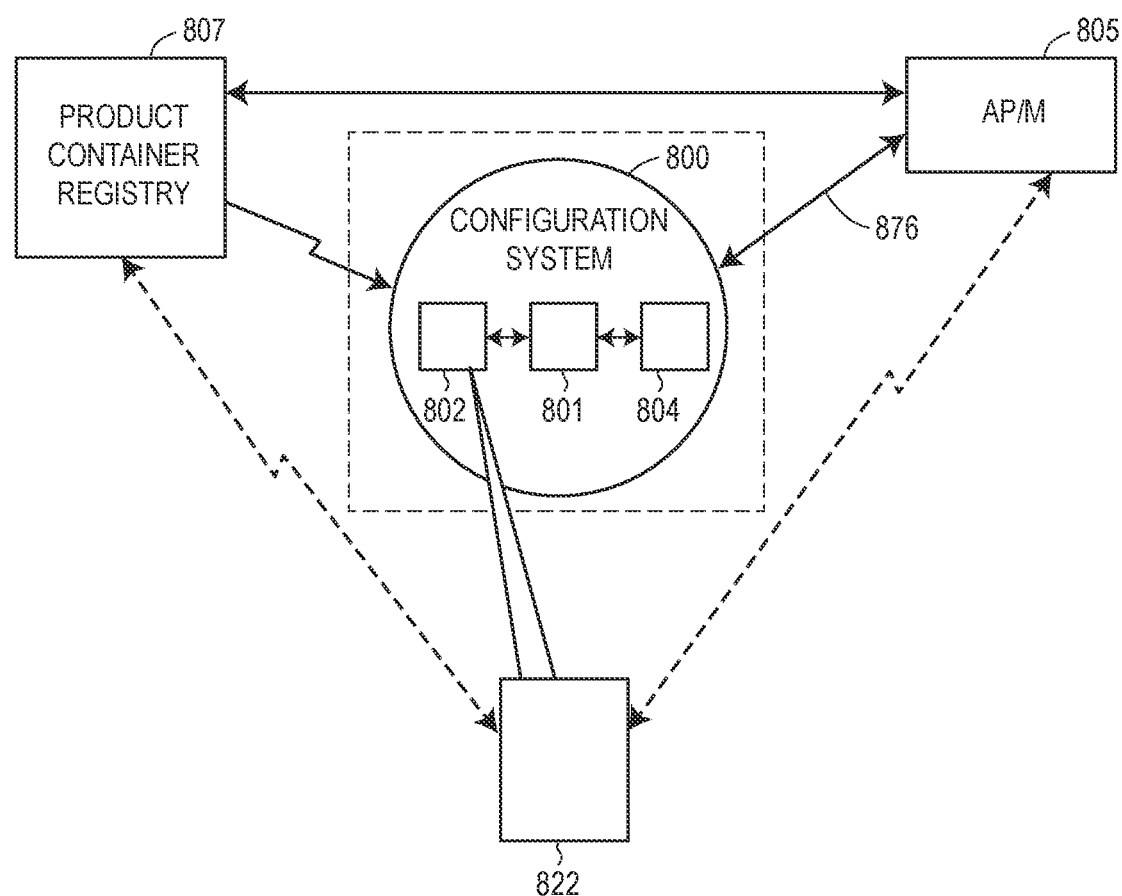
FIG. 13 is a diagram illustrating a configuration organizational system that enables configuration activities to be performed at an enterprise to add, upgrade or otherwise change the operation of the enterprise system.

FIG. 13 depicts the operation of a further enterprise configuration system 800 (which may be any of the configuration systems 300 described herein) in more detail to illustrate a manner in which an enterprise owner, operator or other user can use the configuration system 800 to make control and configuration changes to an enterprise or to any part thereof in a manner that is quick and that is easy to use. In fact, in some cases, configuration changes can be provided, in essence, via a one button push mechanism that can be used to install additional software or new software components or to upgrade software within the compute fabric of an enterprise. More particularly, FIG. 13 illustrates a configuration system 800 that may be used at, for example, one of the enterprises of the previous examples, to add, change or otherwise alter the configuration and operation of one or more process control system elements within or associated with the enterprise in an easy to implement manner.

As will be seen, FIG. 13 illustrates the configuration system 800 for an enterprise communicatively coupled to an APM 805 (which may be the APM 161 of FIG. 1) and to a product/container registry 807. Generally speaking, the enterprise configuration system 800 is located in and executed in the enterprise to which it belongs, such as within the compute fabric of the enterprise to which it belongs. However, some or all of the configuration system 800 may be stored in and executed in hardware (which may be part of the enterprise compute fabric or not) at one or more physical locations of the enterprise, at one or more dedicated hardware locations for the enterprise outside of the compute fabric or in any other location. However, importantly, the configuration system 800 of the enterprise is connected to or is integrated into the compute fabric of the enterprise so as to be able to make changes directly to elements in the compute fabric of the enterprise and to elements in the local sites 304 of the enterprise using the management structure of the compute fabric and the elements of the configuration systems 300 described above. As illustrated in FIG. 13, the configuration system 800 includes a configuration database 801, one or more configuration applications 802 and a configuration execution engine 804 which are communicatively coupled together. Of course, the configuration database 801 stores the configuration information for the enterprise, as currently configured. The configuration database may include one or physical databases that host data and relationships, for example the configuration of control modules and the relationships between them. Importantly, the configuration applications 802 may include one or more user interface applications that produce one or more user interfaces, such as a user interface 822 which is illustrated in more detail in FIG. 14, that enables a user, such as a configuration engineer at the enterprise, to take varies actions with respect to changing or upgrading a control system or any element or component thereof. As will be understood, the user interface 822 may be displayed at any computer of the enterprise, and may be provided to offsite computers associated with an enterprise via the APIs discussed previously but not shown in FIG. 13. The user interface 822 may also be located at one of the physical sites of the enterprise. Still further, the configuration engine 804 interfaces with the runtime system (e.g., the orchestrator and associated applications described herein) to implement configuration changes within the enterprise, such as within the compute fabric of the enterprise and interfaces with the local sites via the translation services described herein to make configuration changes to the local sites.

As illustrated in FIG. 13, the configuration system 800 is connected, via communication connections such as those shown and described with respect to FIGS. 1-4, with the APM 805 and may coordinate with the APM 805 to make certain types of configuration changes, such as licensing new software or hardware components in compute fabric managed or licensed from the APM or a third-party, reducing, increasing or changing the configuration of hardware within the compute fabric provided by the APM (or a third-party hardware provider), etc. Still further, the configuration system 800 is connected to a product or container registry 807 from which it may obtain new components, such as new containers, products, upgrades, etc. The configuration system 800 may access the product registry (which is located outside of the compute fabric for the enterprise) using any of the security features discussed previously. Generally speaking, the configuration system 800 includes components that interact with each other and with the APM 805 and the product/container registry 807 to enable a user to specify and implement configuration changes in the enterprise. These configuration changes may include adding new physical locations, adding new or changing computer or field device hardware (e.g., field devices, I/O devices, gateway devices, etc.) at new or existing physical locations, adding, deleting, or changing logical components (e.g., containers, control modules, control routines, monitoring routines, etc.) within the compute fabric of the enterprise, changing the pinned or other specified relationships between logical components within the compute fabric and/or between logical components and particular compute fabric hardware, etc.

As an example, one or more of the configuration applications 802 of the configuration system 800 may be used to view the current configuration of various different elements of the enterprise, including both hardware and software elements. Such a viewer may be the configuration viewer 312 of FIGS. 4 and 5. In addition, the one or more configuration applications 802 may be used to enable a user to make changes to the configuration of the enterprise, such as to add new hardware and/or software elements, to change one or more hardware or software elements, to delete one or more hardware or software elements, to change the manner in which one more software elements, such as containers, are pinned to other software elements or to hardware elements, to add new physical locations or hardware at one or more physical locations, to change the configuration of elements at one or more physical locations, to specify or change the configuration of computer hardware within or associated with the compute fabric of the enterprise or a portion of the enterprise, and/or to implement any other desired configuration changes. Such applications may be the configuration viewer 312 of FIGS. 4 and 5 and/or may be a configuration viewer that is part of the local database configuration services of FIG. 4.

Figure 14:
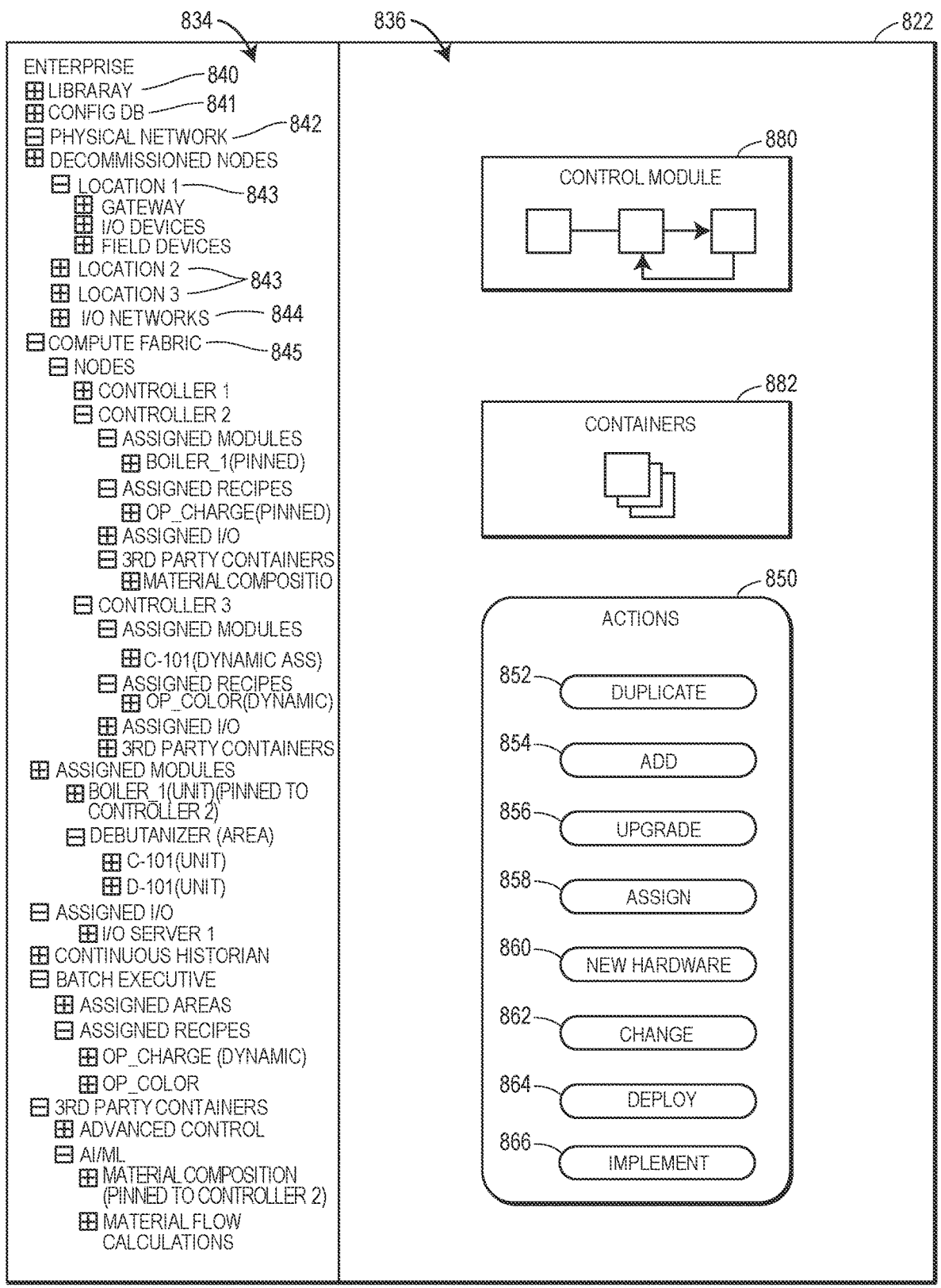
FIG. 14 is an illustration of an example configuration system user interface display that enables a user at any of a number of locations of an enterprise to make hardware and software configuration changes to various different elements of the enterprise.

In one example, as illustrated in more detail in FIG. 14, the user interface 822 may provide a configuration display screen that enables a user to view and make changes to the configuration of elements within the enterprise. In this example, the display screen 822 includes a configuration hierarchy section 834 and a diagram or programming section 836 which may be used by the configuration engineer or other user to graphically illustrate one or more configuration elements and/or to enable the configuration engineer (or other authorized user) to graphically program or make changes to the enterprise configuration at any level. The user may, for example, make changes to the configuration at the enterprise level (i.e., effecting the entire enterprise), at a sub-enterprise level, such as at one of the physical locations of the enterprise, at any grouping of components within the compute fabric of the enterprise, etc.

As illustrated in FIG. 14, the hierarchy section 834 may include a hierarchy display illustrating the various different configuration elements of the enterprise at the various levels or sublevels of the enterprise (or any other groupings of components) to illustrate the configuration elements of the enterprise as they currently exist in an organized and easy to locate manner. For example, the enterprise hierarchy 834 may include a library section 840 that includes a storage of copies of configuration elements such as control modules, control routines, function blocks, containers, and/or any other configuration elements stored in the configuration database as library elements. These library elements may be copies or generic versions (i.e., non-instantiated versions) of control elements existing in the enterprise system, such as at one of the physical locations or in the compute fabric of the enterprise. Moreover, the hierarchy section 834 may include a Configuration Database section 841 for access to the actual configuration database of the enterprise, a Physical Network section 842 that includes information for each of the decommissioned nodes or locations and each of the current commissioned physical locations of the enterprise 843. While not illustrated in FIG. 14, the hierarchy 834 may include indications of divisions and regions for the enterprise and the listed nodes (or sites 843) may be organized under the appropriate division/region. As illustrated for the site or physical Location 1, each physical location may include configuration and identifier information about the gateway(s), I/O devices, field devices, communication networks, etc. at the physical location. Such elements may include, for example, I/O devices and gateway devices for each physical location, field devices and communication devices disposed at each physical location, databases, communication structure, etc. Still further, other physical I/O networks such as wireless networks may be listed under the section 844. Moreover, the hierarchy section 834 may include a hierarchy of installed configuration elements such as configuration elements associated with each physical location, with each of set of control routines or control modules, or any other control structure etc. Of course, the hierarchy 834 may indicated areas, unit modules, etc. associated with the configuration as defined in the chart of FIG. 7.

Still further, the hierarchy 834 may include indications of control logic or control elements (e.g., containers) in the compute fabric under the Compute Fabric section 845. Elements in the compute fabric may include, for example, logical or virtual controllers, control modules, containers, etc., and may indicate the manner in which these elements are pinned or otherwise associated with or grouped with (e.g., assigned to) one another during runtime. The control elements may also include or illustrate digital twins associated with iOS devices or field devices within the various locations, and may include any groupings or configured groupings of containers or other elements. Likewise, other groupings of containers or control elements in the compute fabric may be listed, such as Assigned I/O, and third-party containers. Likewise, the configuration hierarchy 834 may illustrate supporting elements, such as one or more batch or continuous historians, a batch executive, recipes, advanced control elements, data analytic programs or software (such as artificial intelligence (AI) programs or algorithms), monitoring software, etc. that is tied into and operating in the enterprise, such as in the compute fabric of the enterprise. Of course, it will be understood, that a user can drill down into each of the sections of the hierarchy 834 to see or access more information and specifics about those elements and the sub-elements listed therein.

The diagraming or programming area 836 of the display 822 may be used to add, change, delete, reconfigure, program and/or otherwise create configuration elements to be installed in the enterprise, such as in the compute fabric of the enterprise or in devices at one or more of the physical locations of the enterprise. In particular, a user may select and view one or more elements of the hierarchy 834 and place these elements (or copies thereof) in the programming area 836. The user may then make changes to these elements graphically to indicate the changes to the configuration of these elements to be made. In other cases, the user may add or copy library elements within the hierarchy section 834 to the programming area 836 and may then edit those elements to create new configuration elements for a control system within the enterprise. In still other cases, a user may download or obtain one or more new configuration elements from an exterior source or database, such as from the product/container registry 807. Of course, the configuration application 802 may enable the user to add, change, delete or otherwise modify configuration elements in any other manner as well.

As a further example, the user interface 822 may provide a pop-up window 850 which may display various actions that can be taken by the configuration engineer or user in the diagram or programing area 836 to perform configuration activities. In particular, the window 850 may include a duplicate button 852, an add button 854, and upgrade button 856, an assign button 858, an import new hardware button 860, a change button 862, a deploy button 864, an implement button 866, etc. While the window 850 of FIG. 14 illustrates these various specific buttons associated with specific configuration actions to be taken, the window 850 could provide or list other configuration actions that can be enabled via the pop-up window 850. Moreover, the display 822 may enable these or other configuration actions via other types of inputs or commands, such as using drop down menus, radial buttons, new screens, drag and drop actions, etc.

In any event, a user, such as a configuration engineer for an enterprise, may access or select some of the elements in the enterprise hierarchy 834, such as library elements or actual configuration elements, and may display or copy those elements into the configuration screen area 836 using, for example, the duplicate button 852. The user or configuration engineer may then edit these elements, which may be, for example, a control module, and entire control system, a container, a group of containers, etc., and may assign these edited or new elements to the compute fabric, to one or more new or existing devices at an already installed physical location, at one or more new physical locations, to one or more virtual controllers in the compute fabric, etc., using for example, the assign feature 858. Of course the configuration engineer may tie or assign these elements to devices (e.g., field devices) or other hardware within the enterprise. As another example, a user may use the configuration programming area 836 and/or the library 834 to assign or pin control elements or configuration elements to one another or to specific hardware or to the same hardware or to the same virtual elements (e.g., controllers) in the compute fabric of the enterprise. Of course, the user may drag and drop new or changed configuration elements within the hierarchy section 834 to assign containers such as control modules to specific virtual or physical elements.

In one example, a control routine or module 880 and a set of containers 882 are illustrated as being placed into the programming area 836. Here, a user may select particular elements in the control loop 880 or within the containers 882 and make changes to them as needed (via pop-up windows, drop down menus, etc.) to create a different control loop for a new element or new hardware, to change the configuration of an existing control loop, to change where to assign the control loop 880 or one or more of the containers 882 within the compute fabric, etc. When finished with the edits, the user may use one of the buttons in the window 850 to assign or deploy the configuration elements 880, 882 or to implement them in the compute fabric.

Still further, as illustrated in FIG. 13, the user at the user interface 822 may have access to the product/container registry 807 which may include new containers elements, control system data analytics, control elements, or other products or modules that may be provided by the architecture provider/manager or by third-party developers for use in downloading into the compute fabric or other hardware of the enterprise. In some cases, the user may use the user interface 822 to obtain one or more containers or products or other software to be provided or used in the enterprise, such as in the compute fabric of the enterprise, from the product registry 807 and may download these elements and install them using the configuration screen 822. In particular, such containers or products may be provided as upgrades or fixes to other containers or products that already are being used or that are already installed in the compute fabric or in hardware at the physical locations of the enterprise. In this case, the new elements may be deployed into the compute fabric using the deploy button 864 (or by dragging and dropping these elements in the desired location of the hierarchy 834). In some cases, the user may have to subscribe to or obtain a license for these products or containers, in which case, the user may interface with the APM 805 (and possibly a third-party) to obtain the license. Of course, upon depressing to deploy button, the system may check to make sure that it is possible to deploy the updated or new elements within the enterprise system, and if so, the configuration engine 804 of the configuration system 800 may then deploy the new configuration elements in a manner that is seamless to the user. Because the computer hardware of the compute fabric on which the configuration elements are deployed is essentially divorced from or not specifically tied to these elements in a one-to-one manner, the configuration engine 804 of the configuration system 800 can upload these new or changed elements to the compute fabric without input from the user as to where to execute these elements.

As another example, a user may want to add a new physical location to the enterprise. In this case, the user may select a new hardware button 860 and create a new physical location in the configuration system by filling out various fields of a pop-up window. Here, the user may specify one or more hardware IDs for the new hardware, such as a gateway ID, and the configuration system or engine 804 may access that gateway and then perform an auto detect for hardware at the gateway. The configuration system may the auto-populate the hardware specifics for the new physical location in the configuration system 800. In some cases, the user may select a duplicate button 852 to duplicate hardware at another physical location for the new physical location where the new physical location is designed to use the same basic hardware or field devices to perform a process as an existing physical location. In this case, the user may additionally copy or duplicate (or create new) control routines, modules or containers for the new physical location using the buttons 852, 854 and may assign these new configuration elements to the new hardware at the new physical location using the button 858. When finished, the user may deploy the new routines or containers in the compute fabric using the deploy button 864. If desired, a new node may be added (licensed, for example) in the compute fabric to execute the new containers for the new physical location, although this is not strictly necessary. In any event, after changing or copying the hardware and/or control containers and other information from one of the other locations into the configuration programming screen or otherwise creating control routines and/or containers for the new hardware, the user may assign those elements to the new hardware or physical location to which it belongs using the assign button 858. The user may then use the deploy button 864 to cause the configuration engine 804 to execute to deploy those elements into the compute fabric in the configured manner to control the new hardware at the new physical location, which enables the process control system to start operating and functioning at the new location.

In another example, the user may simply want to add additional hardware at one of the already establish locations. In this case, the user may also provide a new control routine or set of containers, or change the current configuration for that new hardware using the applications 802 and screen 822 of FIG. 14. In other cases the user may do so by starting with the add button 854 in order to add new configuration elements such as containers, control loops, etc. for the new hardware. Still further, the user may, in another example, want to upgrade already existing configuration elements, such as containers or products, with new features as provided by the APM or a third-party provider. In this case, the user may obtain a copy of an upgraded version of the container or control loop with the new feature to be implemented, from the product registry or container registry 807. The user may then place these new or upgraded elements in the configuration location identified in the configuration screen 822 and identify the elements to which they are replacing in the already installed compute fabric. The user may then press the upgrade button 856 to instruct the configuration engine 804 to upgrade that element in the compute fabric with the new configuration component.

Still further, the user may use other buttons such as the change button 862 in order to reassign or change the assignment of one or more elements in the compute fabric in order to assign these elements to particular hardware, to particular locations, etc. For example, the user may want to assign configuration elements to run in compute fabric hardware physically located in one of the physical locations of the enterprise instead of running or executing in licensed compute fabric hardware. Again, the user may use the assign button 858 and then select the compute fabric hardware on which selected configuration elements are to be executed, to thereby assign the operation of those elements in that compute fabric hardware. In this case, the configuration system 800 may operate to assure that the new configuration elements are stored down in the hardware machines of the new location of the compute fabric prior to switching over control to those machines from the previous machine. Upon the change incurring, the configuration system 800 may delete or destroy the elements running the previously assigned sections of the compute fabric.

In another example, a user may use the display 822 of FIG. 14 or a different configuration display to query the configuration database to see where devices, equipment, and control strategies are used or are located, even when such devices, equipment and control strategies are distributed across different physical sites. A user may also perform a search for the specific elements associated with a particular site, division or region of an enterprise. Such queries may enable a user to search for various different configuration elements or types of configuration elements, such as devices, equipment, control strategies, unit equipment, function blocks, etc. of any nature. The searches may be performed by a further configuration database service (e.g., a search service, not specifically shown in FIG. 5) that may search the configuration database for the queried configuration elements or search parameters. Such a search may be performed within a particular site of a particular region and/or a particular division of an enterprise, but could be performed across multiple different sites, multiple different regions and/or multiple different divisions of an enterprise. Moreover, searches could be performed using an element name or tag or a portion of a name or tag, by using an element type (e.g., device type, control strategy type, a function block type, an equipment type, etc.) or using any other search criteria. Such a search may provide a user with detailed information on devices, control strategies, equipment, etc. within various different portions of an enterprise or for the entire enterprise, which could be extremely helpful in many circumstances.

Of course, the user may take any other actions via the configuration systems described herein to add, delete or otherwise change one or more configuration elements in the configuration system to enhance or change the control system at any level of the enterprise. As will be understood, the configuration system is integrated into the compute fabric and management systems thereof as described herein, and so enables an enterprise user to easily make changes to any element of the control system as actually implemented, because the actual computer hardware to which configuration elements are download will be either known to the configuration system 800 or will be determined automatically by the configuration system 800. This feature essentially enables a one-button push mechanism to perform configuration changes, which makes the updating or changing the configuration very quick and easy to perform.

Of course, it will be understood that the configuration data that viewed, used and changed via the interface 822 of FIG. 14 is obtained, managed and coordinated using reads from and writes to (or other actions) vis-à-vis the configuration database that stores the configuration data, such as the configuration database 306 of FIGS. 4 and 5, using the underlying structures and operations described with respect to FIGS. 4 and 5 and using, for example, the data models and communication models described with respect to FIGS. 6-11.

Figure 15:
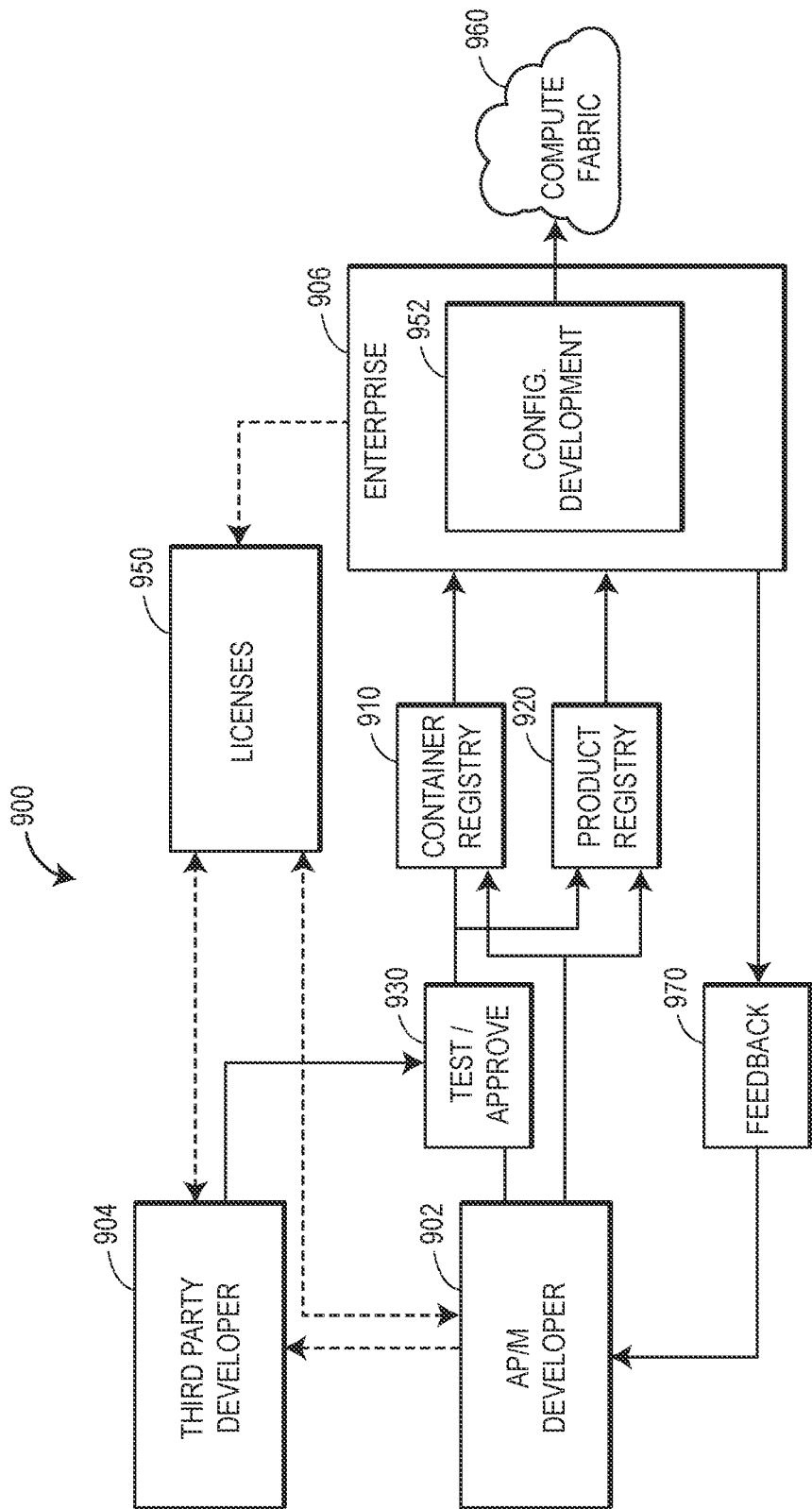
FIG. 15 is a diagram illustrating a development system used to develop and roll-out new features, such as containers or products, at one or more of the enterprise systems of FIGS. 1 and 2, in a manner that shortens development and roll-out time associated with new control system features while providing the enterprise system managers with the ability to control the timing of and selection of configuration changes to the enterprise system.

FIG. 15 depicts a development system 900 that supports the deployment of and configuration of new configuration elements in a simple and easy to manage manner. In particular, the development system 900 includes an APM developer system or section 902 and a third-party developer section 904, both of which may provide new or changed products or containers to an enterprise 906 for deployment and use in the enterprise. In particular, developers associated with the APM 902 may create, edit, upgrade or otherwise provide new configuration products, such as containers, to be implemented at an enterprise or at some portion of an enterprise. When completed, these products or containers may be placed in a product registry 910 or a container registry 920 to be accessed by an enterprise at the timing schedule of the enterprise. Similarly, a third-party developer 904 may create, edit, upgrade or otherwise provide new configuration products, such as containers, and may send these products or containers to a test/approve step 930 in which the APM 902 reviews and tests the third-party developed products for functionality with the APM system or with a specific enterprise system. If and when approved, the product or container may be then placed into the product registry 910 or the container registry 920. While separate registries are illustrated in FIG. 15 for products and containers, a single registry for both could be used. Moreover, the product/container registry 807 of FIG. 13 could be one or both or the registries 910 and 920 of FIG. 15.

Of course, a new product or container placed into the registry could be any configuration element or elements and may be, for example, new or updated control elements, display elements, communication elements, data analytic elements, etc. As will be understood, the configuration element development at the boxes or steps 902 and 904 are performed, in a general sense, off-line from operation of an enterprise that is to use that element until the product or container is ready for deployment in the enterprise. Of course, the fact that a new or changed product or container (which may be an upgrade to an existing product or container) is available within the registry 910, 920 may be pushed out to the enterprise in the form of marketing or other information provided to the enterprise or to a user at the enterprise to enable the enterprise to know that the new container or product exists. In some cases, the new containers or products may be upgrades to existing containers or products already being used by the enterprise or the containers or products may be new containers or products that may be need a new license or an additional license by the enterprise in order to be downloaded and used at the enterprise.

In any event, once one of the registries 910 and/or 920 store a new or enhanced product or container, the enterprise owner may then access and download those containers or products at their leisure or convenience, without needing to have these products pushed to the enterprise at times when the enterprise is not ready to absorb them or use them. Thus, using this system, the enterprise owner 906 has full control of when it implements or installs new or upgraded products or containers. When ready, the enterprise 906 (or a user at the enterprise 906) may access and download a new or upgraded product or container from one of the registries 910, 920, such as using the system of FIGS. 13 and 14. If needed, the enterprise 906 may use a license step 950 to obtain any licenses that are needed for the new or upgraded product or container, either from the APM and/or from a third-party developer 904. The license step 950 may additionally detect if a new license is needed or required, and if not, may authorize the enterprise to download the new product or container. The enterprise 906 and, in particular, a configuration system 952 of the enterprise 906 (such as the configuration system 800 of FIG. 13) may be used to deploy the new container or product as described with respect to, for example, FIGS. 13 and 14. This deployment is illustrated as being performed by deploying the new product or container to a compute fabric 960 of the enterprise 906. Additionally, once the new product or container is deployed in the compute fabric 960, the enterprise 906 may provide feedback data about the operation of the new product or container via a feedback step 970. This feedback may be provided to the APM developer 902 (who may provide it to a third-party developer 904, such as in a sanitized manner). This feedback data (which may be specified as part of the container or product, spelled out in a license, etc.) may be collected and sent automatically or at the control of the enterprise 906. In any event, the APM developer 902 and/or the third-party developer 904 may use this feedback data as provided by the block or step 970 to change or improve the operation of the containers or products provided and deployed at the enterprise 906. Additionally, as illustrated or described respect to earlier embodiments, the feedback step or block 970 may collect and provide information related to some or all of the containers or products operating in the compute fabric of the enterprise 906 to the APM developer 902 to develop new products, to enhance the operation of existing products, etc.

Importantly, the product development cycle 900 provides an easy and quick development cycle that enables rapid deployment of new products (e.g., containers) being created for an enterprise system 906. However, this development cycle also enables the enterprise owner to download and install or deploy new configuration elements at the convenience of and on the time schedule of the enterprise, instead of on the time schedule of the product developer as is common today. Still further, while only one enterprise 906 is illustrated in the loop or configuration development cycle 900 of FIG. 15, multiple different enterprises could simultaneously be tied into or use of container and product registries 910, 920 and the license and feedback loops 950 and 970 depicted in FIG. 15.

Other Considerations

When implemented in software, any of the applications, modules, etc. described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present application has been described with reference to specific examples, which are intended to be illustrative only and not to be limiting, it will be apparent to those of ordinary skill in the art that changes, additions or deletions may be made to the disclosed embodiments without departing from the spirit and scope of the application.

The particular features, structures, and/or characteristics of any specific embodiment may be combined in any suitable manner and/or in any suitable combination with one and/or more other embodiments, including the use of selected features with or without corresponding use of other features. In addition, many modifications may be made to adapt a particular application, situation and/or material to the essential scope or spirit of the present application. It is to be understood that other variations and/or modifications of the embodiments of the present application described and/or illustrated herein are possible in light of the teachings herein and should be considered part of the spirit or scope of the present application. Certain aspects of the application are described herein as example aspects.

The invention claimed is:

1. An enterprise configuration system for use in viewing and changing the configuration of an enterprise system having a compute fabric communicatively connected to one or more plant sites, each plant site having components of one or more control or automation systems located therein, the control or automation systems including one or more field devices which perform one or more physical functions within the plant site and one or more controllers which control the one or more field devices to perform the one or more physical functions within the plant site, and the compute fabric including computer devices that implement computer implemented elements for the one or more plants sites, the configuration system comprising:

an enterprise configuration database stored in and executed in a computer storage device within the compute fabric of the enterprise that stores configuration data for components of each of the one or more plant sites, the configuration data including setup data defining a manner in which the control or automation system of each of the plant sites is configured to cause the one or more controllers to control the one or more field devices within each plant site to perform the one or more physical functions within each plant site;

a configuration support viewing application executed on a processor of a computer device that accesses data from the enterprise configuration database via a connections to the enterprise configuration database via the compute fabric;

one or more local configuration systems stored at and executed on a processor at each of the one or more plant sites, each local configuration system being independent from each other local configuration system and including one or more local database configuration support services that execute on a processor at the plant site to interface with a user at the plant site and to present the user at the plant site with configuration data for the plant site and operate to implement changes made by the user at the plant site to change the configuration of the components of a control or automation system at associated with the plant site without enabling the user to view and change the configuration of components at other plant sites, to thereby change the setup data defining the manner in which the control or automation system of the associated plant site is configured to cause the one or more controllers to control the one or more field devices within the associated plant site to perform the one or more physical functions within the associated plant site; and a set of enterprise configuration database services that is independent from each local configuration system and that is stored in and executed in a processor of the compute fabric that (1) interfaces between the enterprise configuration database and the configuration support viewing application to enable the configuration support viewing application to view and change the configuration of the one or more local configuration systems at each of the one or more plant sites to thereby view and change the manner in which the one or more field devices and the one or more controllers which control the one or more field devices at the one or more plant sites operate to perform the one or more physical functions at each of the one or more plant sites, and that (2) interfaces between the enterprise configuration database and the local database configuration support services at each of the plant sites to enable each of the local database configuration support services to view and change the configuration data for the plant site at which each of the local database configuration support services is located to thereby view and change the manner in which the one or more field devices and the one or more controllers which control the one or more field devices operate to perform the one or more physical functions at the plant site.

2. The enterprise configuration system of claim 1, wherein each of the local database configuration support services includes a local configuration database that stores configuration data for the plant site at which the local database configuration database is located.

3. The enterprise configuration system of claim 1, wherein the enterprise configuration database stores the configuration data for each of the plant sites in a first configuration data schema and at least one of the one or more local database configuration support services uses configuration data for a plant site using a second configuration data schema that is different than the first configuration data schema.

4. The enterprise configuration system of claim 3, wherein the set of enterprise configuration database services includes a first sub-set of configuration database services that interfaces with the configuration support viewing application, and includes a set of translation services, wherein at least one of the set of translation services interfaces between the enterprise configuration database and one of the local database configuration support services and operates to translate configuration data between the first configuration data schema and the second configuration data schema used at the plant site.

5. The enterprise configuration system of claim 1, wherein one or more of the enterprise configuration database services includes an interface layer that interfaces with the configuration viewing support application, a domain model layer that stores a data model associated with a first configuration data schema and a database abstraction layer that interfaces with the enterprise configuration database to store configuration data in and to read configuration data from the enterprise configuration database.

6. The enterprise configuration system of claim 5, wherein the enterprise configuration database includes multiple different database components that use different database storage technologies, and wherein the abstraction layer for a first configuration database service supports the use of a first database storage technology and the abstraction layer for a second enterprise configuration database service supports the use of a second database storage technology different than the first database storage technology.

7. The enterprise configuration system of claim 5, wherein the domain model layer translates between a first configuration data schema associated with the data model and a second configuration data schema associated with the configuration support viewing application.

8. The enterprise configuration system of claim 7, wherein the communication layer interfaces with a configuration viewing application using the second data schema and a messaging schema of the configuration viewing application.

9. The enterprise configuration system of claim 8, wherein the communication layer extracts a set of configuration data and an action from a message from configuration support viewing application using the second configuration data schema of the configuration viewing application and creates one or more messages to the configuration support viewing application by creating a message including configuration data using the second configuration data schema of the configuration support viewing application.

10. The enterprise configuration system of claim 1, wherein the set of enterprise configuration database services includes a set of translation services, wherein each of the set of translation services interfaces between the enterprise configuration database and one of the local database configuration support services and operates to translate configuration data between a first configuration data schema used in the enterprise configuration database and a second configuration data schema used at a plant site.

11. The enterprise configuration system of claim 10, further including a bridge device disposed between the local database configuration support services at a particular plant site and the translation service for the plant site, wherein the bridge device marshals communications between the local database configuration support services at the particular plant site and the enterprise configuration database.

12. The enterprise configuration system of claim 11, wherein the bridge device stores and implements security authorizations to enable communications between the local database configuration support services at the particular plant site and the enterprise configuration database in the compute fabric.

13. The enterprise configuration system of claim 11, wherein the bridge device encapsulates configuration data in messages to send between the local database configuration support services at the particular plant site and the enterprise configuration database in the compute fabric.

14. The enterprise configuration system of claim 11, wherein the bridge device uses a data model that includes a tiered data format and wherein the bridge device develops messages that includes data from multiple different elements of the tiered data format.

15. The enterprise configuration system of claim 14, wherein the bridge device automatically groups various different data from the different elements of the tiered data format to create a data message.

16. The enterprise configuration system of claim 11, wherein the bridge device manages changes to enterprise configuration database using change messages that include multiple changes to the configuration data in the configuration database.

17. The enterprise configuration system of claim 16, wherein the bridge device develops change messages that include change sets, each change set having one or more change records associated with one or more configuration changes.

18. The enterprise configuration system of claim 17, wherein each change set is associated with multiple changes to configuration data.

19. The enterprise configuration system of claim 1, wherein the configuration database services includes one or more further services that manage changes to the enterprise configuration database by storing and implementing one or more rules associated with changes to the configuration database and that analyzes one or more changes to the enterprise configuration database using the one or more rules.

20. The enterprise configuration system of claim 1, wherein the configuration database services includes one or more further services that manage changes to the enterprise configuration database by automatically coordinating changes made to the enterprise configuration database with the implementation of changes to one or more elements at a plant site associated with the changes made to the enterprise configuration database.

21. The enterprise configuration system of claim 1, wherein the configuration database services includes one or more further services that track changes to the enterprise configuration database by automatically storing information about changes made to the enterprise configuration database, including one or more of who made a configuration change, a time of a configuration change, a reason for a configuration change, and an authorization for a configuration change.

22. The enterprise configuration system of claim 1, wherein the configuration database services includes one or more further services that coordinate the implementation of changes to the enterprise configuration database or to a configuration of elements at a plant site by coordinating the timing of multiple changes made to the enterprise configuration database or the elements at a plant site.

23. The enterprise configuration system of claim 1, wherein the enterprise configuration database uses a data model that stores and organizes configuration data by enterprise regions, each enterprise region including one or more plant sites.

24. The enterprise configuration system of claim 1, wherein the enterprise configuration database uses a data model that stores and organizes configuration data by enterprise divisions, each enterprise division including one or more plant sites.

25. The enterprise configuration system of claim 1, wherein the enterprise configuration database uses a data model that stores and organizes configuration data for an enterprise having multiple plant sites by storing and managing configuration data for each of the multiple plant sites.

26. The enterprise configuration system of claim 1, wherein the configuration database services include one or more further services that perform a search of the enterprise configuration database to search for configuration elements according to a provided search criterion.

27. The enterprise configuration system of claim 26, wherein the one or more further services search for configuration elements across multiple different plant sites.

28. The enterprise configuration system of claim 26, wherein the one or more further services search for configuration elements across multiple different regions of the enterprise.

29. The enterprise configuration system of claim 26, wherein the one or more further services search for configuration elements across multiple different divisions of the enterprise.

30. An enterprise configuration system for use in viewing and changing the configuration of an enterprise system having a compute fabric communicatively connected to a multicity of plant sites, each plant site having components of one or more different control or automation systems located therein, the control or automation systems including one or more field devices which perform one or more physical functions within the plant site and one or more controllers which control the one or more field devices to perform the one or more physical functions within the plant site, including a first plant site having a first process control or automation system that uses a first configuration data schema and a second plant site having a second process control or automation system that uses a second configuration data schema, and the compute fabric including computer devices that implement computer implemented elements for the one or more plants sites, the configuration system comprising:
an enterprise configuration database stored in and executed in a computer storage device of the compute fabric of the enterprise that stores configuration data for components of each of the one or more plant sites using a further configuration data schema, the configuration data including setup data defining a manner in which the control or automation system of each of the plant sites is configured to cause the one or more controllers to control the one or more field devices within each plant site to perform the one or more physical functions within each plant site;
one or more local configuration systems stored in a computer memory device and executed on a processor at each of the one or more plant sites, each local configuration system being independent from each other local configuration system and including one or more local database configuration support services that execute on a processor at the plant site to interface with a user at the plant site and to present the user at the plant site with configuration data for the plant site and operate to implement changes made by the user at the plant site to change the configuration of the components of a control or automation system associated with the plant site without enabling the user to view and change the configuration of components at other plant sites, to thereby change the setup data defining the manner in which the control or automation system of the associated plant site is configured to cause the one or more controllers to control the one or more field devices within the associated plant site to perform the one or more physical functions within the associated plant site, a first one of the local configuration systems using the first configuration data schema and a second one of the local configuration systems using the second configuration data schema; and
a set of enterprise configuration database services that is independent from each local configuration system and that is stored in and executed in one or more computer devices of the compute fabric that interfaces between the enterprise configuration database and the local database configuration support services at each of the plant sites to enable each of the local database configuration support services to view and change the configuration data within the enterprise configuration database for the plant site at which each of the local database configuration support services is located to thereby view and change the manner in which the one or more field devices and the one or more controllers which control the one or more field devices at the plant site at which the local database configuration support services is located operate to perform the one or more physical functions the plant site at which the local database configuration support services is located.

31. The enterprise configuration system of claim 30, further including a configuration support viewing application executed on a computer device that accesses data from the enterprise configuration database via a connection to the enterprise configuration database via the compute fabric and wherein one of the set of enterprise configuration database support services interfaces between the enterprise configuration database and the configuration support viewing application to enable the configuration support viewing application to view and change the configuration of the one or more local configuration systems at each of the one or more plant sites.

32. The enterprise configuration system of claim 30, wherein each of the local database configuration support services includes a local configuration database that stores configuration data for the plant site at which the local database configuration database is located.

33. The enterprise configuration system of claim 30, wherein the set of enterprise configuration database services includes a set of translation services executed in the compute fabric, wherein each of the set of translation services interfaces between the enterprise configuration database and one of the local database configuration support services and operates to translate configuration data between one of the first or second configuration data schemas used at the plant site and the further configuration data schema used in the enterprise configuration database.

34. The enterprise configuration system of claim 33, wherein one or more of the translation services includes an interface layer that interfaces with a plant site, a domain model layer that stores a data model associated with the further configuration data schema and a database abstraction layer that interfaces with the enterprise configuration database to store and read configuration data from the enterprise configuration database using the further configuration data schema.

35. The enterprise configuration system of claim 34, wherein the enterprise configuration database includes multiple different database components that use different database storage technologies, and wherein the abstraction layer for a first translation service supports the use of a first database storage technology and the abstraction layer for a second translation service supports the use of a second database storage technology different than the first database storage technology.

36. The enterprise configuration system of claim 34, wherein the domain model layer translates between the further configuration data schema associated with the data model and one of the first and second data schemas associated with configuration data at one of the plant sites.

37. The enterprise configuration system of claim 33, further including a bridge device disposed between the local database configuration support services at a particular plant site and the translation service for the particular plant site, wherein the bridge device marshals communications between the local database configuration support services at the particular plant site and the enterprise configuration database.

38. The enterprise configuration system of claim 37, wherein the bridge device stores and implements security authorizations to enable communications between the local database configuration support services at the particular plant site and the enterprise configuration database in the compute fabric.

39. The enterprise configuration system of claim 37, wherein the bridge device encapsulates configuration data in messages to send between the local database configuration support services at the particular plant site and the enterprise configuration database in the compute fabric.

40. The enterprise configuration system of claim 37, wherein the bridge device uses a data model that includes a tiered data format and wherein the bridge device develops messages that includes data from multiple different elements of the tiered format.

41. The enterprise configuration system of claim 40, wherein the bridge device automatically groups data from multiple different tiers of the tiered format to create a data message.

42. The enterprise configuration system of claim 40, wherein the bridge device manages changes to enterprise configuration database using change messages that include multiple changes to the configuration data in the enterprise configuration database.

43. The enterprise configuration system of claim 30, wherein the configuration database services includes one or more services that manage changes to the enterprise configuration database by storing and implementing one or more rules associated with changes to the configuration database and by analyzing a change to configuration data within the enterprise configuration database using the one or more rules.

44. The enterprise configuration system of claim 30, wherein the configuration database services includes one or more further services that manage changes to the enterprise configuration database by automatically coordinating changes made to the enterprise configuration database with the implementation of changes to one or more elements at a plant site associated with the changes made to the enterprise configuration database.

45. The enterprise configuration system of claim 30, wherein the configuration database services includes one or more further services that track changes to the enterprise configuration database by automatically storing information about changes made to the enterprise configuration database, including one or more of who made a configuration change, a time of a configuration change, a reason for a configuration change, and an authorization for a configuration change.

46. The enterprise configuration system of claim 30, wherein the configuration database services includes one or more further services that coordinate the implementation of changes to the enterprise configuration database or to a configuration of elements at a plant site by coordinating the timing of multiple changes made to the enterprise configuration database or the elements at a plant site.

47. The enterprise configuration system of claim 30, wherein the enterprise configuration database uses a data model that stores and organizes configuration data by enterprise regions, each enterprise region including one or more plant sites.

48. The enterprise configuration system of claim 30, wherein the enterprise configuration database uses a data model that stores and organizes configuration data by enterprise divisions, each enterprise division including one or more plant sites.

49. The enterprise configuration system of claim 30, wherein the enterprise configuration database uses a data model that stores and organizes configuration data for an enterprise having multiple plant sites by storing and managing configuration data for each of the multiple plant sites.

50. The enterprise configuration system of claim 30, wherein the first one of the plant sites uses a first type of process control or automation system and the second one of the plant sites uses a second type of process control or automation system, wherein the second type of process control or automation system is different than the first type of process control or automation system.

51. The enterprise configuration system of claim 30, wherein the first one of the plant sites uses a process control or automation system made by a first manufacturer and the second one of the plant sites uses a second process control or automation system made by a second and manufacturer different than the first manufacturer.

52. The enterprise configuration system of claim 30, further including one or more search services that perform a search of the enterprise configuration database to search for configuration elements according to a provided search criterion.

53. The enterprise configuration system of claim 52, wherein the one or more search services search for configuration elements across multiple different plant sites.

54. An enterprise configuration system for use in viewing and changing the configuration of an enterprise system having a compute fabric communicatively connected to a multicity of plant sites, each plant site having components of one or more different control or automation systems located therein, the one or more different control or automation systems including one or more field devices which perform one or more physical functions within a plant site and one or more controllers which control the one or more field devices to perform the one or more physical functions within a plant site, and the compute fabric including computer devices that implement computer implemented elements for the one or more plants sites, the configuration system comprising:
- an enterprise configuration database stored in and executed in a computer storage device of the compute fabric of the enterprise that stores configuration data for components of each of the one or more plant sites using a first configuration data schema, including storing configuration data for elements used to control or monitor one of the plant sites located at the one of the plant sites and storing configuration data for one or more elements used to control or monitor one of the plant sites located in the compute fabric, the configuration data including setup data defining a manner in which the control or automation system of each of the plant sites is configured to cause the one or more controllers to control the one or more field devices within each plant site to perform the one or more physical functions within each plant site;
- a configuration support viewing application executed on a processor of a computer device that accesses data from the enterprise configuration database via a connection to the enterprise configuration database via the compute fabric;
- one or more local configuration systems stored at and executed on a processor at each of the one or more plant sites, each local configuration system being independent from each other local configuration system and including one or more local database configuration support services that execute on a processor at the plant site to interface with a user at the plant site and to present the user at the plant site with configuration data for the plant site and operate to implement changes made by the user at the plant site to change the configuration of the components of a control or automation system at associated with the plant site without enabling the user to view and change the configuration of components at other plant sites, to thereby change the setup data defining the manner in which the control or automation system of the associated plant site is configured to cause the one or more controllers to control the one or more field devices within the associated plant site to perform the one or more physical functions within the associated plant site; and
- a set of enterprise configuration database services that is independent from each of the local configuration systems and that is stored in and executed in a processor in the compute fabric that interfaces between the enterprise configuration database and the configuration support viewing application to enable the configuration support viewing application to view and change configuration data for elements that are used to control or monitor one of the plant sites and that are located at the one of the plant sites and to view and change configuration data for the one or more elements used to control or monitor the one of the plant sites that are located in the compute fabric to thereby view and change the manner in which the one or more field devices and the one or more controllers which control the one or more field devices at the one or more plant sites operate to perform the one or more physical functions at each of the one or more plant sites, wherein the set of enterprise configuration database services further interface between the enterprise configuration database and the local database configuration support services at each of the plant sites to enable each of the local database configuration support services to view and change the configuration data for the plant site at which each of the local database configuration support services is located to thereby view and change the manner in which the one or more field devices and the one or more controllers which control the one or more field devices operate to perform the one or more physical functions at the plant site.

55. The enterprise configuration system of claim 54, wherein the set of enterprise configuration database services includes a set of translation services executed in the compute fabric, wherein each of the set of translation services interfaces between the enterprise configuration database and one of the local database configuration support services and operates to translate configuration data between a first configuration data schemas used by the enterprise configuration database and a further configuration data schema used at one of the plant sites.

56. The enterprise configuration system of claim 55, wherein one or more of the translation services includes an interface layer that interfaces with a plant site, a domain model layer that stores a data model associated with the first configuration data schema and a database abstraction layer that interfaces with the enterprise configuration database to store configuration data to and to read configuration data from the enterprise configuration database.

57. The enterprise configuration system of claim 56, wherein the enterprise configuration database includes multiple different database components that use different database storage technologies, and wherein the abstraction layer for a first translation service supports the use of a first database storage technology and the abstraction layer for a second translation service supports the use of a second database storage technology different than the first database storage technology.

58. The enterprise configuration system of claim 54, further including a bridge device disposed between the local database configuration support services at a particular plant site and the translation service for the particular plant site, wherein the bridge device marshals communications between the local database configuration support services at the particular plant site and the enterprise configuration database.

59. The enterprise configuration system of claim 58, wherein the bridge device stores and implements security authorizations to enable communications between the local database configuration support services at the particular plant site and the enterprise configuration database in the compute fabric.

60. The enterprise configuration system of claim 58, wherein the bridge device uses a data model that includes a tiered data format and wherein the bridge device develops messages that includes data from multiple different elements of the tiered format.

61. The enterprise configuration system of claim 60, wherein the bridge device automatically groups various different data from the multiple different elements of the tiered formal to create a data message.

62. The enterprise configuration system of claim 58, wherein the bridge device manages changes to enterprise configuration database using change messages that include multiple changes to the configuration data in the enterprise configuration database.

63. The enterprise configuration system of claim 54, wherein the configuration database services includes one or more further services that manage changes to the enterprise configuration database by storing and implementing one or more rules associated with changes to the enterprise configuration database and analyzing changes made to the enterprise configuration database using the one or more rules.

64. The enterprise configuration system of claim 54, wherein the configuration database services includes one or more further services that manage changes to the enterprise configuration database by automatically coordinating changes made to the enterprise configuration database with the implementation of changes to one or more elements at a plant site associated with the changes made to the enterprise configuration database.

65. The enterprise configuration system of claim 54, wherein the configuration database services includes one or more further services that track changes to the enterprise configuration database by automatically storing information about changes made to the enterprise configuration database, including one or more of who made a configuration change, a time of a configuration change, a reason for a configuration change, and an authorization for a configuration change.

66. The enterprise configuration system of claim 54, wherein the configuration database services includes one or more services that coordinate the implementation of changes to the enterprise configuration database or to a configuration of elements at a plant site by coordinating the timing of multiple configuration changes made to the enterprise configuration database or the elements at a plant site.

67. The enterprise configuration system of claim 54, wherein the enterprise configuration database uses a data model that stores and organizes configuration data by enterprise regions, each enterprise region including one or more plant sites.

68. The enterprise configuration system of claim 54, wherein the enterprise configuration database uses a data model that stores and organizes configuration data by enterprise divisions, each enterprise division including one or more plant sites.

69. The enterprise configuration system of claim 54, wherein the enterprise configuration database uses a data model that stores and organizes configuration data for an enterprise having multiple plant sites by storing and managing configuration data for each of the multiple plant sites.

70. The enterprise configuration system of claim 54, wherein the first one of the plant sites uses a first type of process control or automation system and the second one of the plant sites uses a second type of process control or automation system, wherein the second type of process control or automation system is different than the first type of process control or automation system.

71. The enterprise configuration system of claim 54, further including one or more search services that perform a search of the enterprise configuration database to search for configuration elements according to a provided search criterion.

72. The enterprise configuration system of claim 71, wherein the one or more search services search for configuration elements across multiple different plant sites.

73. An enterprise configuration system for use in viewing and changing the configuration of an enterprise system having a compute fabric communicatively connected to one or more plant sites, each plant site having components of one or more control or automation systems located therein, the control or automation systems including one or more field devices which perform one or more physical functions within the plant site and one or more controllers which control the one or more field devices to perform the one or more physical functions within the plant site, and the compute fabric including computer devices that implement computer implemented elements for the one or more plants sites, the configuration system comprising:

an enterprise configuration database stored in and executed in a computer database of the compute fabric of the enterprise that stores configuration data for components of each of the one or more plant sites, the configuration data including setup data defining a manner in which the control or automation system of each of the plant sites is configured to cause the one or more controllers to control the one or more field devices within each plant site to perform the one or more physical functions within each plant site;

a configuration support viewing application executed on a computer processing device that accesses data from the enterprise configuration database via a connection to the enterprise configuration database via the compute fabric;

one or more local configuration systems stored in a computer memory device and executed on a processor at each of the one or more plant sites, each local configuration system being independent from each other local configuration system and including one or more local database configuration support services that execute on a processor at the plant site to interface with a user at the plant site and to present the user at the plant site with configuration data for the plant site and operate to implement changes made by the user at the plant site to change the configuration of the components of a control or automation system associated with the plant site without enabling the user to view and change the configuration of components at other plant sites, to thereby change the setup data defining the manner in which the control or automation system of the associated plant site is configured to cause the one or more controllers to control the one or more field devices within the associated plant site to perform the one or more physical functions within the associated plant site; and a set of enterprise configuration database services that is independent from each local configuration system and that is stored in and executed on a processor in the compute fabric, each of the set of enterprise configuration database services including an interface layer that interfaces with the configuration viewing support application and a plant site, a domain model layer that stores a data model associated with a first configuration data schema and a database abstraction layer that interfaces with the enterprise configuration database to store and read configuration data.

74. The enterprise configuration system of claim 73, wherein the enterprise configuration database includes multiple different database components that use different database storage technologies, and wherein the abstraction layer for a first configuration database service supports the use of a first database storage technology and the abstraction layer for a second enterprise configuration database service supports the use of a second database storage technology different than the first database storage technology.

75. The enterprise configuration system of claim 73, wherein the domain model layer translates between the first configuration data schema associated with the data model and a second configuration data schema associated with the configuration support viewing application or one of the plant sites.

76. The enterprise configuration system of claim 75, wherein the communication layer interfaces with a configuration viewing application using a further data and messaging schema of the configuration viewing application or of one of the plant sites.

77. The enterprise configuration system of claim 76, wherein the communication layer extracts a set of configuration data and an action from a message from configuration support viewing application or from a plant site using the further configuration data schema of the configuration viewing application or of the plant site, and creates one or more messages to the configuration support viewing application or a plant site by creating a message including configuration data using the further configuration data schema of the configuration support viewing application or the plant site.

78. The enterprise configuration system of claim 73, further including one or more search services that perform a search of the enterprise configuration database to search for configuration elements according to a provided search criterion.

79. The enterprise configuration system of claim 73, wherein the one or more search services search for configuration elements across multiple different plant sites.

80. An enterprise configuration system for use in viewing and changing the configuration of an enterprise system having a compute fabric communicatively connected to one or more plant sites, each plant site having components of one or more control or automation systems located therein, the control or automation systems including one or more field devices which perform one or more physical functions within the plant site and one or more controllers which control the one or more field devices to perform the one or more physical functions within the plant site, and the compute fabric including computer devices that implement computer implemented elements for the one or more plants sites, the configuration system comprising:

an enterprise configuration database stored in and executed in a computer storage device in the compute fabric of the enterprise to store configuration data for components of each of the one or more plant sites, wherein the enterprise configuration database organizes the configuration data stored in the enterprise configuration database by defining a plant site to which particular configuration data pertains;

a configuration support viewing application executed on a processor of a computer device that accesses data from the enterprise configuration database for each of the different plant sites via a connection to the enterprise configuration database via the compute fabric and that enables a user to view and change the manner in which the one or more field devices and the one or more controllers which control the one or more field devices operate to perform the one or more physical functions at each of the plant sites; and one or more local configuration systems stored in a computer memory device and executed on a processor at each of the one or more plant sites, each local configuration system including one or more local database configuration support services for viewing or changing the configuration of the components of a control or automation system at the plant site to thereby view and change the manner in which the one or more field devices and the one or more controllers which control the one or more field devices at the plant site operate to perform the one or more physical functions at the plant site;

a set of enterprise configuration database services stored in and executed on one or more processors in the compute fabric that interfaces between the enterprise configuration database and the configuration support viewing application and that interfaces between the enterprise configuration database and the local database configuration support services at each of the plant sites.

81. The enterprise configuration system of claim 80, wherein the enterprise configuration database organizes the configuration data stored in the enterprise configuration database based on one or more regions to which each plant site belongs.

82. The enterprise configuration system of claim 80, wherein the enterprise configuration database organizes the configuration data stored in the enterprise configuration database based on one or more divisions of the enterprise to which each plant site belongs.

83. The enterprise configuration system of claim 82, wherein each of the one or more divisions of the enterprise includes one or more regions of the enterprise, and wherein each region of the enterprise includes one or more plant sites of the enterprise.

84. The enterprise configuration system of claim 80, further including one or more search services that perform a search of the enterprise configuration database to search for configuration elements according to a provided search criterion.

85. The enterprise configuration system of claim 84, wherein the one or more search services search for configuration elements across multiple different plant sites.

* * * * *